(12) United States Patent
Gadini

(10) Patent No.: US 6,823,878 B1
(45) Date of Patent: Nov. 30, 2004

(54) HOUSEHOLD APPLIANCE USING WATER, NAMELY A WASHING MACHINE, WITH IMPROVED DEVICE FOR SOFTENING THE WATER

(75) Inventor: Costanzo Gadini, Casale Monferrato (IT)

(73) Assignee: Eltek S.p.A., Casle Monferrato (IT)

( * ) Notice: Subject to any disclaimer, the term of this patent is extended or adjusted under 35 U.S.C. 154(b) by 0 days.

(21) Appl. No.: 09/959,046

(22) PCT Filed: Apr. 25, 2000

(86) PCT No.: PCT/IB00/00499

§ 371 (c)(1),
(2), (4) Date: Dec. 31, 2001

(87) PCT Pub. No.: WO01/30229

PCT Pub. Date: May 3, 2001

(30) Foreign Application Priority Data

Apr. 22, 1999 (IT) ........................................ TO99A0320
May 26, 1999 (IT) ........................................ TO99A0446

(51) Int. Cl.[7] ........................... B08B 7/00; D06F 35/00; C02F 1/46
(52) U.S. Cl. ..................... 134/58 D; 134/109; 134/113; 68/13 A; 204/242; 204/275.1
(58) Field of Search ............................ 134/57 D, 58 D, 134/109–111, 113, 201; 68/13 A, 207; 204/242, 252, 275.1

(56) References Cited

U.S. PATENT DOCUMENTS

| | | | |
|---|---|---|---|
| 2,825,666 A | | 3/1958 | Stoddard |
| 4,156,621 A | | 5/1979 | Andrews |
| 4,434,629 A | * | 3/1984 | Bianchi et al. ............. 68/13 A |
| 4,481,086 A | * | 11/1984 | Bianchi et al. .......... 204/229.6 |
| 4,645,595 A | * | 2/1987 | Kim et al. ................... 210/181 |
| 4,671,863 A | * | 6/1987 | Tejeda .......................... 204/266 |
| 5,947,135 A | * | 9/1999 | Sumida et al. ............. 134/95.3 |

FOREIGN PATENT DOCUMENTS

| | | |
|---|---|---|
| DE | 3640881 A | 6/1988 |
| DE | 19814884 | 10/1999 |
| EP | 0133677 A | 3/1985 |
| EP | 0163605 A | 12/1985 |
| EP | 0561147 A | 9/1993 |
| EP | 0605288 A * | 7/1994 |
| EP | 0605288 A | 7/1994 |
| FR | 2242960 | 4/1975 |
| FR | 2667306 A | 4/1992 |
| GB | 809685 A | 3/1959 |
| GB | 2227758 A | 8/1990 |

* cited by examiner

Primary Examiner—Frankie L. Stinson
Assistant Examiner—Joseph Perrin
(74) Attorney, Agent, or Firm—Levine & Mandelbaum

(57) ABSTRACT

A household appliance using water is described, in particular a washing machine, comprising a supply system of water from an external source (8,9), a softening system for at least a portion of the supplied water (10,17), and a control system of the appliance, characterized in that permanent water softening means (10,17,H,21) are provided, which are controlled by said control system and which do not periodic interventions by the user to the appliance, for adding regeneration media and/or replacing components.

23 Claims, 20 Drawing Sheets

HOUSEHOLD APPLIANCE USING WATER, NAMELY A WASHING MACHINE, WITH IMPROVED DEVICE FOR SOFTENING THE WATER

DESCRIPTION

The present invention relates to a household appliance utilizing water, in particular a washing machine, comprising a device for reducing the water hardness.

As it is known, certain household appliances like washing machines, in particular household dishwashers, are provided with a system, also known as a water decalcifier or softener, for reducing the water hardness; in particular, this system is provided for reducing the calcium and magnesium contents of the water used for washing purposes, which may inhibit the action of detergents and produce calcareous deposit; in fact, calcareous deposits are due to an excessive amount of calcium ions (Ca++) and magnesium ions (Mg++) contained in the water supplied by the main; in particular, calcium ions and magnesium ions are cations, i.e. ions with a positive electric charge.

To this purpose, the decalcifier provides for exchanging the calcium and magnesium ions of the water with sodium ions (Na+) contained in suitable decalcifying resins, which are in fact cationic, and therefore able to retain the positively charged calcium and magnesium ions. These resins, which are shaped like small balls, are placed in an appropriate container pertaining to the decalcifier, which is flushed through by the water supplied from the main.

Since the above resins exhaust their softening capability after a certain volume of treated water, they have to be regenerated by flushing them through with a water and sodium chloride solution (NaCl), commonly called brine; in this way, the calcium and magnesium ions deposited on the resins are replaced by the sodium ions of the brine, so that the resins are ready again for a new softening phase; in most instances, such a resins regenerating process occurs at each wash cycle performed by the machine. Therefore, water softening systems as above have to provide a salt container, which needs to be regularly topped up by the user, due to the consumption caused by the periodical resin regenerating processes.

In main line, it should be considered how the higher the water hardness degree is, the faster resins become exhausted, whereby a greater salt consumption is needed for resins regeneration; therefore, in other words, the salt consumption may be considered directly proportional to the hardness degree of the water used by the washing machine.

In order to reduce salt and water waste, some washing machines do not perform a resins regeneration phase at each wash cycle, but less frequently, typically after a predetermined amount of water have been softened; in other known solutions, the washing machine is equipped with water hardness sensors, which activate the regeneration phase only upon detecting that water hardness is not low enough, due to resins exhaustion; according to other solutions also utilizing water hardness sensors, the amount of brine supplied to the resins compartment is variable and proportional to the water hardness degree ascertained.

At any rate, the above softening technique has been well known and affirmed for several years in the field of household washing machines, based on its satisfactory reliability and convenience.

However, it is obvious that the above technique presumes a periodic maintenance or operation to the system by the user, which consists in topping up the salt in the relevant container; it is also clear that, whenever salt is not topped up and the resins cannot be regenerated, the system will not perform wash water decalcification as required.

To this purpose it will also be appreciated that the user should be promptly warned about a likely lack of salt in the relevant container; to this purpose, therefore, the washing machine should have appropriate sensing means indicating salt availability, usually based on the use of floats and relevant signalling means, such as a warning light. However, these sensing means are subject to failure or clogging, so that the salt container may remain erroneously empty, with an ensuing wrong and useless operation of the decalcifying system.

The document U.S. Pat. No. 4,645,595 discloses a washing machine having a water softening system, which does not require the use of any regenerating agents, such as salt.

According to this solution, the softening system uses special ionic exchange resins, of the thermally regenerable type; in this way, a regular topping up of a regenerating medium is no longer required, since the softening efficiency of the resins is restored when required, by flushing them through with hot water.

However, also the system described in U.S. Pat. No. 4,645,595 has some drawbacks. A first drawback is represented by the fact that the machine described in the above document, must provided for connection to a hot water supply network, i.e. a typical peculiarity of Anglo-Saxon markets (where washing machines are normally conceived for direct connection to two external water sources, i.e. hot and cold, respectively).

In this frame, therefore, the solution described in U.S. Pat. No. 4,645,595 does not appear appropriate for use in most European countries, where on the contrary washing machines are provided for connection to one cold water supply main only. On the other hand, the above document does not offer any indication concerning this specific aspect.

Anyway, a substantial problem of U.S. Pat. No. 4,645,595 is that also the softening system described therein is subject to periodical maintenance, i.e. the replacement of a cartridge containing the thermally regenerable resins, as they will loose their efficiency after a certain period of time. It is the aim of the present invention to solve the above problems.

Accordingly, the present invention has the aim to provide a household appliance utilizing water, such as a washing machine, which is equipped with a system for reducing the water hardness requiring no special regeneration agents for the materials used for water decalcification.

A further aim of the present invention is to provide a household appliance wherein the frequency of maintenance interventions and/or components replacement is minimized, which does not likely require periodic operations, such as the replacement of the above materials, at least for a period of time equal to the average useful life of a similar known household appliance.

In order to achieve such aims, it is the object of the present invention a household appliance utilizing water, in particular a washing machine, having a system for reducing the water hardness incorporating the features of the annexed claims, which form an integral part of the present description.

Further objects, features and advantages of the present invention will become apparent from the following detailed description and annexed drawings, which are supplied by way of non limiting example, wherein.

Figure 1:
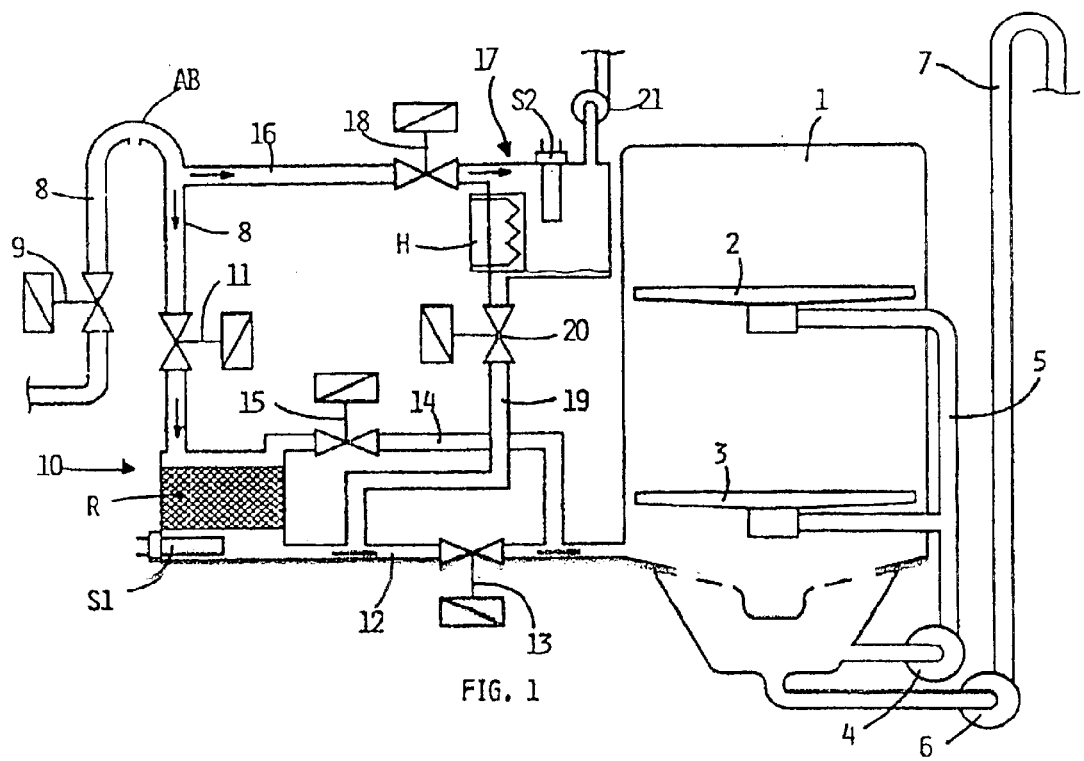
FIGS. 1 to 10 show basic diagrams of some embodiments of a household appliance utilizing water, according to a first possible technical solution according to the present invention.
Figure 2:
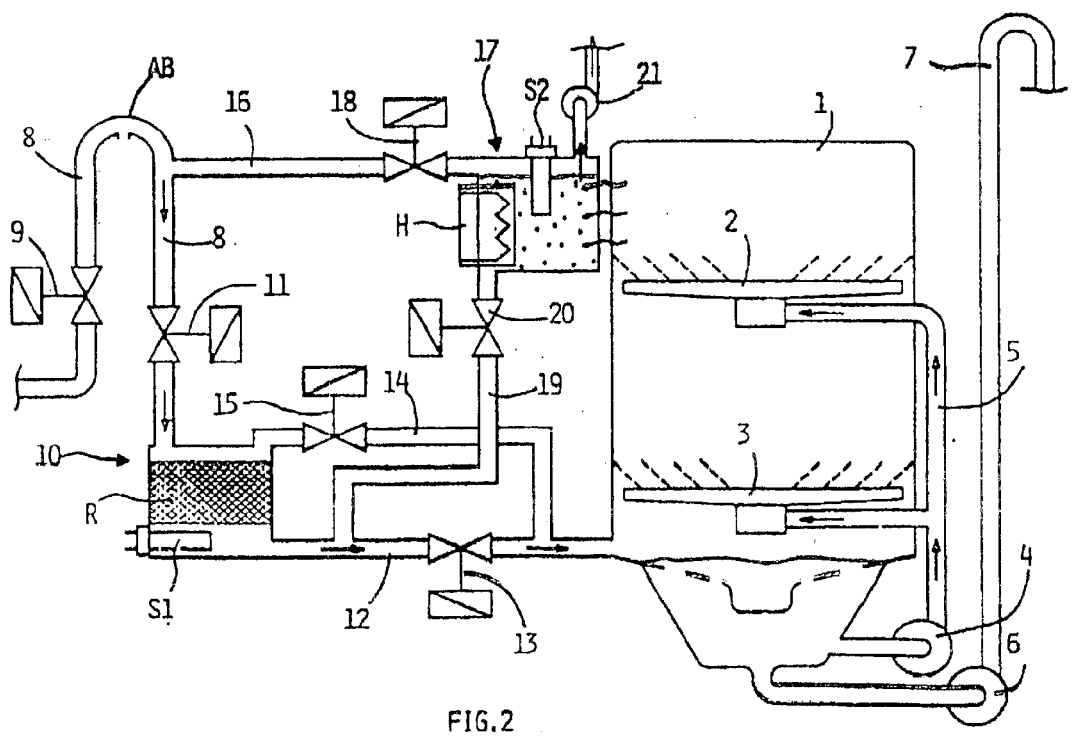
Figure 3:
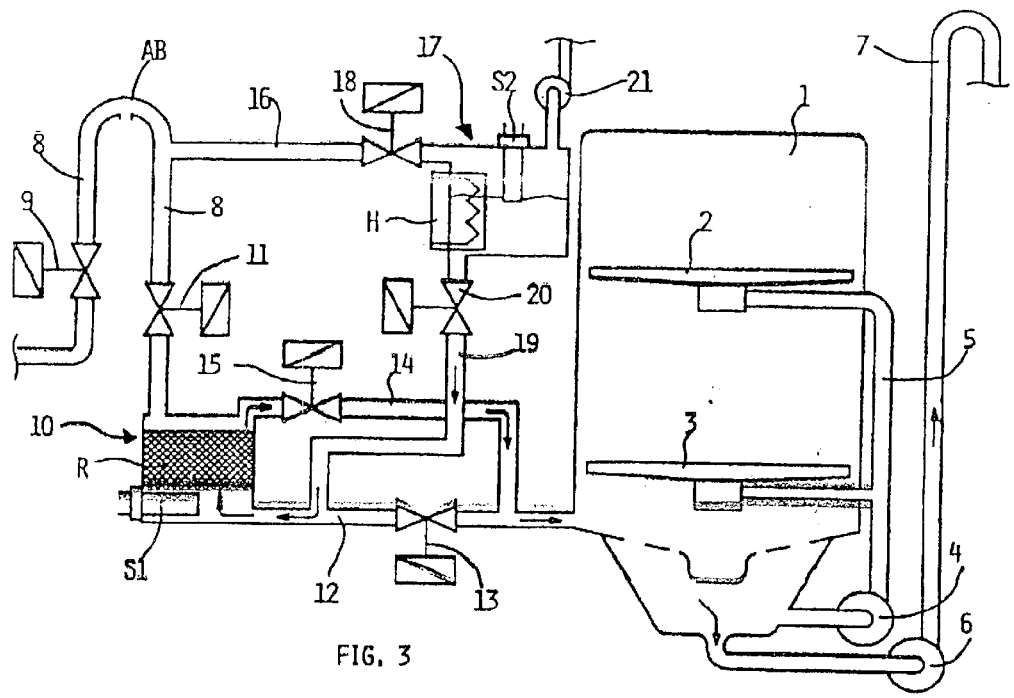
Figure 4:
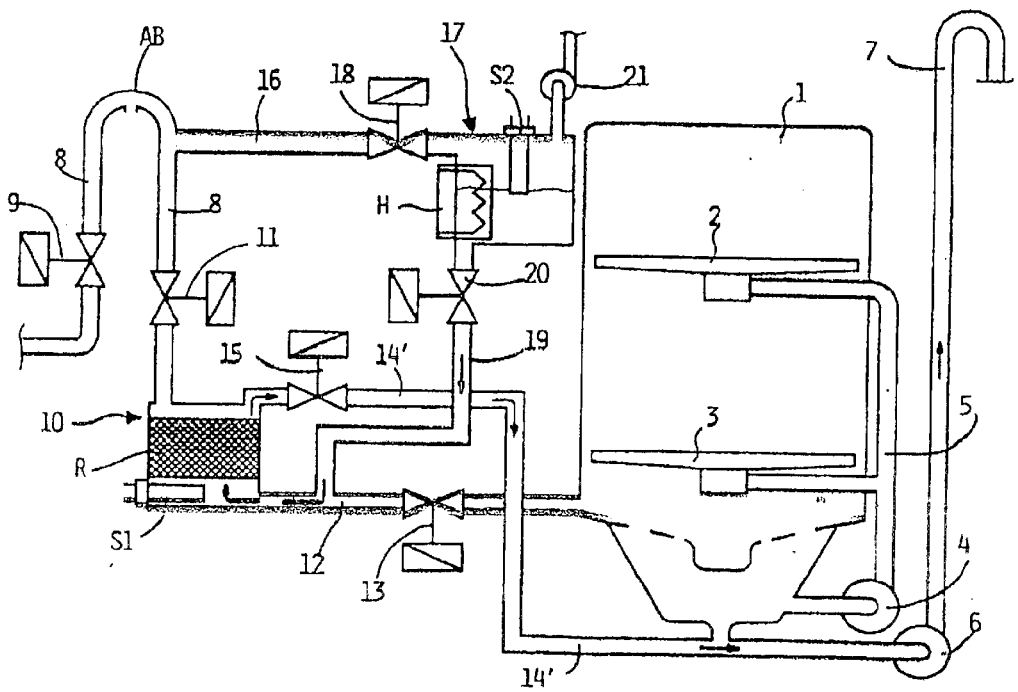
Figure 5:
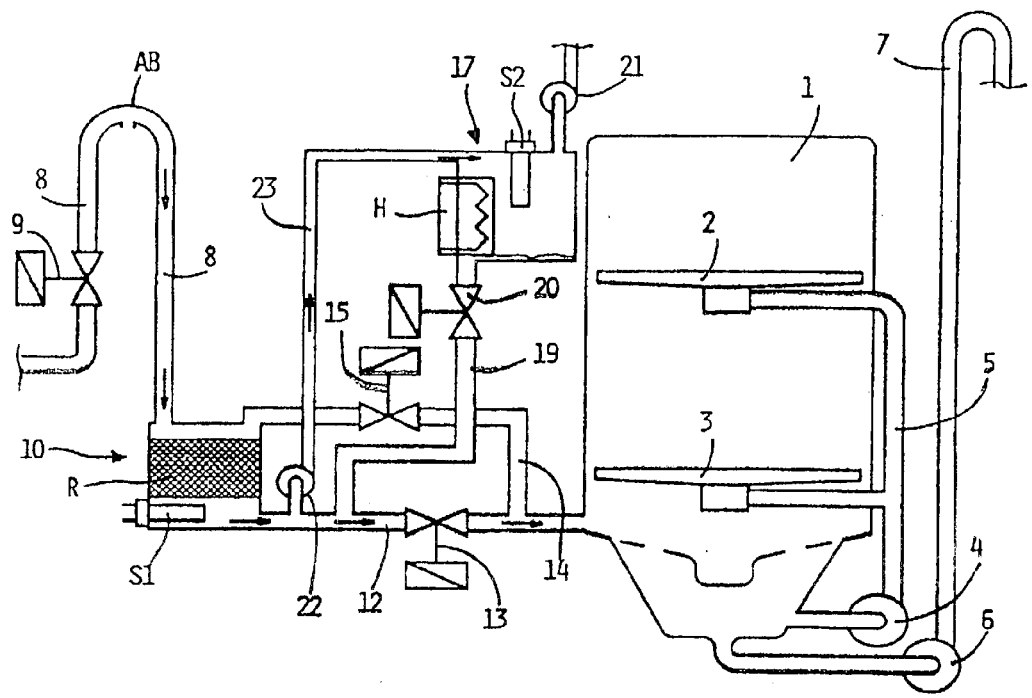
Figure 6:
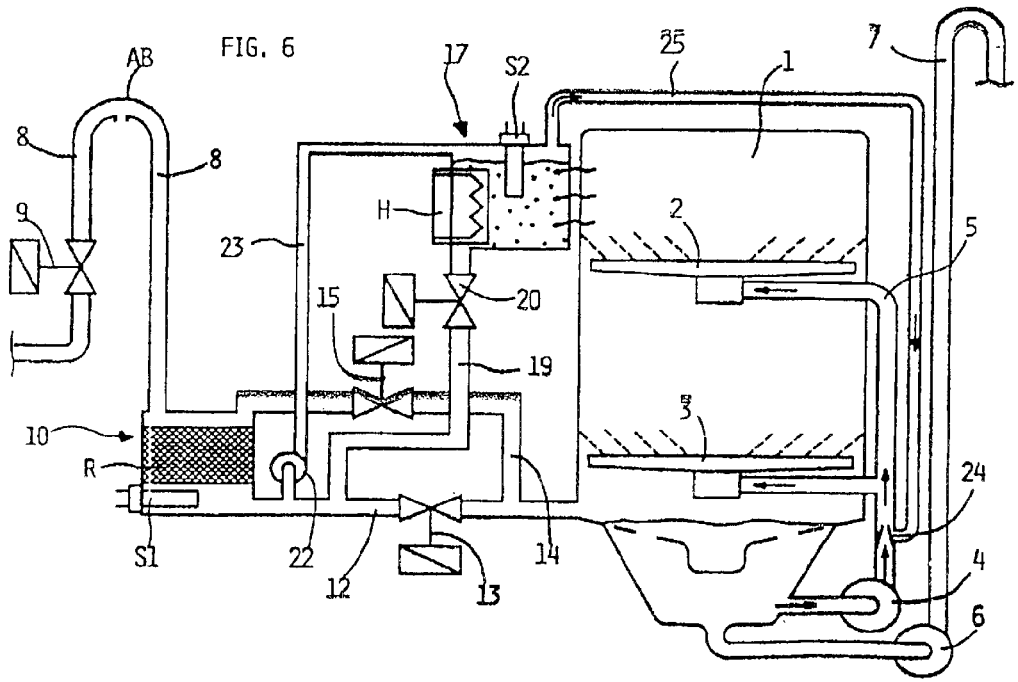
Figure 7:
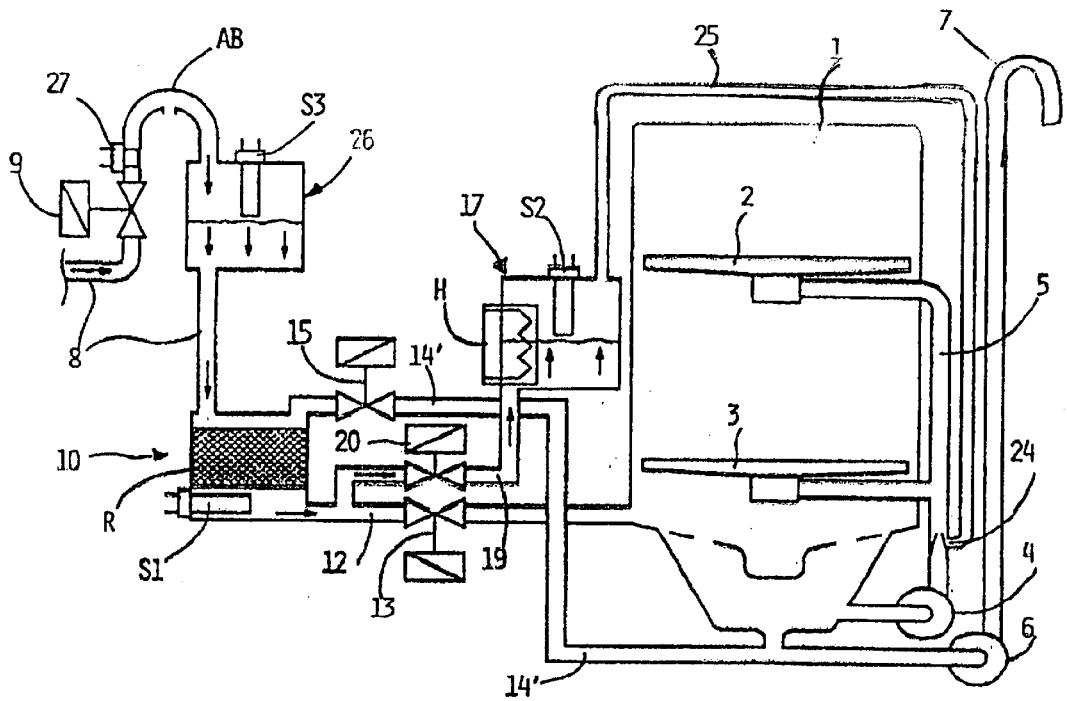
Figure 8:
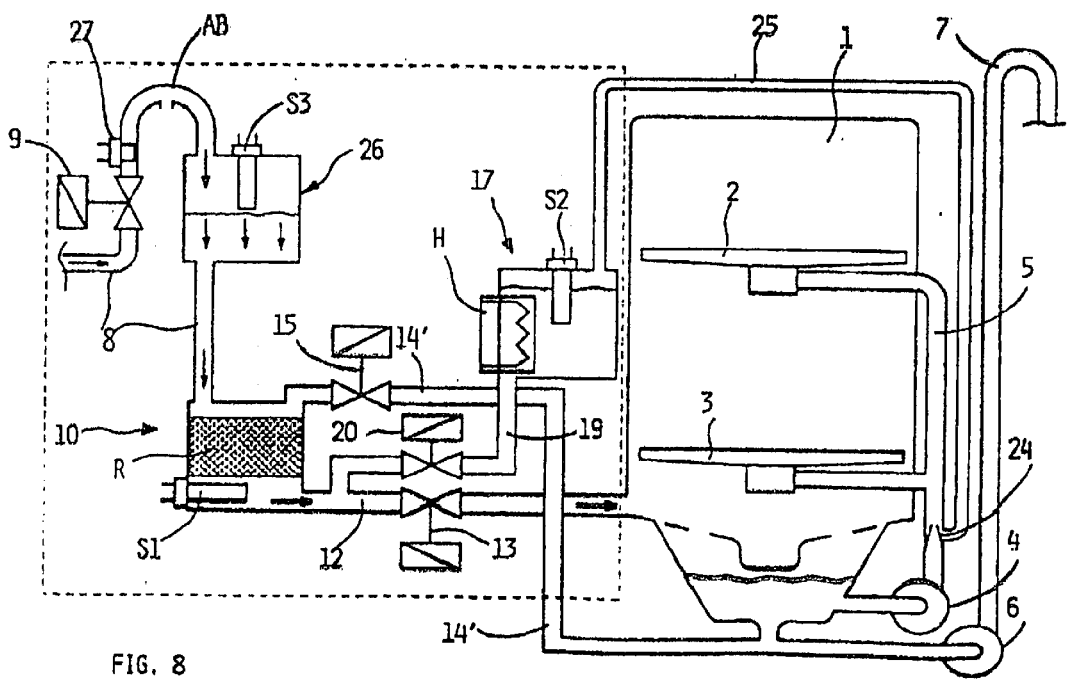
Figure 9:
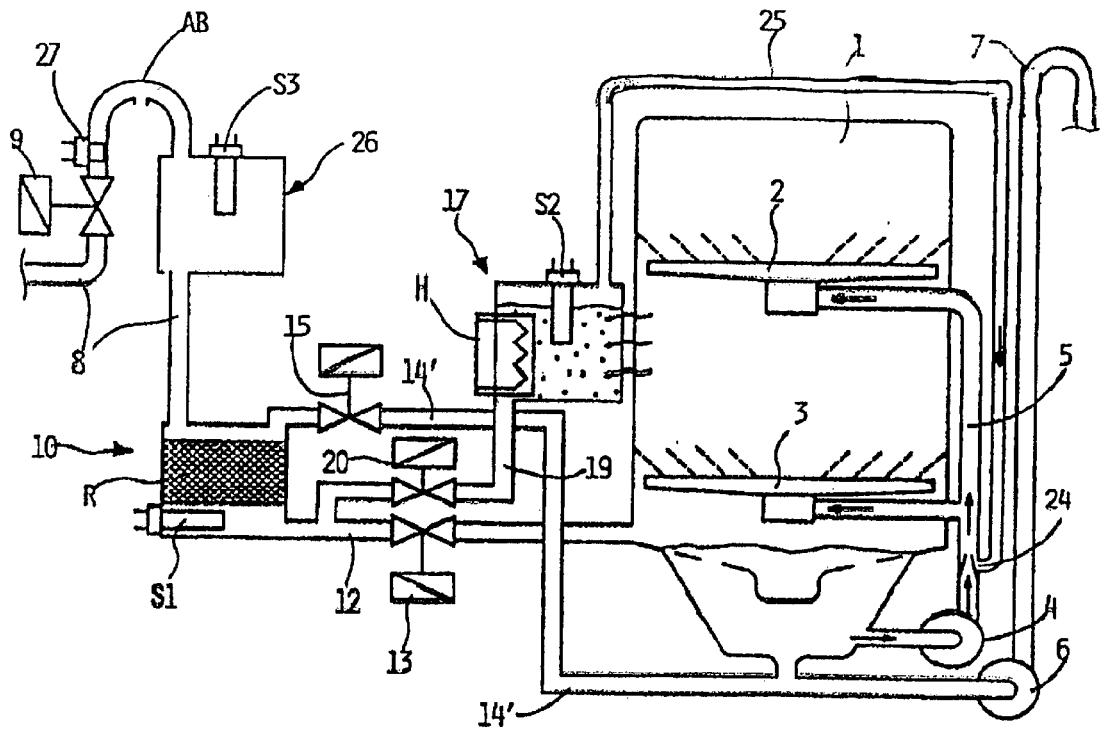
Figure 10:
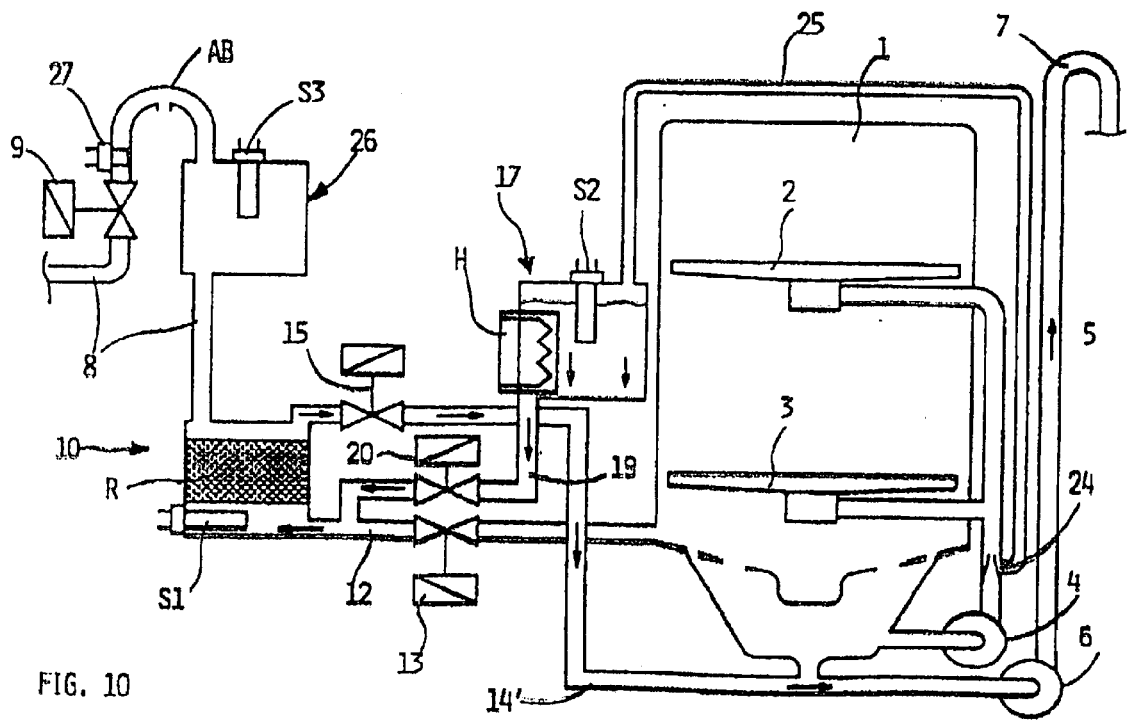

FIGS. 1–10 represent the basic diagrams of some embodiments of a washing machine realized according to the present invention, which are based on the use of decalcifying resins of the thermally regenerable type, similarly as described in U.S. Pat. No. 4,645,595. In particular:

FIG. 1 shows a basic diagram of a first possible embodiment of the washing machine according to the present invention, in a first operating condition;

FIG. 2 shows a basic diagram of the washing machine represented in FIG. 1, in a second operating condition;

FIG. 3 shows a basic diagram of the washing machine represented in FIG. 1, in a third operating condition;

FIG. 4 shows a basic diagram of the washing machine represented in FIG. 1 according to a possible variant embodiment, in an operation condition similar to the one of FIG. 3;

FIG. 5 shows a basic diagram of a second possible embodiment of the washing machine according to the present invention;

FIG. 6 shows a basic diagram of a third possible embodiment of the washing machine according to the present invention;

FIG. 7 shows a basic diagram of a fourth possible embodiment of the washing machine according to the present invention, in a first operating condition;

FIG. 8 shows a basic diagram of the washing machine represented in FIG. 7, in a second operating condition;

FIG. 9 shows a basic diagram of the washing machine represented in FIG. 7, in a third operating condition;

FIG. 10 shows a basic diagram of the washing machine represented in FIG. 7, in a fourth operating condition;

The operation principle of the above thermally regenerable resins for the water softening is substantially similar to the principle of ionic exchange resins as used in the systems previously mentioned in the present description; however, such resins have the peculiarity of being regenerated without using special additives, such as brine, but simply submitting them to a thermal treatment, i.e. flushing such resins through with a hot water flow. Further references about the properties and features of such resins are contained for example in the document U.S. Pat. No. 4,645,595 or technical literature available in this respect.

However, as already mentioned above, in the applications known so far, particularly in the washing machines field, useful life of such resins is not long enough for avoiding periodical maintenance operations to the decalcifying system.

In FIG. 1, reference 1 indicates schematically the washing tub of a washing machine according to the present invention.

In the given example, such a washing machine consists of a generic dishwasher, whose tub 1 has spraying means for the wash liquid, which are represented by two known rotary spraying arms 2 and 3; reference 4 indicates a wash pump, which is provided for picking up the wash liquid from the bottom of the tub 1 and convey it through an appropriate duct 5 to the spraying arms 2 and 3.

Reference 6 indicates a drain pump for discharging the liquid used for washing purposes from the tub 1, at appropriate times (typically, discharge occurs at the end of determined phases of the operating program); to this purpose, an appropriate drain hose 7 is connected to the outlet of the pump 6. Reference 8 indicates a duct for the intake of water at room temperature from a household water main, onto which an inlet valve 9 is provided; this valve 9 is of the known type and is controlled by the control system of the machine according to the present invention, not shown in the figures, for allowing clean water intake as required for washing according to appropriate times and procedures.

The duct 8, upstream the valve 9, has a so-called air-break device, indicated with AB, also commonly known, whose main function is to avoid liquid backflow from the washing machine to the water main outside.

Reference 10 indicates as a whole a decalcifying device, of the type comprising a container of ionic exchange resins being thermally regenerable.

The decalcifier 10 has an inlet connected to the duct 8; as it can be seen, a second valve 11 is provided upstream the connection between the duct 8 and the decalcifier 10; also this valve is of the commonly known type and controlled by the machine control system for the purposes further described in the following. A duct 12 departing from the decalcifier 10 is connected on its other end to the tub 1, which performs the primary function of conveying water to it from the main, being softened by means of the decalcifier 10. As it can be seen, a third valve 13, of the known type, is also provided on the duct 12, which is controlled by the machine control system for the purposes to be further described in the following.

A duct 14 also departing from the decalcifier 10 is connected on its other end to the duct 12 in an intermediate location between the valve 13 and the tub 1; a fourth valve 15 of the known type is provided on this duct 14, and controlled by the machine control system. As it will become apparent later, the duct 14 and the valve 15 are used for regenerating the water decalcifying resins contained in the decalcifier 10.

Reference 16 indicates a duct departing from the duct 8 at an intermediate location between the air break AB and the valve 11; the other duct end 16 is connected to a collecting tank 17; the duct 16 has a fifth valve 18 of the known type and controlled by the machine control system.

A duct 19 departs from the lower part of the tank 17; the other end of this duct is connected to the duct 12, in an intermediate location between the relevant outlet of the decalcifier 10 and the valve 13; on the duct 19 a sixth valve 20 of the known type is provided, also controlled by the machine control system. As it will be seen later, the tank 17, the duct 19 and the valve 20 are provided for containing the water required for regenerating the resins contained in the decalcifier 10 and convey it to the latter, according to appropriate times and procedures.

The various valves of the system described above are valves of the normally closed type; therefore, to the purposes of the present description, they should be considered in their closed condition, save when otherwise specified.

As said, the decalcifier 10 comprises inside ionic exchange resins, indicated with R, which are of the thermally regenerable type by means of hot water; the decalcifier 10 comprises first sensing means, schematically indicated with S1, which are provided for detecting some operating parameters, such as conductivity, hardness degree and temperature of the water flowing out of the decalcifier 10. The tank 17 comprises heating means H, such as an electric heater or a PTC resistor (Positive Temperature Coefficient) being self-adjustable in temperature, which operation is controlled in a known way by the machine control system; such means H are provided for heating the liquid contained in the tank 17, in order to regenerate the resins R.

The tank 17 also comprises second sensing means, schematically indicated with S2, which are provided for detecting some parameters of the water contained in the tank itself, such as its conductivity, hardness and temperature degree, pH degree, vacuum degree, etc.; these sensing means S2 may also comprise a level sensor of water inside the tank 17, such as a float for actuating a microswitch upon reaching the predefined level.

As previously mentioned, the known solution described in U.S. Pat. No. 4,645,595 presumes a periodic replacement of the decalcifying resins.

It has been ascertained that such a replacement need is due to the fact that thermally regenerating resins are particularly susceptible of oxidation, the latter occurring specifically during the regeneration phase which requires the use of hot water; such an oxidation determines a reduction of the useful life of the resins.

For this reason, according to the solution represented in FIG. 1, the machine according to the present invention is provided with appropriate means for deoxygenating or degassing at least the water flowing through the resins R for their regeneration.

To this purpose, in FIG. 1 a vacuum pump is indicated with 21, which is associated to the tank 17 and provided for degassing the water contained in the latter.

The above described machine operates as follows.

FIG. 1 shows a condition of water supply from the main to the tub 1 and tank 17; for example such a phase may be the first water supply phase provided by a standard wash cycle of the machine according to the present invention.

To this purpose, the machine control system provides for the valves 9, 11, 13 and 18 to open and valves 15 and 20 to keep closed.

Thus, the water supplied from the main can flow along the duct 8, overcome the air break AB and flow partially to the decalcifier 10 and partially to the tank 17, through the duct 16.

The amount of water unable to overcome the air break AB is conveyed in a known way towards the tub 1 (or towards a tank 26, as it will be further described); this water will not be softened; however, its volume is very low and such not to affect wash quality negatively.

The water conveyed to the decalcifier 10 flows through the resins R to be softened and then into the wash tub through the duct 12; the control system will subsequently activate the wash pump 4, which will in turn deliver softened water to the sprayer arms 2 and 3.

As it will be appreciated, the precise metering of the softened water inside the tub 1 can be obtained through any common technique, such as with the use of a standard pressure-switch or turbine flow-meter or by means of metering tanks or containers for the wash water, whose use and operation is known. The water flowing along the duct 16 after having overcome the air break AB can reach the tank 17 and gradually fill it; also detection of the filling level of the tank 17 can be obtained by means of any common technique.

Referring for example to the possible implementation as described above, the increasing water level inside the tank 17 can be used for the raising of a float, which switches a microswitch upon reaching a preset level; this switching is used by the machine control system as a criterion for the closure of the valve 18 and hinder a further water flow to the tank 17 (it should be pointed out that filling the tank 17 may also be realized by a simple overflow system).

FIG. 2 shows a wash phase where the tank 17 is already filled with water; in this instance, therefore, the pump 4 is operating and the wash liquid (water plus likely detergents and/or additives) is sprayed over the crockery inside the machine through the sprayer arms 2 and 3.

In particular, the wash cycle phase represented is performed under "hot" conditions, i.e. the liquid circulated by the pump 4 is heated through known heaters located on the bottom of the tub 1 (such heaters are not represented in the figure as their type and operation are known).

To this purpose it will be appreciated how the tank 17 is preferably located directly in contact with at least a wall of the tub 1, usually made of stainless steel; therefore, the wall heating induced by the temperature of the wash liquid being present and circulating in the tub 1 allows a partial heating by thermal exchange of the water contained in the tank 17.

For simplicity's sake, FIG. 2 shows also the vacuum pump 21 activated by the machine control system, for deoxygenating or degassing the water contained in the tank 17.

At a time prior to the regeneration phase, the machine control system will eventually complete heating of the water contained in the tank 17, activating the relevant heating means H; upon reaching an optimal preset temperature for regeneration purposes of the resins R, as detected through appropriate temperature sensing means pertaining to S2, the control system will deactivate the heating means H.

FIG. 3 shows the subsequent regeneration phase of the resins R of the decalcifier 10, which is performed using the water heated as described above.

To this purpose, the machine control system will provide for the valves 20 and 25 to open, whereas the valves 9, 11, 13 and 18 are kept closed.

The water contained in the tank 17 appropriately degassed and/or heated will reach the duct 12 flowing along the duct 19; since during this phase the valve 13 is closed, the water will enter the decalcifier 10 so as to flow across the resins R and then out of the duct 15; as it can be seen, the decalcifier 10 and tank 17 are located at different heights, so that the regeneration water will flow by gravity from the latter to the former.

It will also be appreciated that the hot water used for regeneration purposes flows counter-current through the resins R, i.e. in an opposite direction with respect to the normal water used for washing, which comes from the duct 8 during normal supply; this because it has been ascertained that a counter-current hot water flow allows an improved regeneration of the resins R and better removal of the residues possibly retained mechanically by the decalcifier 10.

The valve 15 being opened, the water used for regeneration flows through the duct 14 to the duct 12 downstream the valve 13 and then into the tub 1. This water may then be discharged by the machine directly through the suitable drain pump 6 or mixed in the tub with softened water from the decalcifier 10, in view of a subsequent wash cycle phase, provided that the presence of water used for resins regeneration can be considered as acceptable for such a wash phase (e.g. prewash). Anyway, the hot water used for resins regeneration may be conveyed directly to the drain pump 6 without having to flow through the tub 1. Such an implementation to the invention is shown in FIG. 4, wherein the same reference numbers of the previous figures are used to indicate technical equivalent elements. According to this implementation, the outlet duct for the regeneration water indicated with 14', instead of being connected to the duct 12, communicates directly with the water outlet duct from the tub 1, outside the latter.

According to the present invention, the thermal regeneration phase of the resins R can take place at least partially under static conditions of water inside the decalcifier 10; to this purpose, therefore, during determined moments of the regeneration phase, the valve 15 can be appropriately maintained closed to let hot water stagnation in the decalcifier 10; thereafter, the subsequent opening of the same valve 15 will allow for discharge of such water and inflow of new hot regeneration water eventually still available in the tank 17 and/or duct 19.

In order to further improve the efficiency of the resins R and ensure their longest possible useful life, the thermal regeneration phase of the resins according to the present invention can be advantageously performed using already softened water, to avoid possible contamination of the resins R during the regeneration phase.

A further possible embodiment of the washing machine according to the present invention is shown to this purpose in FIG. 5.

The diagram of the embodiment shown in FIG. 5 is substantially similar to the one of FIG. 1; however, in this instance a pump 22 is provided on the duct 12 upstream the valve 13, for conveying the water already flown across the resins R to the tank 17, through a relevant duct 23; as it can be seen, this embodiment has no longer the duct 16 and valves 11 and 18 of FIG. 1.

Operation of the dishwasher shown in FIG. 5 with reference to water supply of the tank 17 is as follows.

During a water supply into the tub 1, the control system activates the pump 22, so that a portion of the water exiting the decalcifier 10 from the duct 12, i.e. softened water, is conveyed to the tank 17 through the duct 23.

Upon reaching the desired filling level of the tank 17, which is detected as described above, the machine control system will stop operation of the pump 22, so that the further softened water exiting the decalcifier 10 can reach the tub 1.

As to the subsequent resins regeneration phase, the machine of FIG. 5 operates exactly as previously described with reference to FIG. 3 or 4.

With reference to the embodiment of FIG. 5, filling the tank 17 as described above can be performed also with the valve 13 closed; therefore, in this frame, filling the tank 17 should not necessarily be performed during a water supply phase to the tub 1, but it can be performed as an independent operation.

In order to further increase the efficiency of the regeneration system for the resins provided by the machine according to the present invention, the water supplied to the tank 17 may be the "first" water flown through the resins R after a regeneration process; thus, the water contained in the tank 17 for a subsequent regeneration phase is the purest possible, since it was softened at the time of utmost decalcification capability of the resins R.

In this frame, let us assume by way of example that the machine has completed a regeneration cycle of the resins R according to the procedures previously described.

For example, with reference to FIG. 5, the phase following this regeneration may provide for the opening of the inlet valve 9, with the closure of all other valves of the system and activation of the pump 22.

Therefore, the water flowing out from the decalcifier 10 to the duct 12 is picked up by the pump 22 and conveyed to the tank 17 through the duct 23; upon reaching the desired filling level of the tank 17, which is detected as described above, the machine control system will stop operation of the pump 22 and provide for closing the inlet valve 9.

Therefore, the tank 17 is filled with water softened when the efficiency of the resins R was at its maximum, which can then be used for regenerating the resins themselves as previously described. FIG. 6 shows a possible variant implementation to the present invention being realized starting from the machine of FIG. 5, where the means for deoxygenating or degassing the water contained in the tank 17 do not consist of the pump 21 but provide for a Venturi arrangement; anyway such an arrangement is also directly applicable to the embodiments shown in the FIGS. 1–4.

In such an instance, the duct 5 for supplying water from the wash pump 4 to the sprayer arms has an appropriate restriction indicated with 24 in the figure. Vice-versa, reference 25 indicates a duct with one of its ends connected to the tank 17 and the other end is in correspondence of the restriction 24.

In this way, when the pump 4 is activated during the wash and/or rinse phase, the liquid flowing out of the restriction 24 is such to produce a depression inside the duct 25 due to a Venturi effect; such a depression generated in the duct 25 is utilized for degassing the water contained in the tank 17 for the above mentioned purposes, and therefore without the need of using the pump 21 shown in FIGS. 1–5.

For the rest, the machine represented in FIG. 6 operates as previously described.

FIG. 7 is representing a preferred embodiment of the present invention, where the same reference numbers of the previous figures are indicated for technical equivalent elements; in particular, the basic circuit of FIG. 7 is similar to the one represented in the FIGS. 5 or 6, however with the addition of a tank located along the duct 8 and a modified control system for the various valves, to avoid the need of having the pump 22.

The above tank located along the duct 8 is indicated with 26 and comprises sensing means S3 for some operating parameters, such as the conductivity, hardness degree and temperature of the water from the main, its pH degree and eventually the filling level of the tank 26 itself.

The tank 26 may have a metering function for the intake of a predetermined amount of water supplied from the main, independently from the water main pressure and/or various possible charge losses along the hydraulic supply circuit (air break, decalcifier, ducts, etc.).

As it can be seen, the metering tank 26 is located at a higher level with respect to the regeneration tank 17, which is in turn at a higher level compared to the decalcifier 10.

The dishwashing machine represented in FIG. 7 operates as follows.

In order to supply water to the machine, the control system provides for the valve 9 to open only, so that the water entering from the duct 8 is unable to flow in the ducts 12, 14 and 19 due to the closed condition of valves 13, 15 and 20; the water therefore gradually fill the tank 26.

Upon reaching a predetermined level for the tank 26, as detected for example by means of a float-microswitch system as previously described, the machine control system provides for closing the valve 9 and opening the valve 20.

In this way, the water available in the decalcifier 10 and in the duct 8 downstream the tank 26, as well as a portion of the water contained in the tank 26 itself, can flow upwardly to the regeneration tank 17 by virtue of the principle of the communicating vessels.

Upon reaching a desired filling level in the regeneration tank 17, which is detected as previously described, the machine control system provides for closing the valve 20.

In this way, the tank 17 is filled with the necessary water for regeneration, already softened, to be heated and degassed according to the above procedures, in order to perform the regeneration phase at the appropriate time.

In order to supply water to the tub, the control system will then provide for the opening of the valve 13, so that the remaining water contained in the tank 26 and duct 8 may reach the wash tub 1 through the duct 12; this operating condition of the machine is represented in FIG. 8.

Alternatively, the water intake of the tanks 26 and 17 can take place performing a reverse sequence with respect to the previous one, as follows.

The machine control system will only have the valves 9 and 20 opened, to let water entering from the duct 8 flow in the tank 26, flow over in the decalcifier 10 and then reach the tank 17 through the duct 19, being it unable to flow in the ducts 12 and 14 since the valves 13 and 15 are closed. Upon reaching the predetermined level for the tank 17, which is detected as described above, the machine control system provides for closing the valve 20 and leaves only the valve 9 open. In this way, the tank 17 will be filled with the required regeneration water, already softened, to be heated and degassed as previously described in order to perform the regeneration phase at the appropriate time.

On the other hand, the further water entering from the main will gradually fill the tank 26; upon reaching the predetermined level for the tank 26, detected for example through a float-microswitch system as previously described, the machine control system will provide for closing the valve 9.

Also in this instance, in order to ensure water supply in the tub, the control system will provide for opening the valve 13, so that the contents of the tank 26 and duct 8 reach the wash tub 1 through the duct 12; this operating condition of the machine is represented in FIG. 8.

It is clear that, for the first one of the two possible operating procedures described above for the embodiment represented in FIG. 7, the capacity of the tank 26 will be chosen for containing an amount of water being sufficient for filling the regeneration tank 17 and performing a wash phase in the tub; vice-versa, for the second operating procedure described above, the total capacity of the tank 26 will allow to contain an amount of water being sufficient for performing a wash phase in the tub.

Anyway, nothing hinders to realize the metering of the water being necessary for washing to be admitted to the tub 1 by means of a series of subsequent supplies and discharges of the tank 26, in which instance the capacity of the tank 26 may equal a fraction or portion of the total quantity of water required for performing a wash phase in the tub.

It has to be pointed out that, above all in the event of the tanks 17 and 26 being integrated in one sole device, how a partial heating of the contents of the tank 17, due to a thermal exchange of the tub 1, and its likely final heating through the heating means H, is preferably performed when the contents of the tank 26 has already been emptied into the tub.

This in the aim of avoiding even a partial heating of the water contained in the tank 26, not submitted to degassing, which by flowing in the decalcifier 10 might contribute to the above cited oxidation of the resins R.

Additionally, instead of performing a metering function of the wash water, the tank 26 may be provided only to the purpose of ensuring that the supply system from the main will not be affected negatively by the network pressure and/or possible charge losses of the machine hydraulic system (air break, decalcifier, ducts, etc.).

Always with reference to the water supply system to the tanks 17 and 26 of FIG. 7, it is still underlined how the detection of the required water amounts could be determined through an appropriate flow or flow-rate sensor, such as turbine like, appropriately connected to the machine control system, instead of using level sensors located in the tanks. By way of example, such a flow sensor is indicated with 27 in FIGS. 7–10.

In such an event, for the filling of the tanks 17 and 26 the machine can operate as follows.

The machine control system will only provide for the opening of the valves 9 and 20, to let a predetermined amount of water to enter the hydraulic circuit of the machine, substantially equal to the amount of water required for filling the tanks 17 and 26, the duct 8 downstream the tank 26, the decalcifier 10, the duct 19 and the length of the duct 12 being upstream the valve 13; the value of such an amount of water is properly coded within suitable memory means of the machine control system (in the specific instance, an electronic control system).

The achievement of the above predetermined volume is detected by the flow sensor 27, which is connected to an appropriate input of the electronic control system; in other words, the control system will compare the gradually increasing value signalled by the sensor 27, and compare it with the preset value stored in the control system itself. When the two values coincide, the control system provides for closing the valves 9 and 20.

Therefore, in the hydraulic circuit of the machine it will be supplied the quantity of water being necessary for regeneration of the resins R, contained in the tank 17, and the quantity of water being necessary for the wash phase, contained in the tank 26.

The example previously described presumes that the tank 26, the duct 8 downstream the tank 26, the decalcifier 10 and the lengths of the duct 12 and 19 upstream the valves 13 and 20 contain all the water to be conveyed to the tub 1, as required for performing a wash phase. Should this not be the case, other possible examples of water supply to the tub are as the following.

EXAMPLE 1

Once the tanks 17 and 26 are filled as described above and the valves 9 and 20 closed, the machine control system provides for opening the valve 13 alone, so as to discharge all water contents of the tank 26, the duct 8, the decalcifier 10 and the lengths of duct 12 and 19 upstream the valves 13 and 20 into the tub 1.

Thereafter, the control system provides for opening the valve 9 and maintain the valve 13 open to allows a further water supply from the main, which will flow in the tank 26, the duct 8, the decalcifier 10, the duct 12 and then reach the tub 1.

According to this application, a second water quantity value is coded in the memory means of the control system;

this value substantially corresponds to the difference between the total amount of water to be supplied to the tub and the amount of water available in the tank 26, in the duct 8 downstream the tank 26, in the decalcifier 10 and in the lengths of ducts 12 and 19 upstream the valves 13 and 20.

Consequently, being the valves 9 and 13 open, the control system compares the gradually increasing value signalled by the sensor 27, and compares it with the said second value stored in the control system itself. When the two values coincide, the control system appropriately closes the valves 9 and 13, since the necessary amount of water has been supplied to the tub 1.

EXAMPLE 2

Once the tanks 17 and 26 have been filled as described above, and therefore when the quantity value detected by the flow sensor 27 equals the first value stored in the control system, the latter will provide for closing the valve 20 only, maintain the valve 9 in its open position and open the valve 13.

In this way, the water contents of the tank 26, the duct 8, the decalcifier 10 and the lengths of duct 12 and 19 upstream the valves 13 and 20 can be discharged into the tub 1, as well as the further water entering from the mains, which flows in the tank 26, the duct 8, the decalcifier 10, the duct 12 to finally reach the tub 1.

Also in this application, a second water amount value is coded in the memory means of the control system, substantially equalling the second value mentioned with reference to the previous example (difference between the total water to be supplied to the tub and the water available in the tank 26, the duct 8 downstream the tank 26, the decalcifier 10 and the lengths of ducts 12 and 19 upstream the valves 13 and 20).

Therefore, being the valves 9 and 13 open, the control system will compare the gradually increasing value signalled by the sensor 27, and compare it with said second value stored in the control system itself.

When both values coincide, the control system will appropriately close the valves 9 and 13, and in this way in the tub 1 the required amount of water will be supplied.

Apart from the type of water supply procedure used for filling the tanks 17 and 26 and/or the wash tub 1, the wash phases of the machine represented in FIGS. 7 and 8 can be obtained for example with similar procedures as previously described.

It should be remembered that, during the execution of said wash phases, the operation of the pump 4 is utilized for degassing the water contained in the tank 17 through the Venturi restriction 24 and the duct 25; similarly, the heat of the walls of the tub 1 produced during the hot wash phases is utilized for the partial heating of the water contained in the tank 17, as previously described; such an operating condition of the machine is represented in FIG. 9.

FIG. 10 shows the machine according to the embodiment described above during the regeneration phase of the resins R.

At a time prior to such a regeneration phase, if required, the machine control system completes the heating of the water contained in the tank 17, by activating the appropriate heating means H; upon reaching the preset optimal temperature for regenerating the resins R, as detected through appropriate temperature sensing means pertaining to S2, the control system deactivates the heating means H. Therefore, the regeneration phase is performed using the water heated as already described.

To this purpose, the machine control system will provide for opening the valves 20 and 15, whereas the valves 9, 11 and 13 are maintained closed by the control system.

The water contained in the tank 17, properly heated and degassed, is conveyed through the duct 19 to the duct 12; since during this phase the valve 13 is closed, the water is conveyed to the decalcifier 10 to flow across the resins R and then out through the duct 15.

Also in this case, the hot water used for regeneration purposes will flow counter-current across the resins R, i.e. in an opposite direction to the normal water utilized for washing, which comes from the duct 8 during normal water supply; as said, such a measure ensures an improved regeneration of the resins R.

Since the valve 15 is open, the water utilized for regeneration purposes is then conveyed through the duct 14' to the water drain duct of the tub 1, and discharged directly from the machine by means of the drain pump 6.

Finally, as regards the regeneration phases of the resins R, according to the various embodiments described, they are not necessarily performed for each wash cycle, but preferably less frequently, such as, for example, after a predetermined amount of water has been softened.

Another possible solution provides for the use of special water hardness detectors pertaining for example to the sensing means S1 and/or S2 of FIG. 7, which are utilized by the machine control system for checking the hardness degree of the water flowing out of the decalcifier 10.

In this case, the control system will for example perform the regeneration phase when the detected water hardness level exceeds a predetermined threshold, which indicates that the softening efficiency of the resins is approaching exhaustion.

Obviously, many other changes are possible for the man skilled in the art to the technical solution previously described with reference to FIGS. 1–10.

For example, at least a partial water supply of the tank 17 provided for containing the water for regenerating the resins R can be performed, by using the water unable to overcome the air break AB; in this frame, the machine may be fitted with special means for conveying the water to the tank 17.

According to another possible variant embodiment, a vacuum pump similar to the pump 21 of FIG. 1 or the Venturi arrangement 24–25 of FIG. 5, provided for degassing the water contained in the tank 17, may be connected also to the tank 26 and/or the decalcifier 10, so as to submit all water flowing through the resins R to the same treatment, in order to minimize any possible oxidation risks for them.

According to a further possible variant with reference to the embodiment of FIGS. 7–10, the duct 8 may provide a further known valve downstream the tank 26, which is provided to avoid likely turbulence during the water supply in the machine, which could bring air and/or oxygen to the resins with consequent oxidation problems.

To this purpose, in general terms, this additional valve will be closed during the various water filling of the tank 26, leaving the water to "decant", and subsequently open to let that same water to flow, without any turbulence, first to the decalcifier 10 and then to the tank 17 or tub 1; it is clear that in this case the machine control system will provide for appropriately opening/closing said additional valve coherently with the other valves of the system, for the execution of the various phases related to a wash cycle, adopting such procedures that are obvious for the man skilled in the art (for example, in general, the additional valve mentioned above will be open every time the valve 13 or valve 19 are open).

In a quite advantageous embodiment, several parts of the water supply and softening system described above may be integrated in one sole device; in this frame, the air break AB, the tank 17, the tank 26 when provided, the decalcifier 10 and the various valves described, with all the relevant associated elements (sensors, heaters, ducts, etc.) may be incorporated in a single unit made of thermoplastic material and inserted in the machine cabinet, on a side of the tub 1; however, it is obvious that not all mentioned parts need to be necessarily incorporated in one sole component.

It is also clear that the means H used for heating the water required for the regeneration, as well as the means 21 or 24–25 for degassing the same water may be of any known type, even being different from the ones previously described by way of example.

It is pointed out, by way of example, how instead of the pump 21 or Venturi arrangement 24–25, the tank 17 could be associated to an electric deoxygenator, in particular of the type wherein the oxygen dissolved in the water is electrochemically removed, as provided in WO-A-93/24412, the contents of which are herein incorporated by reference.

On the other hand, nothing hinders the use of other techniques for the intended purpose, such as a thermal degassing under particular pressure conditions, such as those indicated in the introductory section of WO-A-93/24412; it should be noticed, in that case, the water heating for regeneration purposes at the temperature required, as well as a relevant degassing, can be obtained at the same time and using the same means.

The tank 17 may be located directly near the bottom of the tub 1, where there is usually a heating element for the wash water, so as to exploit a higher thermal exchange for heating the water contained in the same tank 17.

Another possible variant related to the embodiments of FIGS. 7–10 consists in providing for a deoxygenating/degassing system as previously described on the tank 26 only, and therefore without the need of degassing in the tank 17.

In this frame, the hydraulic circuit may also be modified also for allowing the connection of the duct 8 to a hot water supply line as well, if required, with the consequent result of removing the tank 17.

In this event, in order to perform regeneration of the resins R, the hot water required to this purpose can be supplied directly from the external mains network, and then degassed in the tank 26 for its subsequent conveyance to the decalcifier 10, according to known procedures.

Other variant embodiments refer to the use of known dual-impeller pumps, in order to perform two different functions at the same time; in this frame, for example, a second appropriate impeller associated to the pump 4 or 5 may be used also for the required degassing of the contents of the tank 17, without requiring the pump 21 or the Venturi arrangement 24–25.

Figure 11:
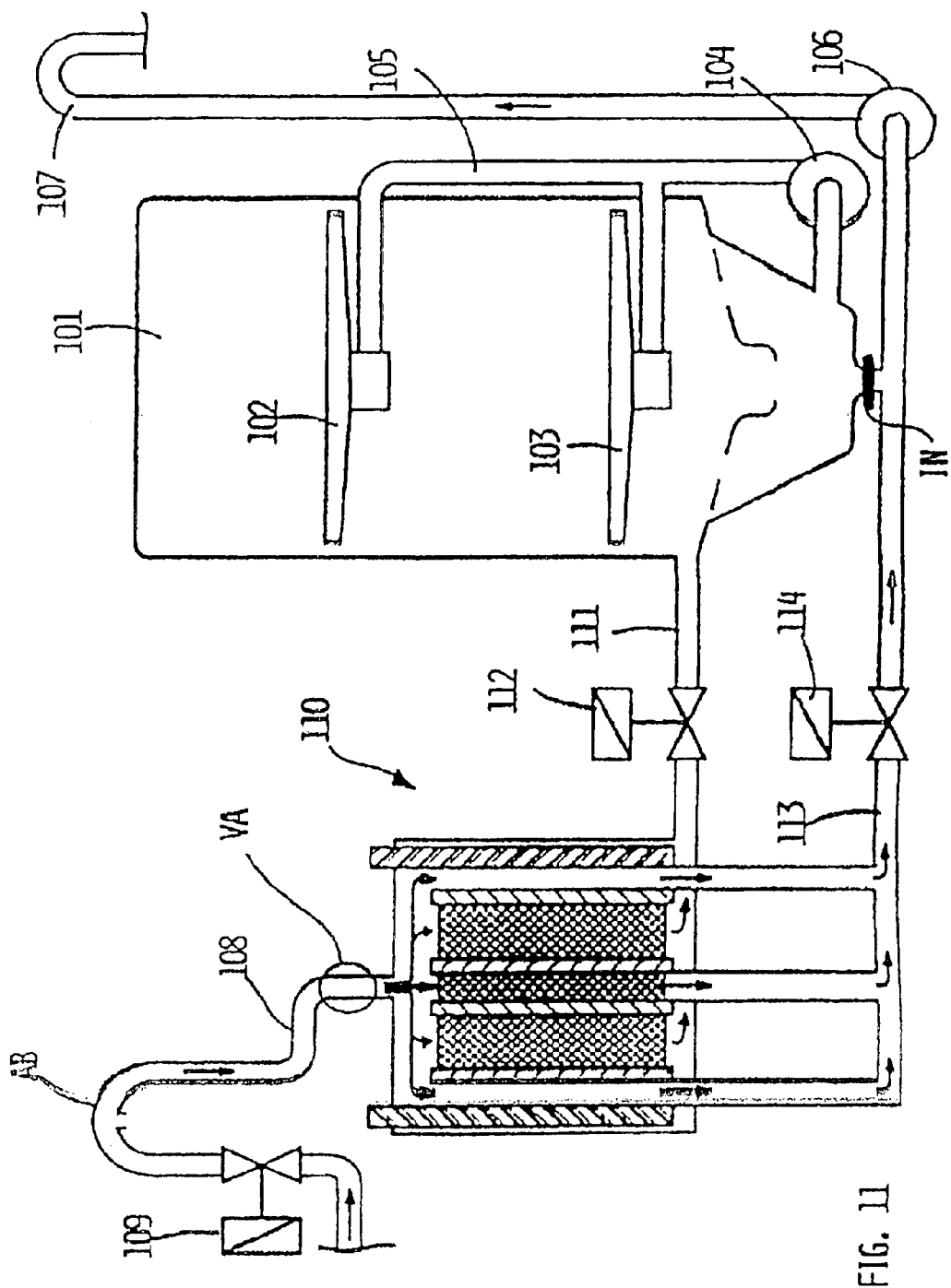
FIGS. 11 to 20 show basic diagrams of some embodiments of a household appliance utilizing water, according to a second possible technical solution according to the present invention.
Figure 12:
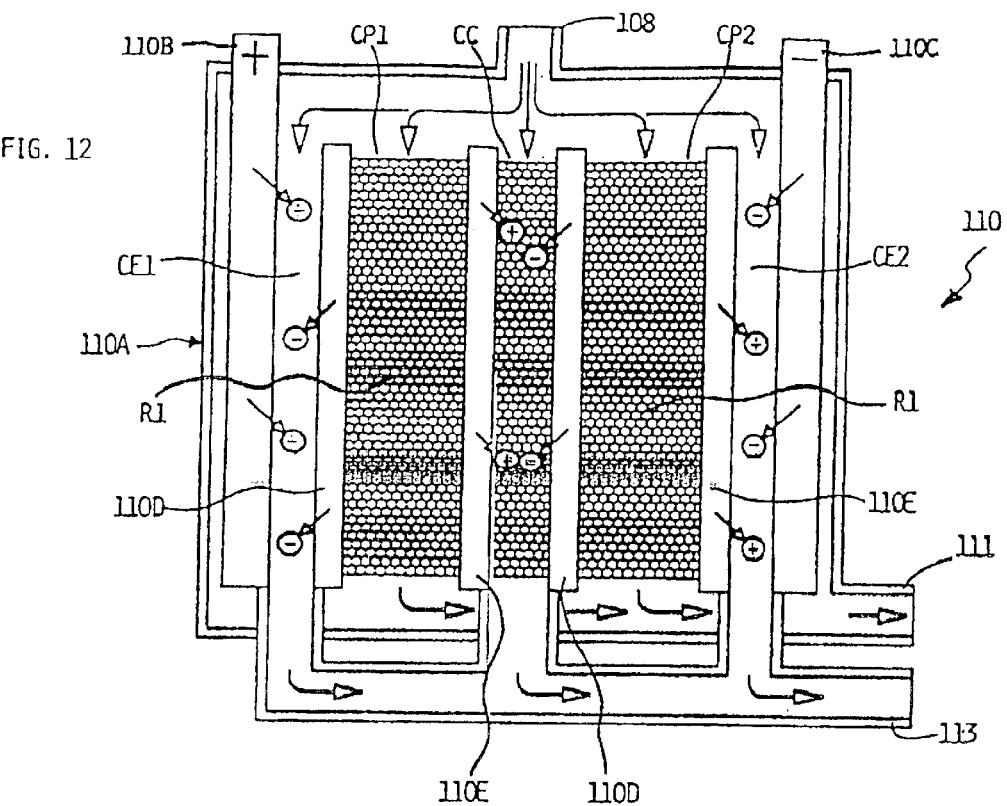
Figure 14:
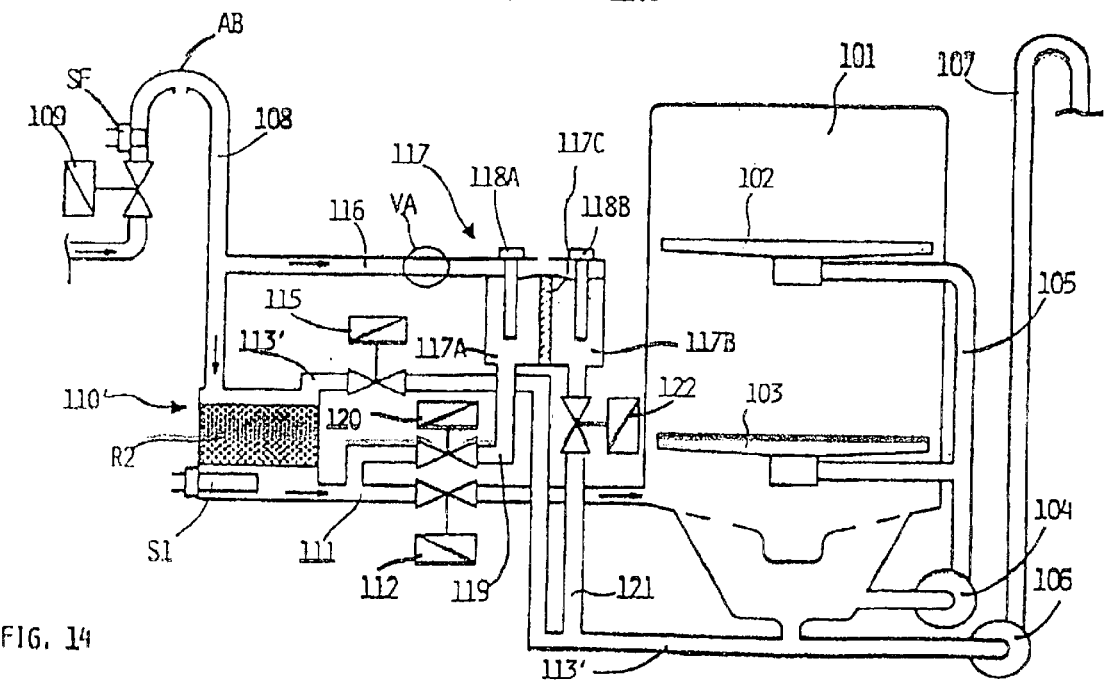
Figure 13:
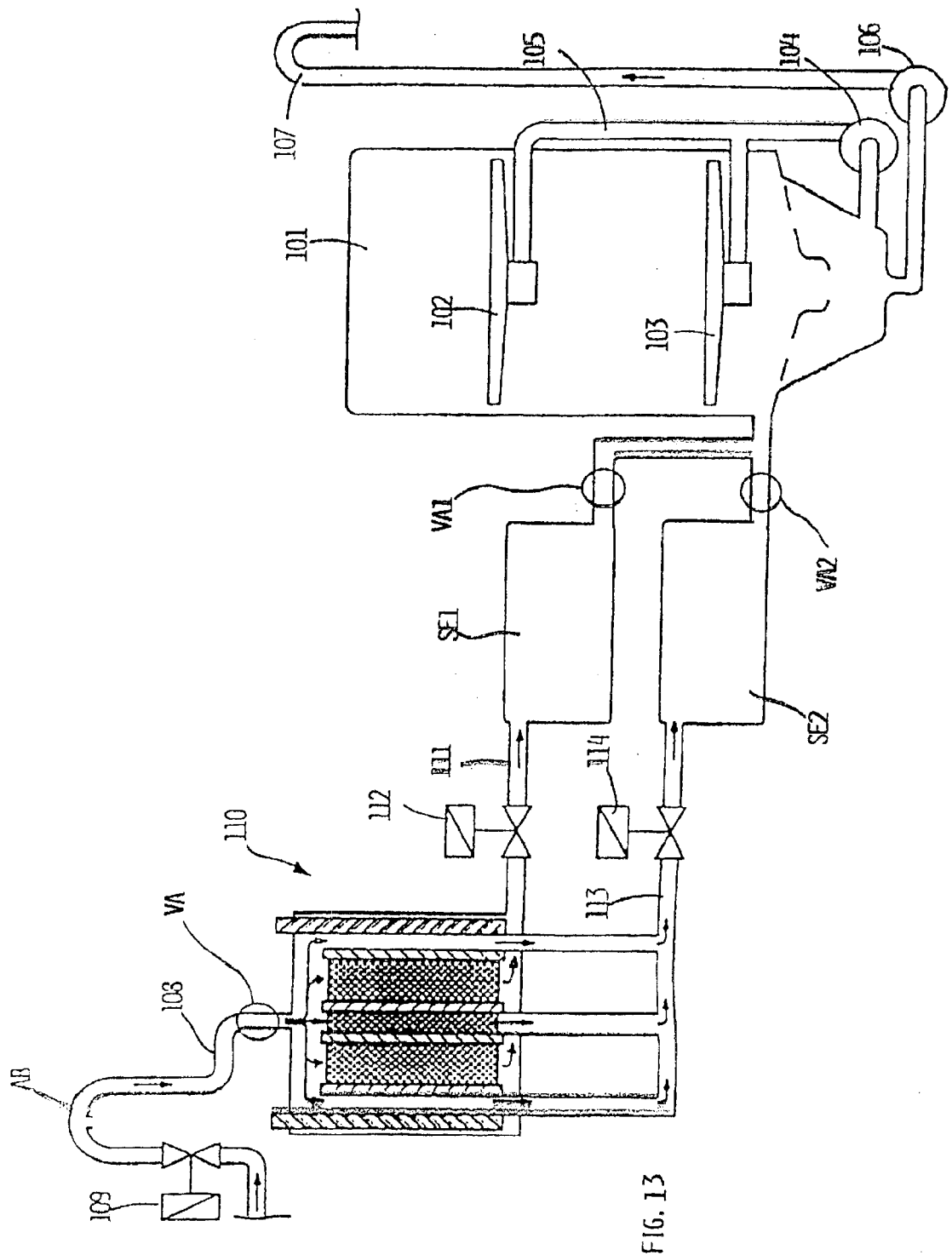
Figure 15:
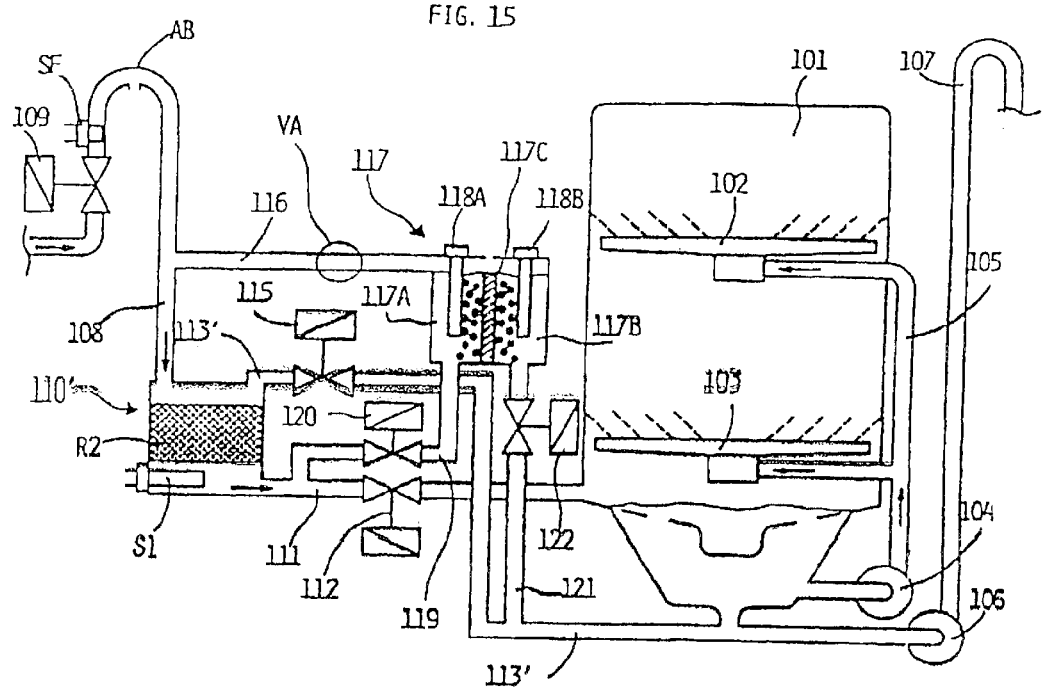
Figure 16:
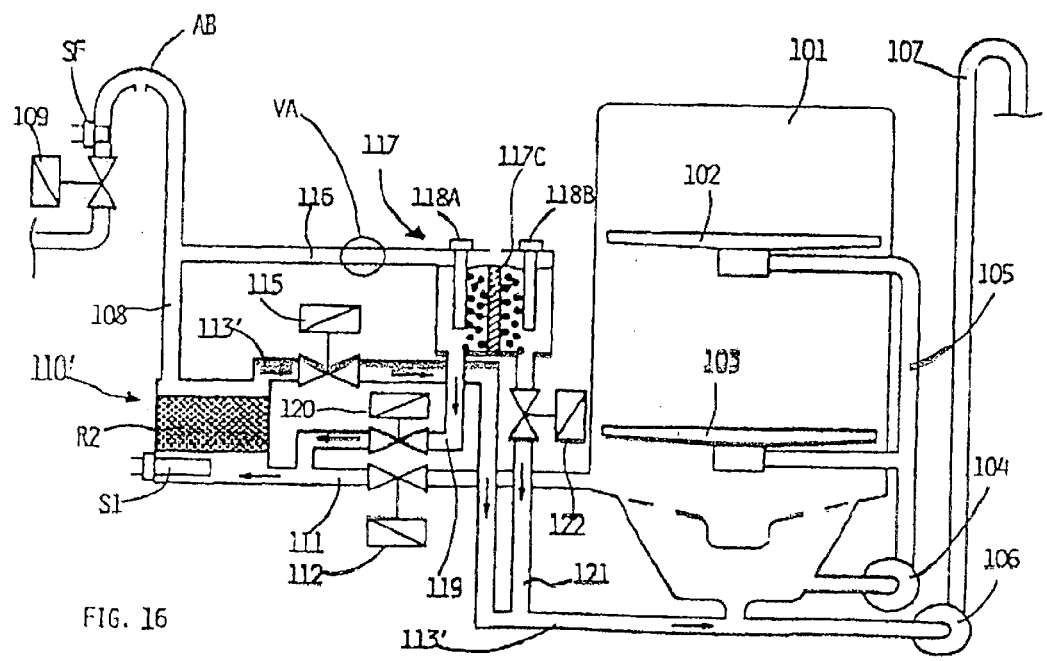
Figure 17:
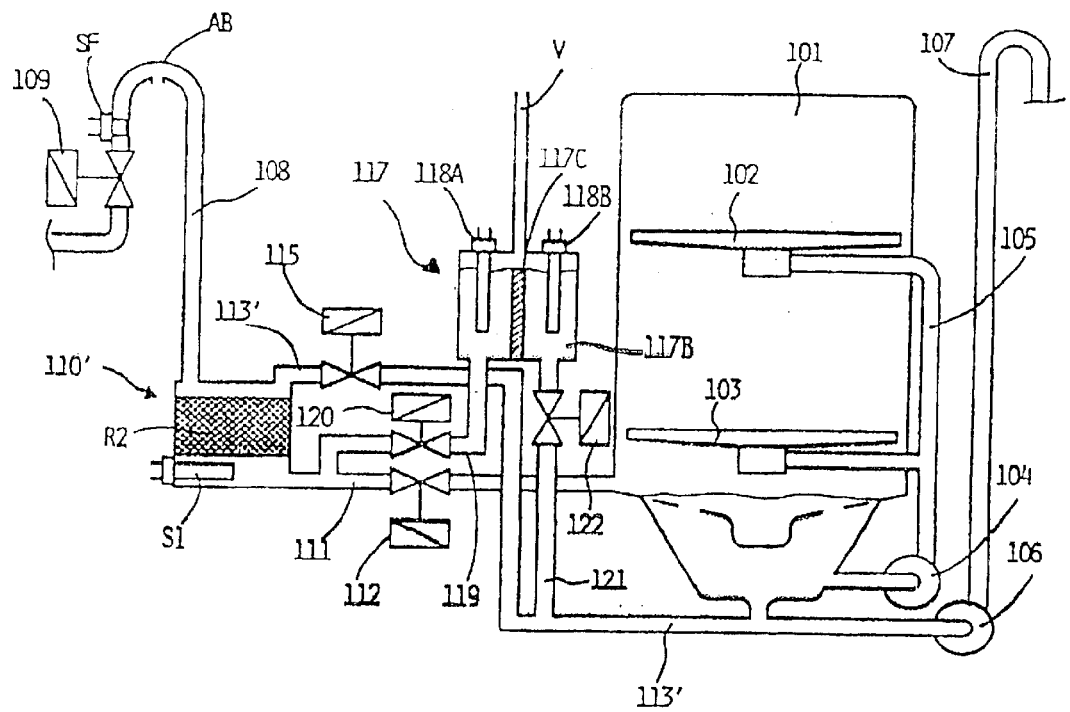
Figure 18:
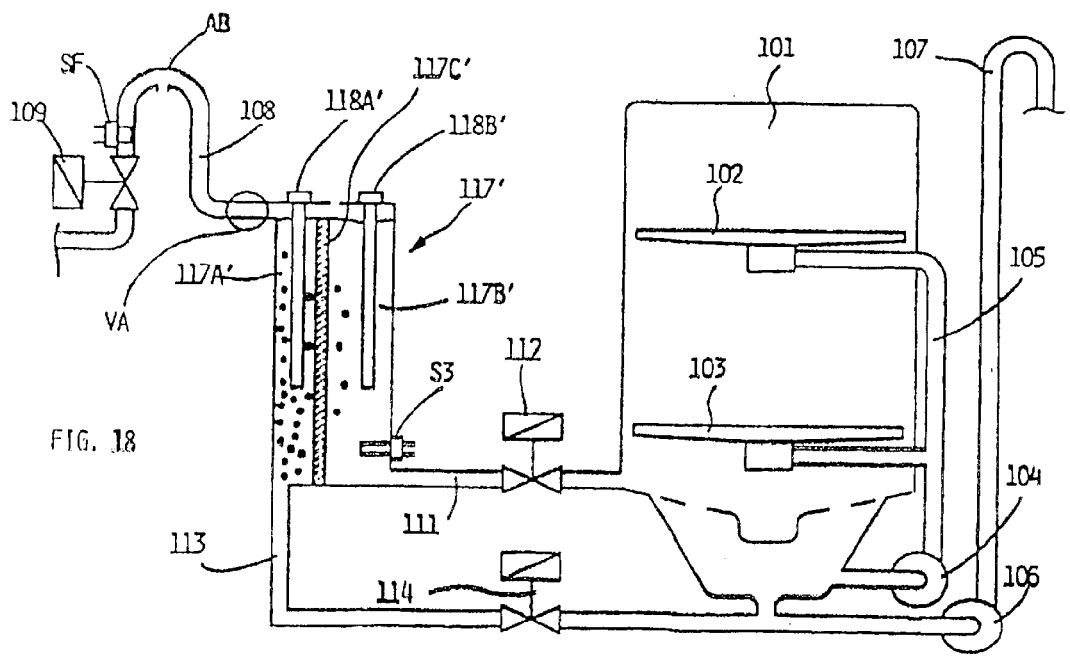
Figure 19:
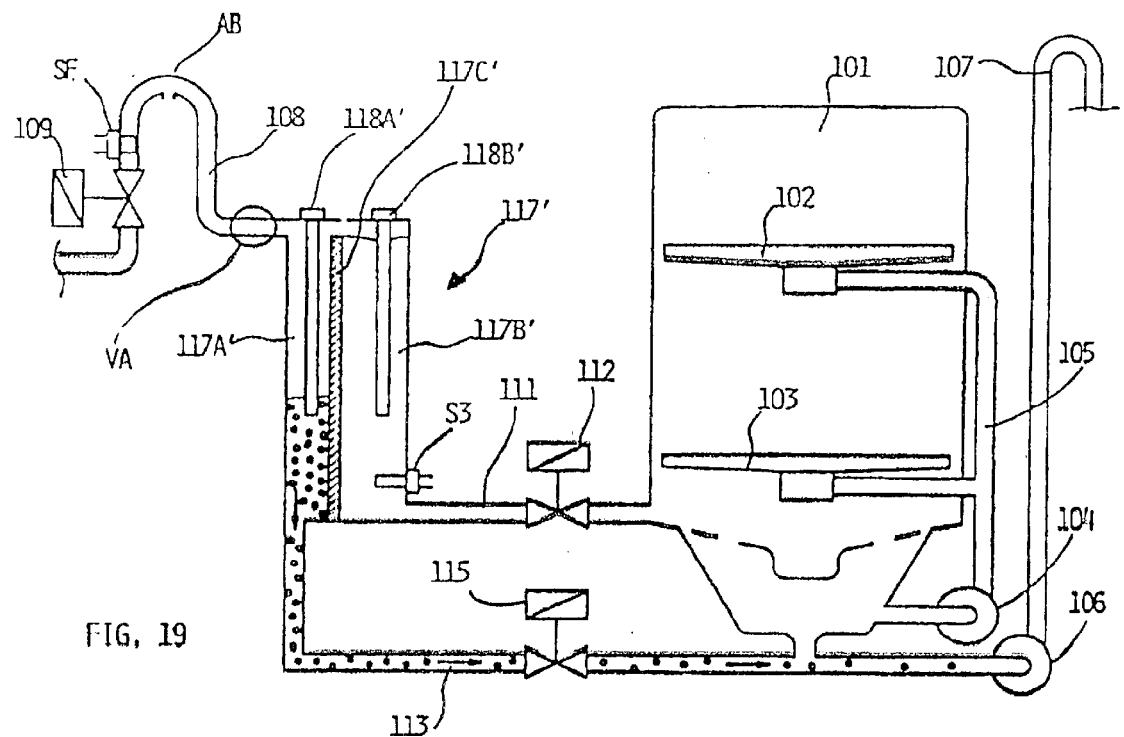
Figure 20:
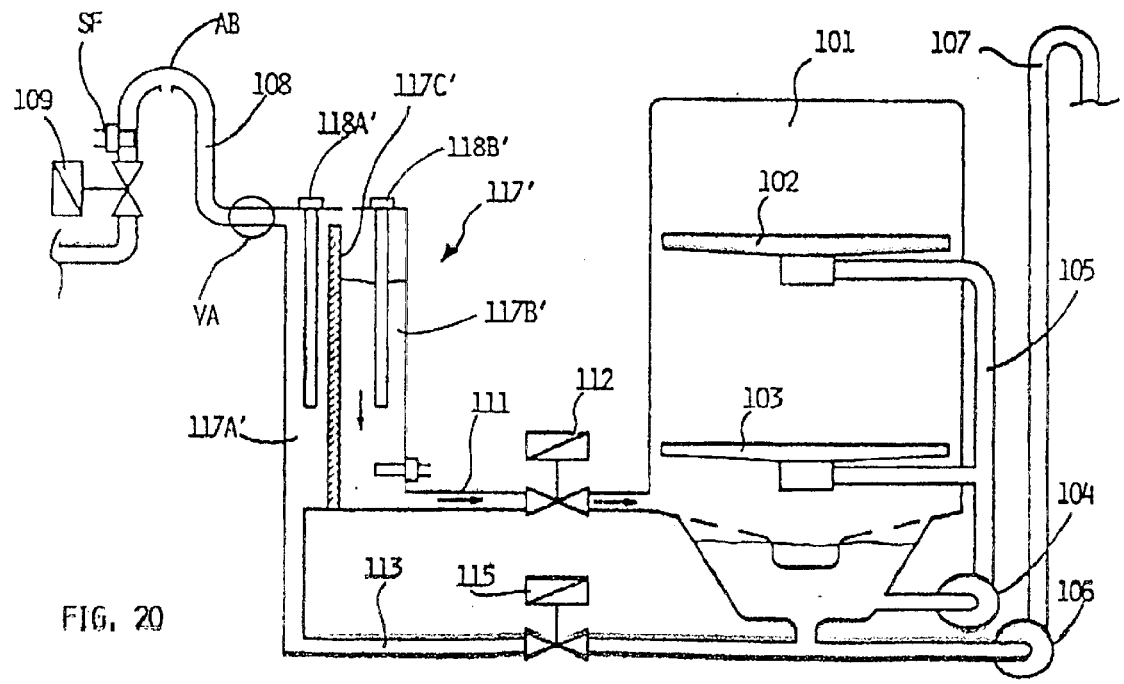

FIGS. 11–20 represent basic diagrams of some embodiments of a washing machine according to the present invention, whose water decalcifier system is based on the use of at least an electrochemical cell. In particular:

FIG. 11 shows the basic diagram of a further possible embodiment of the washing machine according to the present invention, in a first operating condition;

FIG. 12 shows a detail of a component of the machine represented in FIG. 11;

FIG. 13 shows the diagram of a possible variant of FIG. 11;

FIG. 14 shows the basic diagram of a further embodiment of the washing machine according to the present invention, in a first operating condition;

FIG. 15 shows the basic diagram of the washing machine represented in FIG. 14, in a second operating condition;

FIG. 16 shows the basic diagram of the washing machine represented in FIG. 14, in a third operating condition;

FIG. 17 shows the basic diagram of a possible variant of the washing machine according to the embodiment of FIG. 14;

FIG. 18 shows the basic diagram of a further possible embodiment of the washing machine according to the present invention, in a first operating condition;

FIG. 19 shows the basic diagram of the washing machine represented in FIG. 18, in a second operating condition;

FIG. 20 shows the basic diagram of the washing machine represented in FIG. 18, in a third operating condition.

It should be noticed that systems for the electric deionization of liquids are known, and used in combination with further treatment systems (filtering, reverse osmosis, etc.), for producing very pure water, i.e. with a minimum concentration of organic and mineral substances media, typically for laboratory use; in this frame, electric deionization systems offer a valid alternative to the more traditional distillation processes, which involve a clearly higher water consumption and decidedly longer treatment times.

Quite schematically, in the known electrodeionization systems, the fluid to be treated is conveyed in continuous in a plurality of channels placed side by side, being delimited by special membranes, whereas some of said channels contain ionic exchange resins; some channels containing the resins are connected to an outlet for the "purified" fluid, while the remaining channels are connected to an outlet for the "polluted" fluid; moreover, a direct electric voltage is applied to the fluid by means of two electrodes between which the various channels are defined. For operation purposes, the fluid flowing across the channels containing the treatment resins is deionized by the latter (which provides for retaining both anions and cations); the simultaneous application of the electric current causes the anions and cations tied with the resins to migrate towards the anode and the cathode, respectively; doing so, these ions reach the channels connected to the outlet of the polluted fluid, i.e. enriched with ions, so as to be discharged.

Therefore, as it can be noticed, the system described above does not require the use of any special regenerating media for the treatment resins, since their effectiveness is constantly restored by the application of the electric voltage and the consequent ions migration.

According to the present state of the art, washing machines fitted with electrochemical cells for reducing water hardness are not known; vice-versa, solutions are known where a different type of electrochemical cell is paired to the conventional decalcifying system of a washing machine.

In such solutions, the container for the salt required for regenerating the water softening resins is connected to the electrochemical cell, which is connected in turn to the wash tub; in this way, some brine can be periodically conveyed to the cell, from which, following an electrolytic process, sodium hypochlorite or chlorine gas is produced, used as a cleaning and disinfectant agent for the crockery.

Therefore, as it can be seen, in these solutions the above electrochemical cell is not used for the decalcification of the water being necessary for the machine operation, which presumes necessarily on the contrary the presence of a conventional softening system, i.e. comprising a container for the salt required for the regeneration of the ionic exchange resins.

In FIG. 11, reference 101 indicates schematically a treatment chamber or wash tub of a washing machine realized according to the present invention.

In the given example, such a washing machine consists of a generic dishwasher, whose tub 101 has wash fluid spraying means, which are represented by two known rotary spraying arms 102 and 103; reference 104 indicates a wash pump for picking up the wash liquid from the tub bottom 101 and convey it through an appropriate duct 105 to the arms 102 and 103.

Reference 106 indicates a drain pump for discharging the liquid supplied to the machine; to this purpose, an appropriate discharge pipe 107 is connected to the outlet of the pump 106.

Reference 108 indicates a duct for the water supply from a household water mains, fitted with a supply valve 109; this valve 109 is of the known type and controlled by the control system (not shown in the figures) of the machine according to the present invention, which is provided for allowing the supply of the fresh water being necessary for the washing according to appropriate times and procedures.

The duct 108, downstream the valve 109, has a so-called air break device, indicated with AB.

Reference 110 indicates as a whole a decalcifier device of the electro-deionization type, comprising ionic exchange resins, as described in detail with reference to FIG. 12; the decalcifier 110 has an appropriate inlet connected to the duct 108; a valve VA is provided on such an inlet, whose function will be described later.

A first duct 111 departs from the decalcifier 110, which is connected at its other end to the tub 101, whose primary function is to convey the water from the mains and softened through the decalcifier 110 to the tub; as it can be seen, a second valve 112, of the known type, is also provided on this duct 111, which is controlled by the machine control system for the purposes to be further described.

A second duct 113 also departs from the decalcifier 110, which is connected to the drain outlet of the tub 101; the other end of this duct 113 is connected to the suction pipe of the drain pump 106; the second duct 113 upstream the drain outlet of the tub 101 has a third valve 114, of the known type and controlled by the machine control system.

IN indicates a generic intercepting device, being of known realization, located between the drain outlet of the tub 101 and the duct 113.

As it will be clear in the following, the duct 113, the valve 114 and the intercepting device IN are utilized for draining the water used for the regeneration of the ionic exchange resins being present in the decalcifier 110.

It should be noticed that the various valves of the system described above are of the normally closed type; therefore, for the purposes of the present description, they have to be considered in a closed condition, save if otherwise specified.

The decalcifier 110 may comprise appropriate sensing means, not shown in the figures, for detecting some operative parameters, such as conductivity, water hardness and pH degree of the water entering and flowing out of the decalcifier 110.

FIG. 12 represents in a more detailed way the decalcifier 110, which comprises a body 110A, for example being realized in thermoplastic material.

Within the body 110A, at its two lengthwise ends, respective electrodes are arranged, and namely a positive electrode or anode indicated with 110B, and a negative electrode or cathode, indicated with 110C.

Appropriate membranes of known type are arranged between the anode 110B and cathode 110C, for defining a series of channels within the body 110A.

In particular, 110D indicates membranes permeable to anions, i.e. the ions having a negative electric charge, which in the course of an electrodialysis process or anyway under the effect of an electric current or voltage migrate to an anode; 110E indicates on the contrary membranes permeable to cations, i.e. the ions having a positive electric charge, which in the course of an electrodialysis process or anyway under the effect of an electric current or voltage migrate to a cathode.

As it can be seen, the membranes 110D are alternated to the membranes 110E, so as to define within the body 110A:

two channels for the electrodes, indicated with CE1 and CE2, extending substantially between the anode 110B and a membrane 110D, and between the cathode 110C and a membrane 110E, respectively;

at least a concentration channel, indicated with CC, delimited by a membrane 110E and a membrane 110D;

at least two purification channels, indicated with CP1 and CP2, extending between a membrane 110D and a membrane 110E; in particular, the channel CP1 extends from the membrane 110E delimiting one side of the channel CC to the membrane 110D delimiting one side of the channel CE1, whereas the channel CP2 extends from the membrane 110D delimiting one side of the channel CC to the membrane 110E delimiting one side of the channel CE2.

In the example shown in the figures, the resins R1 are arranged within the purification channels CP1–CP2 and the concentration channel CC; these resins comprise in particular a mixture or mixed bed of anionic exchange resins and cationic exchange resins; preferably, the balls of the two types of resin are substantially equal in dimensions and/or specific weight, in order to avoid their laying one on top of the other, without mixing together.

According to a significant aspect of the present invention, the cationic resins used in the decalcifier 110 are resins of the H+ type, whereas the anionic resins provided in the same device are resins of the OH—. It should be underlined that conventional softening systems for washing machine use cationic resins of the Na+ type and/or anionic resins of the Cl— type.

Moreover, the provision of a mixed bed of cationic resins of the H+ type and anionic resins of the OH— type is considered preferable, so that, from the regeneration process further described, it will result a substantially neutral water, being not too acid, as it would occur if using on the contrary only cationic resins.

Back to FIG. 12, the electrodes channels CE1 and CE2 and the concentration channel are connected on their lower end to the duct 113; the purification channels CP1 and CP2 on the contrary are connected on their lower end to the duct 111.

The machine described above operates as follows.

FIG. 11 illustrates a water supply condition from the mains to the tub 101; this phase may represent for example the first supply phase provided by a standard wash cycle of the machine according to the present invention.

To this aim, the machine control system provides for opening the valves 109, VA, 112 and 114, and maintain closed the intercepting device IN. Simultaneously to the opening of the above valves, the machine control system also provides for applying a direct electric voltage between the anode 110B and cathode 110C of the decalcifier 110, and supply the discharge pump 106, either intermittently or continuously.

In this way, the water supplied from the mains can flow in the duct 108, overcome the air break AB and flow to the electrochemical cell realized by the decalcifier 110.

The portion of water unable to overcome the air break AB is conveyed for example in a known way inside the tub 101; this water will not be softened but it should be considered that its volume is quite restricted and such not to affect the wash quality negatively.

Water entering the decalcifier 110 is free to flow in the channels CP1 and CP2, so that the resins R1 may soften it as required; in particular, the portion of cationic resins of the H+ type present in the channels CP1 and CP2 will capture the calcium and magnesium cations of the water from the mains. The softened water will then reach the tub 101 through the duct 111 and the machine control system subsequently activate the wash pump 104, which in turn sends the softened water to the sprayer arms 102 and 103.

On the other hand, the water entering the decalcifier 110 which flows in the channels CE1, CE2 and CC is used for regenerating the softening resins R1, as follows.

The electric current flowing through the decalcifier 110 induces the migration to the cathode 110C, through the membranes permeable to the cations 110E, of the calcium and magnesium cations captured by the resins R1; the likely anions migrate on the contrary to the anode 110B through the membranes permeable to the anions 110D under the action of the electric current.

In this circumstance, the membranes permeable to cations 110E hinder the anions from proceeding to the anode 110B, and the membranes permeable to anions 110D hinder the cations from proceeding to the cathode 110C.

Therefore, this process leads to an increased ions concentration inside the concentration channel CC and in the electrode channels CE1 and CE2. In particular, in relation to the objects of the present invention, calcium and magnesium cations originally captured by the resins R1 present in the purification channels CP1 and CP2 will gradually transfer themselves to the concentration channel CC and the channel CE2 of the cathode 110C.

Due to the opening condition of the valve 114 and the closure condition of the intercepting device IN, the water flowing through the channels CE1, CE2 and CC is free to flow through the duct 113 to the drain pump 106, to be discharged from the machine through the duct 107.

In main line it can be seen how the flowrate of the softened water produced by the decalcifier 110 is higher than the flow of the calcareous water exiting the channels CE1, CE2 and CC.

The precise metering of the softened water inside the tub 101, with the relevant closure of the valves 109, VA, 112 and 114, can be obtained with any known technique, for example through the use of a standard pressure-switch or turbine flowmeter, or by means of metering tanks or dosing containers for the wash water of known type and operation.

Moreover, it should be noticed that once the supply of the necessary amount of water to the tub 101 is completed, the control system will stop application of the above voltage between the electrodes 110B and 110C and close the valves 112 and 114, along with the valves 109 and VA; thus, all the various channels of the decalcifier 110 remain practically filled with water.

According to a further significant aspect of the present invention, the valves VA and 112, 144 are provided, in fact, to ensure -that during the rest phases, a certain amount of water is always maintained inside the decalcifier 110, so as to have the membranes 110D and 110E always immersed in water; this is to avoid that the membranes may become dry and consequently deteriorate; the same purpose may be reached with other suitable known means, such as the use of siphons.

Crockery washing is performed with known procedures, followed by the liquid drain; this is obtained through the opening of the intercepting device IN and activating the pump 106.

It should be noticed that the presence of resins R1 in the concentration channel CC has the function of intensifying by osmotic pressure the transfer of cations and anions through the central membranes; however, it is clear that the system described above can operates efficiently also if no resins are present within said concentration channel CC.

Additionally, in the example previously described, the resins R1 comprise a mixture of anionic resins and cationic resins; this will prove useful when substantially neutral water from the decalcifier 110 is desired.

It should be considered, on the other hand, that for the purposes of the present invention, the provision of cationic resins of the H+ type alone would be sufficient, considering that only positively charged ions need to be removed from the water required for washing, such as calcium and magnesium ions usually present in the water used by household appliances, which are responsible for calcareous deposits.

Obviously, for such a case, the structure of the decalcifier 110 might be modified accordingly, and in particular simplified with respect to the one previously described.

In the example given above, water supply to the tub 101 has been presumed to be directly performed and metered by known means; as mentioned, these systems may be of different types, such as a known pressure-switch inside the wash tub or appropriate flow or flowrate meters along at least one of the ducts 108 and/or 111.

In a possible variant implementation to the present invention, the water flowing in the decalcifier 110 may be stored in appropriate tanks, for its utilization and/or discharge at later times, instead of flowing directly into the tub 101 and/or to the pump 106; such a variant implementation is illustrated by way of example in FIG. 13.

In this figure, SE1 indicates a tank located on the duct 111, for accumulating the water softened in the channels CP1 and CP2 of the decalcifier 110, whereas SE2 indicates a tank for collecting the water utilized for the regeneration of the resins R1 and flowing in the channels CE1, CE2 and CC of the same decalcifier, located on the duct 113.

Moreover, in this figure VA1 indicates a valve located on the duct 111, at the outlet of the tank SE1, whereas VA2 indicates a valve located on the outlet duct of the tank SE2, the latter being connected to the duct 111 or directly to the tub 101; as it can also be seen, the embodiment of FIG. 13 has no longer an intercepting device IN.

The variant implementation of FIG. 13 operates in the same way as previously described with reference to FIGS. 11 and 12, as to water softening and regeneration of the resins R1, but with a different management of the flows exiting the decalcifier.

In particular, according to the proposed implementation, the contents of the tank SE2 can be exploited for performing determined phases provided by a wash cycle, such as when these phases are performed with cold water, or anyway with water having a temperature being below the lime precipitation threshold (typically, lime contained in the water does not precipitate at a temperature below 57° C.).

An example of such an application is as follows.

Let us assume to be at the start of a wash program, and that under such a circumstance the tank SE1 is empty and the tank SE2 is full of water.

Following the start of the wash cycle, the machine control system provides for opening the valve VA2; the contents of the tank SE2 flows to the wash tub 101 and is used for performing the first cold wash phase.

This first phase or prewash can be performed using the water contained in the tank SE2 notwithstanding its high concentration of dissolved calcium and magnesium salts, deriving from the regeneration process of the resins R1, as previously described; this in view of the fact that such a prewash phase is performed with cold water, that lime precipitates only above a certain temperature threshold of the liquid and that prewash phases are usually provided for removing most of the soil adhering to the crockery, mainly through a mechanical action.

Once the tank SE2 has been discharged, the valve VA2 is made to close and the machine performs the cold prewash phase; simultaneously with the execution of this prewash phase, the machine control system enables the opening of the valves 109, VA, 112 and 114, so as fresh water is supplied to the decalcifier 110, and from it to the tanks SE1 and SE2. Obviously, during this phase, the machine control system will also control application of the above voltage between the electrodes 110B and 110C, for performing water softening and regeneration of the resins R1, as previously described.

Thus, while the machine is performing the prewash phase, both tanks SE1 and SE2 will be supplied with softened and calcareous water, respectively.

At prewash end, the control system will discharge the water utilized during that phase from the tub 101, by activating the pump 106.

Following deactivation of the pump 106, the control system will open the valve VA1, for supplying softened water to the tub and perform the second hot phase of the wash cycle, which is executed according to known procedures.

If the tank SE2 has enough capacity, during that second phase of the wash cycle the machine control system is able to control a new water supply in the machine, with a simultaneous decalcifying and resins regeneration process, according to the procedures previously described, so as to take further softened water to the tank SE1 and calcareous water to the tank SE2, which will be used in the subsequent cycle phases (obviously, the contents of the tank SE2 will be used for those phases providing no water heating up to a temperature threshold exceeding the lime precipitation temperature, such as rinse steps with lukewarm or cold water).

Of course, the above system for timely water supply/discharge of the tanks SE1 and SE2 can be optimized with procedures that are obvious for the man skilled in the art, even if differing from the ones previously described by way of example; in this connection, for example, the capacity of the tanks SE1 and/or SE2 may be such to contain a sufficient amount of water for performing several phases of a wash cycle.

In another possible embodiment, the tank SE1 may be omitted and only the tank SE2 be provided; in this event, therefore, the water softened by the decalcifier 110 would be introduced directly into the tub, whereas the calcareous water can be supplied to the tub only during the drain operations of the machine, for its evacuation; therefore, also in agreement with this embodiment, the intercepting device IN can be omitted.

Moreover, theoretically, the metering of the water being necessary for the washing to the tub 101 can be obtained through a series of subsequent water supply and discharge cycles of the tanks SE1 and/or SE2, in which case the capacity of such tanks may be equal to a fraction or portion of the total amount of water required for performing a wash phase in the tub.

Therefore, for such applications the machine control system provides for opening the valves 109, VA, 112, 114, VA1 and/or VA2, so as to obtain a gradual filling of the tanks SE1 and SE2; once they have been filled, as detected through a sensing system, e.g. a float-microswitch, the control system provides for the valves 109, VA, 112 and/or 114 to close, so as to have a volumetrically defined amount of water in the above tanks and the relevant lengths of the duct 108, 111 e 113; then the control system will provide for the valve VA1 and/or VA2 to open, to let the water reach the tub 101.

It is clear that, according to the capacity chosen for the hydraulic circuit previously described, the above sequence may be repeated, and different combinations of the mentioned means and/or operative procedures worked out.

FIGS. 14, 15 and 16 illustrate a further possible embodiment of the present invention, where the same reference number of the previous figures are used to indicate technical equivalent elements.

In this instance, the machine according to the present invention has a decalcifier 110' substantially similar to conventional decalcifiers; however, according to the present invention and differently from the present state of art, the resins R2 contained in the decalcifier 110' are cationic resins of the H+, instead of being of the Na+ type.

Reference 116 indicates a duct departing from the duct 108 at an intermediate location between the air break AB and the decalcifier 110', and ending in a collecting tank indicated with 117; the duct 116 has a valve VA, whose functions have been previously described.

This tank 117 is divided in at least two separate chambers 117A and 117B, by means of a wall 117C permeable to ions, preferably being constituted by a membrane of the bipolar type; also this type of membranes is known as such and does not require a description herein; it will be enough to point out that membranes of the bipolar type have at least a portion being permeable to anions and at least a portion being permeable to cations.

An electrode is housed in each chamber; in particular, the chamber 117A houses a cathode 118A, whereas the chamber 117B houses an anode 118B.

A duct 119 departs from the lower portion of the chamber 117A; the other end of this duct 119 is connected to the duct 111 in an intermediate location between the relevant outlet from the decalcifier 110' and the valve 112 (or directly to the decalcifier 110'); a known valve 120 controlled by the machine control system is provided on the duct 119.

From the lower portion of the chamber 117B a duct 121 departs, which is connected to a drain duct indicated with 113', being in communication with the pump 106; at an intermediate location, the duct 121 has a valve 122 of the known type and controlled by the machine control system. As it will be seen later, the tank 117, the ducts 119 and 121 and the valves 120 and 122 are provided for containing and treating water required for the regeneration of the resins R2 contained in the decalcifier 110', and convey it to the latter according to appropriate times and procedures. The decalcifier 110' may comprise first sensing means schematically indicated with S1, which are provided for detecting some operative parameters, such as conductivity, water hardness degree and temperature of the water flowing out from the decalcifier 110', and its pH degree.

From the decalcifier 110' the above cited duct 113' also departs; in an intermediate location between the decalcifier and the outlet of the tub 101, on said duct 113', a valve 115 of the known type is present, controlled by the machine control system. As it will become apparent later, also the duct 113' and the valve 115 are used for regenerating the resins R2 contained in the decalcifier 110'.

The machine shown in FIG. 14 operates as follows.

FIG. 14 represents a water supply condition from the mains to the tub 101 and the tank 117; this phase may be for example the first supply phase provided by a standard wash cycle of the machine according to the present invention.

To this purpose, the machine control system provides for opening the valves 109, VA and 112 and maintaining the valves 115, 120 and 122 closed.

In this way, the water supplied from the mains can flow along the duct 108, overcome the air break AB, flow partially to the decalcifier 110' and partially to the tank 117, through the duct 116. The water conveyed to the decalcifier 110' flows across the resins R2, so as to be softened, and then further proceeds to the wash tub 101, through the duct 111; the control system will subsequently activate the wash pump 104, which sends the softened water in turn to the sprayer arms 102 and 103.

A precise metering of the softened water within the tub 101 can be obtained through any known technique, such as a standard pressure-switch or turbine flow meter (indicated with SF in FIGS. 14–16), or through metering tanks or containers for the wash water, whose type and operation is known as such.

While the valve VA is open, the water flowing along the duct 116, after overcoming the air break AB, can reach the tank 117 for its filling; it will be appreciated that the tank 117 can be filled according to any known techniques.

For example, the section of the duct 116 and the total capacity of the tank 117 can be chosen to have the latter completely filled during a normal water supply phase in the tub, and once the tank 117 is completely filled, its excess water can overflow to the decalcifier or to the tub itself (this can be provided for example through an overflow outlet from the tank 117).

Another possibility is that of having the control system closing the valve VA once the filling condition of the tank 117 has been reached; for example, the increasing water level in the chamber 117B (which is filled in series with the chamber 117A) can be exploited to cause a float to raise, so as to switch a microswitch upon reaching a predetermined level; such a switching is used by the machine control system as a criterion for determining the closure of the valve VA, and hinder a further water flow to the tank 117.

FIG. 15 illustrates a wash phase wherein the tank 117 is already filled with water; in this case, therefore, the pump 104 is active and the wash liquid (water plus likely detergents and/or additives) is sprayed on the crockery contained in the machine, by means of the sprayer arms 102 and 103.

At a time prior to the regeneration phase (such as during the same wash phase of FIG. 15), with the valves 120 and 122 being closed, the machine control system will apply a direct voltage between the electrodes 118A and 118B; thus, the electric current applied produces a transfer of the cations (H+) through the membrane 117C, from the water contained in the chamber 117B to the water contained in the chamber 117A, and a transfer of the anions (OH—) through the membrane 117C from the water contained in the chamber 117A to the water contained in the chamber 117B.

After a preset time interval, the control system will cease the application of the electric current to the electrodes 118A and 118B; in this way, for example, the chamber 117A will have water particularly charged with cations (H+), whereas the water contained in the chamber 117B is particularly charged with anions (OH—), which are particularly obtained through the water scission.

Therefore, following the above process, the water contained in the chamber 117B will be highly basic, rich of OH—, with a likely oxygen formation, whereas the water contained in the chamber 117A is highly acid, rich of H+, with a likely hydrogen formation; to this purpose, the electrochemical cell may eventually be fitted with vent openings and/or valves.

FIG. 16 illustrates the subsequent regeneration phase of the resins R2 of the decalcifier 110', which is performed using the water contained in the chamber 117A, treated as described above.

To that purpose, the machine control system provides for opening the valves 120, 115 and 122; vice-versa, the valves 109 and 112 are maintained closed by the control system.

The water contained in the chamber 117A appropriately treated is flown through the duct 119 to the decalcifier 110'; since during that phase the valve 112 is closed, the water tends to enter the decalcifier 110' and flow across the resins R2, and then out through the duct 113'.

The water charged with cations used for regeneration purposes flows then counter-current across the resins R2, i.e. in opposite direction to normal water used for washing supplied during a normal supply to the duct 108; this because it has been ascertained that also in this instance a water transfer counter-current allows a more efficient regeneration of the resins R2, i.e. a better removal of the calcium and magnesium ions adhering to the resins and a simultaneous removal of likely soil mechanically restrained within the resins bed.

While the valve 115 is open, the water utilized for regeneration purposes is conveyed through the duct 113' to the pump 106, to be discharged from the machine; also the water contained in the chamber 117B can flow to the duct 113', since the valve 122 is open, to be then discharged by mean of the pump 106.

It is underlined how in this instance the regeneration phase of the resins R2 can be performed inside the decalcifier 110' at least partially in water static conditions; to that purpose, therefore, during determined times of the regeneration phase, the valve 115 can be maintained appropriately closed to allow stagnation of the water inside the decalcifier 110'; the subsequent opening of the same valve 115 will provide for water discharge and inflow of new regeneration water eventually still available in the tank 117 and/or in the duct 119.

A likely washing of the resins will follow for removing loose calcium residues.

Efficiency of the softening system can be eventually improved by performing the resins regeneration phase with the water already softened.

FIG. 17 illustrates to this purpose a further possible embodiment of the washing machine according to the present invention, where the same reference numbers of the previous figures are used to indicate technical equivalent elements; in particular, the basic circuit of FIG. 17 is similar to the one represented in FIGS. 14–16, but with an amended control system for the various valves, in order to avoid the need of the duct 116.

The dishwashing machine represented in FIG. 17 operates as follows.

As to water supply into the tank or cell 117, the machine control system provides for the opening of the valves 109 and 120 only, so that the water entering from the duct 108, after flowing across the resins R2, will not flow in the ducts 111 and 113', due to the valves 112 and 115 being closed, but flow along the duct 119 to reach the tank 117, by virtue of the principle of communicating vessels and/or network pressure.

Upon reaching the desired filling level of the regeneration tank 117, which is detected for example as already described above, the machine control system will provide for the closure of the valves 109 and 120.

Thus, the tank 117 is filled with the regeneration water required, already softened, to be electrically treated as above described, so as to perform the regeneration phase at the appropriate time; it should be noticed that for this embodiment the tank 117 preferably provides an upper vent opening V.

In order to supply water to the tub, the control system provides for the opening of the valves 109 and 112, i.e. with procedures similar to the ones described with reference to FIG. 14; the same applies for the regeneration phase of the resins R2, which will be substantially performed as described with reference to FIG. 16, and due to the tank 117 being located at a higher level with respect to the decalcifier.

With reference to the various embodiments of the present invention shown by way of example with reference to FIGS. 14–17, it should be added that the regeneration phases of the resins are not necessarily performed for each wash cycle, but preferably less frequently, for example after a certain preset amount of water has been softened.

Another possibility is the use of suitable water hardness detectors employed by the machine control system for checking the hardness degree of the water flowing out of the decalcifier.

In this case, the control system will perform the regeneration phase for example when the water hardness degree detected exceeds a predetermined threshold, indicating that the softening efficiency of the resins is approaching exhaustion.

Finally, the wall 117C may also consist of a cationic membrane, or anionic membrane, instead of a bipolar membrane, or still at least two parallel membranes of both types may be provided.

Moreover, one same cell 117 used for regenerating the resins R2 may also be utilized for producing acid water and/or basic water for the washing of the crockery.

A further possible implementation of the present invention is illustrated in the FIGS. 18, 19 and 20, which is based on an electrochemical decalcifying system, which does not require the use of softening resins. Also these figures use the reference numbers of the previous figures to indicate technical equivalent elements.

In this case, the duct 108 is connected to a tank 117' downstream the air break AB. This tank 117' is divided in two separate chambers 117A' and 117B' by means of a wall permeable to ions, such as a membrane permeable to cations, indicated with 117C'; each chamber 117A', 117B' houses an electrode; in particular, the chamber 117A' houses an anode 118A', and the chamber 117B' a cathode 118B'.

From the lower section of the chamber 117B' the duct 111 departs, communicating with the tub 1, on which the valve 112 is provided; from the lower section of the chamber 117A' the outlet duct 113 departs, communicating with the delivery side of the pump 106, on which the valve 114 is located.

The tank 117' may comprise sensing means schematically indicated with S3, which are provided for detecting some operative parameters, such as conductivity, hardness degree, level, etc., of the water related to the tank 117'.

The machine illustrated in FIG. 18 operates as follows.

FIG. 18 illustrates a water supply condition to the tank 117'; this phase may be for example the first supply phase provided by a normal wash cycle of the machine according to the present invention. To this purpose the machine control system will provide for the opening of the valves 109 and VA, and maintain the valves 112 and 114 closed.

Thus, the water from the mains can flow through the duct 108, overcome the air break AB and gradually fill the tank 117'. To this aim, the upper portion of the chamber 117B' may be fitted with a float level sensor, as described above.

Therefore, by way of example, the water entering the tank 117' will first fill the chamber 117A' up to the top level of the membrane 117C', which operates as an overflow; the further supply of water to the tank 117' will then also gradually fill the chamber 117B'; at a certain point the increasing water level in the chamber 117B' will cause a float to raise and switch a microswitch upon reaching a preset level; such a switching is used by the machine control system as a criterion for closing the valves 109 and VA and hinder a further water flow to the tank 117'; according to a possible variant implementation, the tank 117' may have two separate inlets for the chambers 117A' and 117B', each one having a relevant valve, instead of filling the chambers by overflow.

In any way, upon reaching such a condition, both chambers 117A' and 117B' will be filled with volumetrically defined amounts of water.

Now, with the water under static conditions in the tank 117', the machine control system will provide for the direct voltage to be applied between the electrodes 118A' and 118B'; thus, the electric current applied causes the cations of the water contained in the chamber 117B' to be transferred through the membrane 117C' to the water contained in the chamber 117A'.

After a preset time, the control system will cease application of the electric current to the electrodes 118A' e 118B'; thus, the water available in the chamber 117B' is free of cations, in particular calcium and magnesium cations; vice-versa, the water in the chamber 117A' will be particularly rich of such cations. As it can be seen, according to such an embodiment, the water supplied by the mains is submitted to electric decalcification in substantial static water conditions. FIG. 19 illustrates the subsequent discharge phase of the water contents from the chamber 117A'; to this aim, the machine control system will cause the valve 115 to open, so that the contents of the chamber 117A' reaches the pump 106, through the duct 113, to be discharged through it from the machine.

Vice-versa, FIG. 20 illustrates softened water supply to the tub 101; to this aim, the machine control system provides for the valve 112 to open, so that the softened water contained in the chamber 117B' will reach the tub 101.

It is clear from the previous example that the capacity of the chamber 117B' along with the relevant lengths of the duct 108 and 111 will be chosen for containing a sufficient amount of water for performing a wash phase in the tub; obviously, nothing will hinder metering the water required for washing to be supplied to the tub 101 through a series of supply and emptying cycles of the chamber 117B', in which case the capacity of the latter equals a fraction or portion of the total amount of water required for performing a wash phase in the tub.

It will be appreciated that the sequence of the above operative phases may be changed and/or inverted, as the case may be.

It is still underlined how in a particularly advantageous embodiment of the invention the supply and softening systems described above or a part of them may all be fully or just partially integrated in one sole device; in this frame, the air break AB and/or the tank SE1 and/or SE2, the tank 117 or 117', the decalcifier 110 or 110' if provided, and the various valves described, with all relevant associated elements (sensors, ducts, etc.) may be incorporated in one or more of the obtained units, for example made of thermoplastic material, and inserted in the machine cabinet at least on one side of the tub 101.

Moreover, the divisor elements of the various channels or treatment chambers according to the present invention, instead of being realized through membranes, could be constituted by appropriate beds of resin permeable to ions, known as such.

FIGS. 21–24 represent basic diagrams of some embodiments of a washing machine according to the present invention, which are based on the use of a magnetic water decalcifying system.

Figure 21:
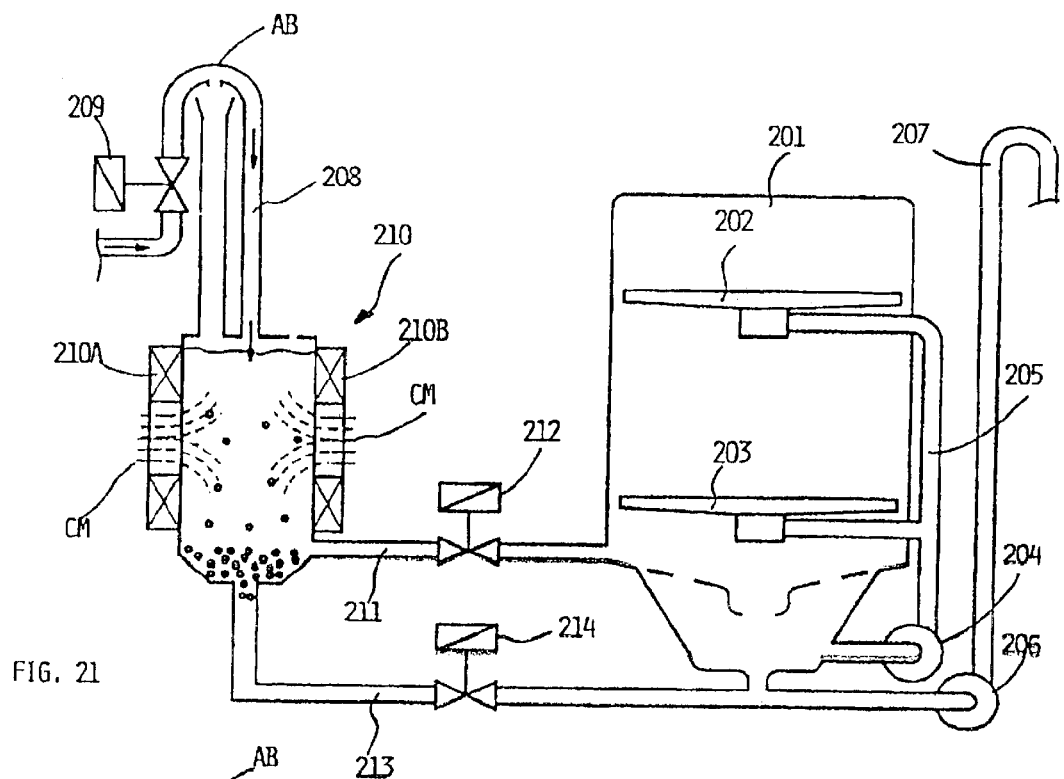
FIGS. 21 to 24 show basic diagrams of some embodiments of a household appliance utilizing water, according to a third possible technical solution according to the present invention.
Figure 22:
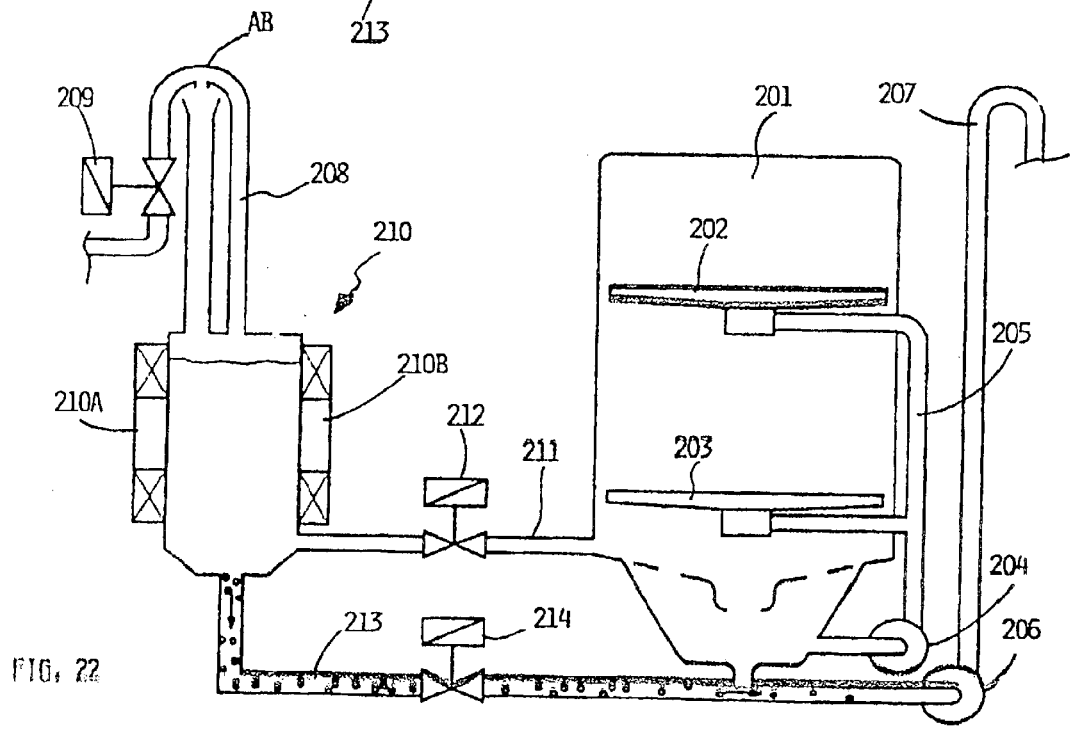
Figure 23:
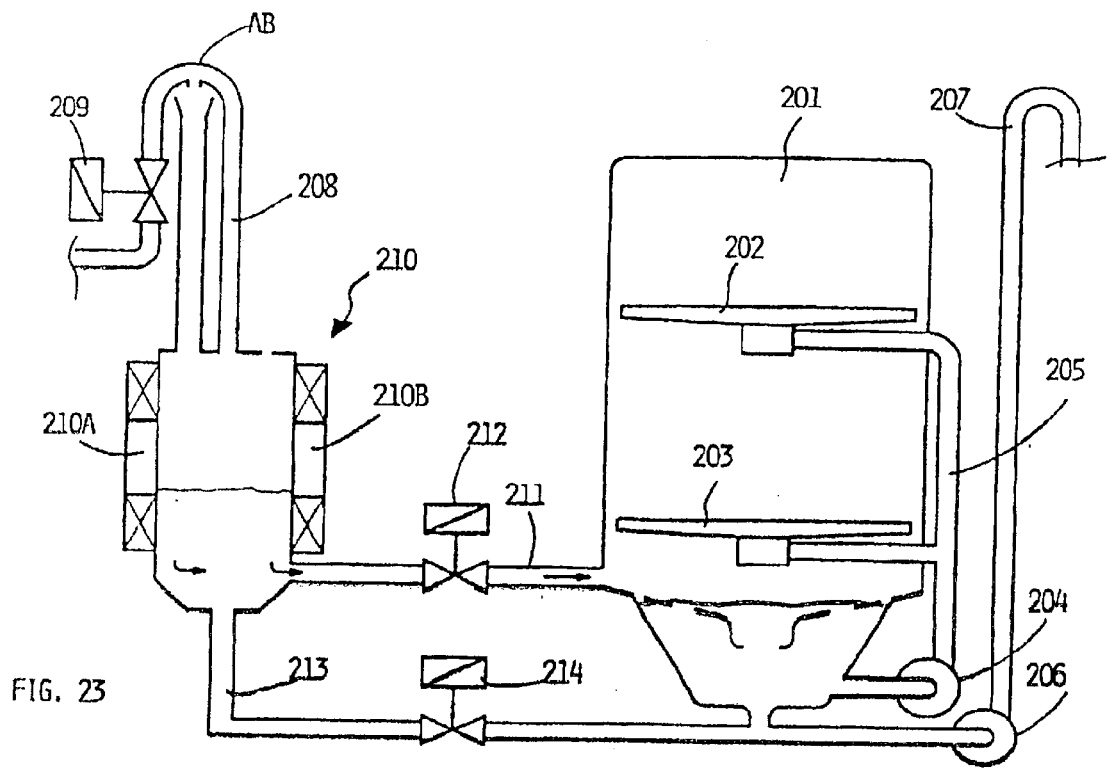
Figure 24:
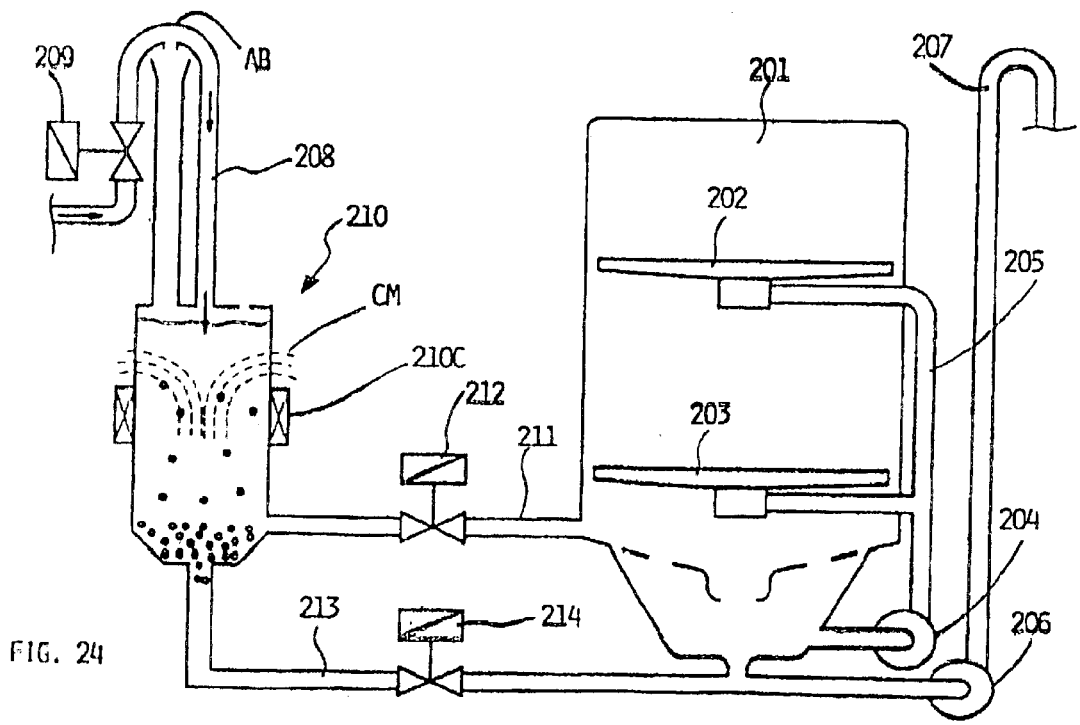

In particular:

FIG. 21 shows the basic diagram of a further possible embodiment of the washing machine according to the present invention, in a first operating condition;

FIG. 22 shows the diagram of the washing machine of FIG. 21 in a second operating condition;

FIG. 23 shows the diagram of the washing machine of FIG. 21 in a third operating condition;

FIG. 24 shows the basic diagram of a further possible implementation of the washing machine according to the present invention.

Magnetic decalcification systems are known and typically utilized for avoiding formation of calcareous scaling inside the water pipelines of water systems.

Quite schematically, according to such systems the water flow circulating in a duct is submitted to a magnetic field, generated by means of known procedures, so as to determine a crystallization of the carbonates in the water itself (in particular calcium carbonate, which is the responsible for calcareous scale deposits) and their subsequent precipitation as a slurry.

Therefore, as it can be seen, the system described does not require any resins or similar softening materials nor special regenerating media.

However, as said, electromagnetic systems as above lead to the formation of solid residues in the form of slurry; in usual known applications, this problem is not particularly felt, since such a slurry is in fact dragged away by the water flow itself in the duct subject to the electromagnetic treatment. This is clearly not possible in household appliances, and specifically in washing machines.

Another associated problem for application to household appliances of the above technology, is that the main purpose of the latter is to avoid calcareous scaling inside the pipelines of water systems, and not just remove lime from water.

This means that the water treated by the electromagnetic systems commonly known maintains its own hardness degree substantially unchanged, since the above calcium carbonate slurry remains anyway retained in the treated water.

It is clear that this carbonate in the water being used, for example, in a dishwashing machine may decidedly inhibit the action of the detergents and cause anyway a deposit of calcareous residues inside the wash tub and/or on the crockery.

For the above reasons, applications of the above technology in the field of washing machines are unknown.

In FIG. 21, reference number 201 indicates schematically the wash tub of a washing machine provided according to the present invention.

In this example, the washing machine consists of a generic dishwasher, whose tub 201 contains spraying means for the wash liquid, represented by two common rotary spraying rams 202 and 203; reference 204 indicates a wash pump for picking up the wash liquid from the bottom of the tub 201 and convey it to the arms 202 and 203, through an appropriate duct 205.

Reference 206 indicates a drain pump, for discharging the liquid used for washing purposes from the tub 201, in appropriate times (typically at the end of certain steps of the operating program); the outlet of the pump 206 is connected to this purpose with a special drain pipe 207.

Reference 208 indicates a water supply duct from a household water mains, on which a supply valve 209 is provided; this valve 209 is commonly known and controlled by the control system of the machine according to the invention, not shown in the figures, so as to ensure fresh water intake as required for washing according to appropriate times and procedures.

The duct 208 has, upstream the valve 209, a so-called air break device indicated with AB.

Reference 210 indicates as a whole a tank, having preferably an extended and flattened configuration, i.e. of the type used for the common metering tanks provided on dishwashers; the tank 210 has an appropriate inlet connected to the duct 208; as it will become apparent later, the tank 210 can perform both the metering functions and softening functions for the water to be conveyed to the tub 201.

On one side of the tank 210, a duct 211 departing at a predetermined height from the bottom of the tank itself is connected with its other end to the tub 201; this duct has the primary function of supplying the tub with the water from the main and softened through the machine decalcification system as further described; as it can be seen, this duct 211 has a second known valve 212, controlled by the machine control system for the purposes to be described later.

A second duct 213 is also departing from the lower end of the tank 210, i.e. at a lower height compared to the duct 211, which is connected to the drain outlet of the tub 201; this duct is connected with its other end to the suction side of the drain pump 206; the second duct 213 has, upstream the outlet of the tub 201, a third known valve indicated with 214, which is controlled by the machine control system. As it will become apparent later, the duct 213 and the valve 214 are used for discharging the residues of a magnetic softening process of the water contents of the tank 210.

It should be noticed that the various valves of the system described above are normally closed valves; therefore, for the purposes of the present description, they should be considered in their closed condition, save when otherwise specified.

The tank 210 may comprise appropriate sensing means, not shown in the figures, for detecting several operating parameters, such as conductivity, hardness degree, level, etc. of the water contained in the tank itself.

References 210A and 210B indicate two electromagnets, whose respective coils are substantially aligned to each other and perpendicular to the vertical axis of the tank 210; such electromagnets 210A and 210B are apt for generating magnetic field lines, as shown schematically in the figure with the lines CM being orthogonal to the tank 210.

The machine described above operates as follows.

In order to supply water to the machine, the control system provides for the valve 209 to open and maintains the valves 212 and 214 closed.

In this way, the water from the main can flow in the duct 208, overcome the air break AB and flow to the tank 210.

The amount of water unable to flow across the air break AB can be conveyed as known inside the tub 201; this water will not be softened, but its volume is a very restricted one and such not to affect the wash quality negatively. Alternatively, the water unable to overcome the air break AB can be conveyed directly to the metering tank 210, as shown in the figures.

Water metering inside the tank 210, with the relevant closure of the valve 209, can be performed with any known technique, such as the use of a standard pressure-switch or a turbine flow meter, etc.

For instance, the tank 210 may comprise a detecting system of the filling level consisting of a float and a microswitch, whose switching state will signal the filling condition or not of the tank 210 to the machine control system.

Apart from the metering/detecting system being used, once the filling condition of the tank 210 has been reached, the control system will provide for the closure of the valve 209.

Now, the control system will energize the two electromagnets 210A and 210B, so as to submit the water contents of the tank 210 to an appropriate magnetic field, according to known principles. In this way, a crystallization of the carbonates in the water is obtained, in particular calcium carbonate, and their subsequent precipitation as slurry on the bottom of the tank 210 and along the duct 213, at least up to the valve 214. This situation is illustrated in FIG. 21.

It should be noticed how, according to the present invention, the water softening step is performed under static conditions.

After a preset time, which is considered sufficient for obtaining the desired softening degree, the control system stops the energization of the electromagnets 210A and 210B, and provide for opening the valve 214 and start the pump 206, as shown in FIG. 22.

Thus, a portion of the water in the tank 210 is discharged to the duct 213, so as to convey both the slurry and residues generated during the magnetic softening process down to the pump 206 for their discharge out of the machine.

Also the opening time of the valve 214 during this phase can be obtained with any known technique; for example, such a time can be may be preset, or be a function of the amount of water discharged from the tank 210, calculated or metered in a known way.

After closing the valve 214, the control system provides for the valve 212 to open, to let the softened water still in the tank 210 reach the wash tub 201 through the duct 211, as illustrated in FIG. 23.

Therefore, as it can be seen, the tank 210 is used for water metering; in this frame, the capacity of the tank 210 with the its relevant lengths of duct 208, 211 and 213 will be chosen to contain a sufficient amount of water for discharging, on one hand, the slurry deposited in the lower section of the tank itself and, on the other hand, performing a wash phase in the tub.

Also in this instance, nothing hinders metering the water required for washing to be supplied to the tub 201 through a set of subsequent supply and emptying cycles of the tank 210, as described above.

In the previous example, the removal of the slurry deposited in the lower part of the tank 210 is performed in advance, with respect to wash water supply to the tub 1, in order to avoid possible backflows of the carbonate residues to the wash tub.

However, it is clear that the shape of the tank 210 may be appropriately amended in its lower portion, for avoiding the above cited possible backflows; to this aim, for instance, the lower part of the tank 210 could have a more extended and funnel-like shape. Therefore, these measures may even allow to reverse the discharge sequence of the contents of the tank 210 to the tub 201 and pump 206, with respect to the example previously mentioned.

FIG. 24 illustrates a possible variant implementation of the present invention, where the tank 210 is associated to one electromagnet indicated with 210C, whose coil is substantially coaxial with the tank 210.

As to its operation, the machine represented in FIG. 24 operates substantially as described with reference to FIGS. 21–23, with the difference that in this instance the control system will energize the sole electromagnet provided.

Preferably, according to the invention, the tank 210 is associated to appropriate screening means to avoid that the magnetic fields generated by the electromagnets 210A–210B or 210C may cause interferences in the household environment; such means could consist for example of an electric conductive plastic housing covering the tank 210 and the relevant electromagnets; this housing could be overmoulded directly on the tank-electromagnets assembly, i.e. consisting of appropriate lids.

In this frame, also the circuitry for the electromagnets control can be possibly integrated near the tank 210, so that also this circuitry apt to generate a frequency signal may be screened, as mentioned above against interference phenomena.

Moreover, discharge of the water portion containing carbonate slurry can take place in concurrence with the discharge of the washing liquid utilized in the tank 201.

Let us consider, for instance, that in some countries Standards are in force according to which washing machines should not discharge in the sewage system any water with a temperature higher than a predefined level, such as about 60° C.

Should the user select a wash program using water having a higher temperature than the preset threshold (such as 90° C. for a laundry washing machine), then the machine has to be fitted with means for reducing water temperature before discharging it.

Therefore, the portion of water containing carbonate slurry can be discharged in concurrence with the discharge of the hot wash liquid, with a view to lower the temperature of the latter. Other possible variant implementations with reference to the embodiments of FIGS. 21–24 may relate to the shape and the type of electric supply of electromagnets.

For example, a plurality of electromagnets may be supplied simultaneously to enhance their decalcification effect; in this instance, the relevant magnetic fields can be oriented in the same direction, or in opposite directions; on the other hand nothing hinders to supply two electromagnets alternatively to each other.

Anyway, apart from their number, both the tank 210 and electromagnets will preferably have such a shape and size for optimizing the decalcification process, i.e. such to treat all the water contained in the tank. In this frame, as already mentioned, the tank 210 will preferably have a reduced section or thickness.

The features of the present invention are clear from the above description, and also its advantages are apparent. In particular:

the household appliance according to the present invention does not require any special consumption media, such as salt, in order to regenerate the decalcification resins; therefore it is no longer necessary to provide periodical maintenance/actions to the machine for topping up said regenerating media, or special signalling means whose function is to warn the user about such a need of topping up;

the household appliance is fitted with specific means for connection to just one sole water source at room temperature, if required;

the household appliance is fitted with special means for allowing to realize an efficient resin utilization, when provided, and an efficient resins regeneration, which means are improved compared to the present state of the art, so as to increase their useful life and allow to replace them after a considerable longer period compared to the known solutions;

according to the invention, the above actions/maintenance can be avoided also when decalcification resins are utilized.

It is clear that many other changes are possible for the man skilled in the art to the household appliance utilizing water, in particular a washing machine, described above by way of example, without departing from the novelty spirit of the innovative idea.

It is possible, among others, to combine two or more decalcification systems as previously described, or their relevant components, in order to reach the proposed aims.

It is clear that many other changes are possible for the man skilled in the art to the household appliances utilizing water, in particular a washing machine described above by way of example, without departing from the novelty spirit of the innovative idea.

For example, in the case of the embodiment of FIG. 14, it would be possible to utilize the basic water produced in the chamber 117B and/or the acid water produced in the chamber 117A for deterging the crockery during an initial phase of the wash cycle; this considering that some detergent agents are strongly basic (pH up to 11,5), as well as acid (for example citric acid of lemon), to fight various soil types.

To this purpose, deviator valves could be provided instead of the valves 120 and 122, respectively, being apt to deviate said basic and/or acid water to the tub 101, or to spray it directly on the crockery through an appropriate device, and let it react for a certain time before a subsequent rinsing (obviously both types of water would be supplied or sprayed at different times to avoid their mutual inhibition).

Basic and/or acid water may also be stored in one or more storage tanks, for its subsequent use and be produced during a regeneration process, for its use in an initial phase of a subsequent wash cycle; in alternative, this water may be obtained during several wash cycles, so as to store a good volume also with a small size electrochemical cell, and then be utilized in a subsequent cycle. A further implementation would be to provide the electrochemical cell with gas suction means for the gases produced therein (as mentioned, hydrogen and oxygen) for a subsequent use (such as for disinfecting, bleaching, etc.) and/or their appropriate evacuation or suppression.

A further variant implementation is to heat water in the electrochemical cell during the regeneration, as this would speed up and/or improve the process; this could be obtained through an appropriate heater in correspondence of the container of the softening resins or the tank containing the water for regeneration; in alternative or additionally, it would even be possible to exploit the heat dispersed from the machine wash tub during the hot wash phases, or a heating induced by a temporary circulation of a high electric current.

According to a further advantageous implementation in the event of the embodiment of FIGS. 11–13, the machine according to the present invention may be fitted with an electric supply device for the electrodes of the electrochemical cell, controlled by the machine control system, providing for voltage and/or power and/or current adjustment, in particular of the variable type and/or pulse type (for example of the "switching" type or "Pulse Width Modulation" type) and/or reversible polarity.

The possibility of adjusting these parameters allows for example a reduction of the initial current peak (with saturated resins) and then to increase the voltage when the current tends to decrease (reduction of the circulating ions, with nearly regenerated resins).

Another variant implementation, related to the embodiment of FIGS. 11–13, is to circulate in the channels CE1, CE2 e CC of the decalcifier 110 only already softened water; therefore, according to this variant implementation, the water inlets for said channels would be branched off the outlet of the channels CP1 and CP2.

Always with reference to the embodiment of FIGS. 11–13, appropriate means may be provided for proper flows calibration in the outlet ducts of the softened water (i.e. duct 111) and calcareous water (i.e. duct 113); such means could consist for example of throughways having predetermined section, or a flow controller, or still proportional valves (e.g. valves 112 and 114 could be proportional valves); this in order to optimize the efficiency of the device and/or the resins regeneration.

According to a further embodiment of the present invention, the machine control system may be programmed for realizing a regular inversion of the polarity of the electrodes provided in the electrochemical cell, so as to favour the cleaning of its membranes.

A further variant implementation in the event of the embodiment of FIGS. 18–20 is to provide cationic resins of the H+ type in the chamber 117B', so as to have such resins retaining calcium quickly, for a faster water softening and supply to the tub.

Always with reference to the embodiment of FIGS. 18–20, the electric voltage applied to the electrodes of the electrochemical cell realized by the tank 117' may be performed under dynamic conditions of the water flow, i.e. with a light flow in the chamber 117A' and/or 117B'.

Further variant implementations may then relate to the electrodes used in the electrochemical cell, which could either be metallic (e.g. steel) or non metallic (e.g. graphite, carbon, conductive plastic), or a combination of the above two type.

A water pre-filtering system may be advantageously provided upstream the decalcifier 110 of FIG. 11, for example of the mechanical or magnetic or electromagnetic type, in particular a self-cleaning system, providing for example a periodic counter-current washing and bleeder. Such a pre-filtration is advantageously provided for retaining impurities, sand, iron residues, etc., which could damage the decalcifier and/or the electrochemical cell and/or the membranes of the system. Finally, it is reminded that in some countries, standards are in force according to which washing machines should not drain in the sewage system water with a temperature higher than a predefined level, such as about 60° C.

Should the user select a wash program utilizing water with a higher temperature than the preset threshold (for example 90° C. for a laundry washing machine), then the machine has to be fitted with means for reducing the water temperature, before its draining.

Within this frame, the water resulting from the softening or regeneration process not utilized for washing purposes may be discharged in concurrence with the discharge of the hot wash liquid, in view of lowering its temperature.

Also in the event of the embodiments shown in FIGS. 15–17 and 18–20, the machine control system is advantageously programmed to maintain a certain volume of water in the tanks 117 and 117' also when the machine is not in use, so as to keep the relevant membranes damp and avoid their drying up.

Another possible variant implementation provides at least a container downstream the air break AB and upstream the electrochemical cell 110 or 117' or decalcifier 110', for containing and/or metering the water to be softened; this container can be used e.g. for a fast supply/metering of the water and its slow outflow. This container may eventually be pressurized, through known means, in order to speed up the water flow across the softening resins.

Moreover, the electrochemical cell 110 of FIGS. 11–13 may be eventually deprived of resins R1 for ensuring operation as described with reference to FIGS. 18–20.

Figure 25:
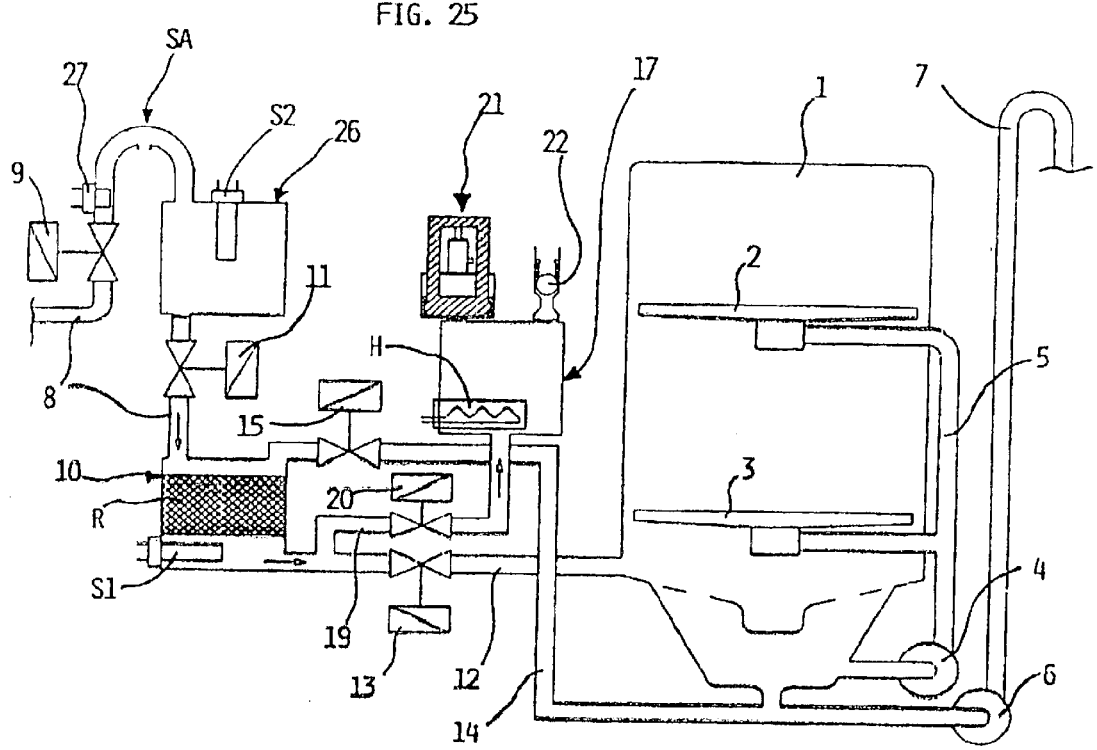
FIGS. 25 to 36 show basic diagrams of some possible variant embodiments of a household appliance realized according to the technical solution of FIGS. 1–10.
Figure 27:
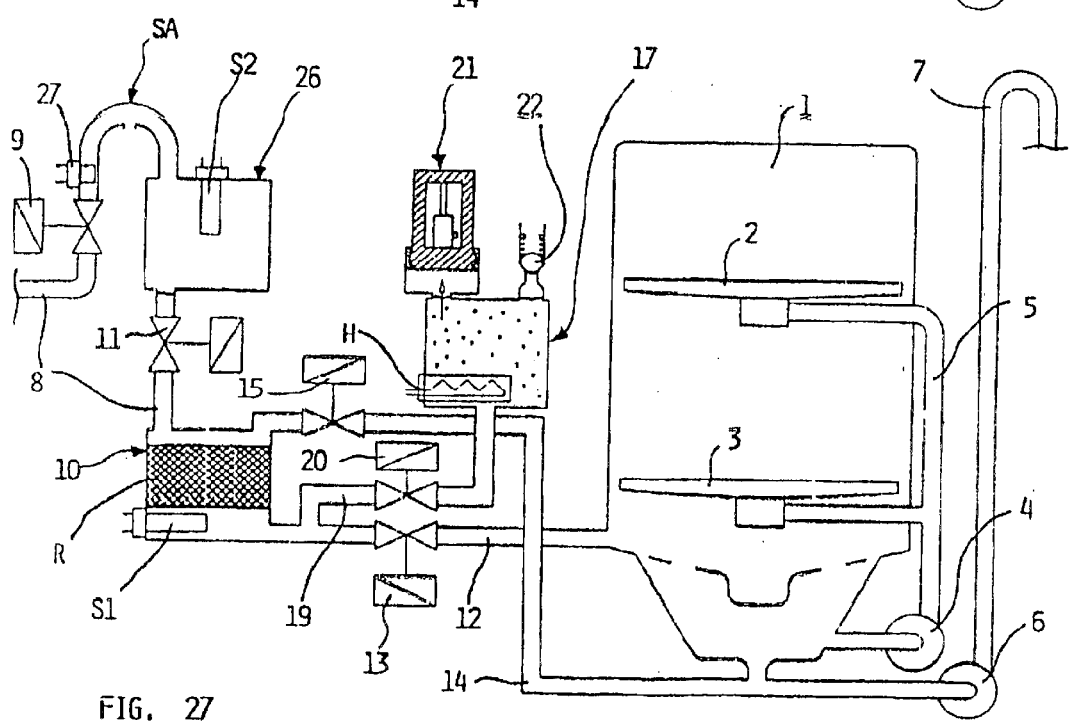
Figure 26:
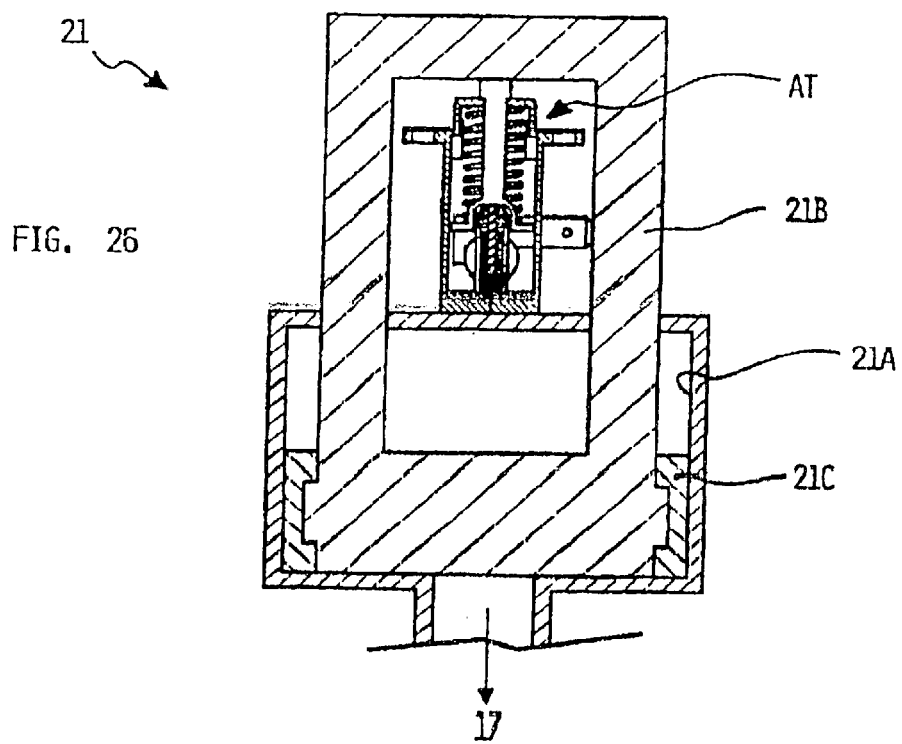
Figure 33:
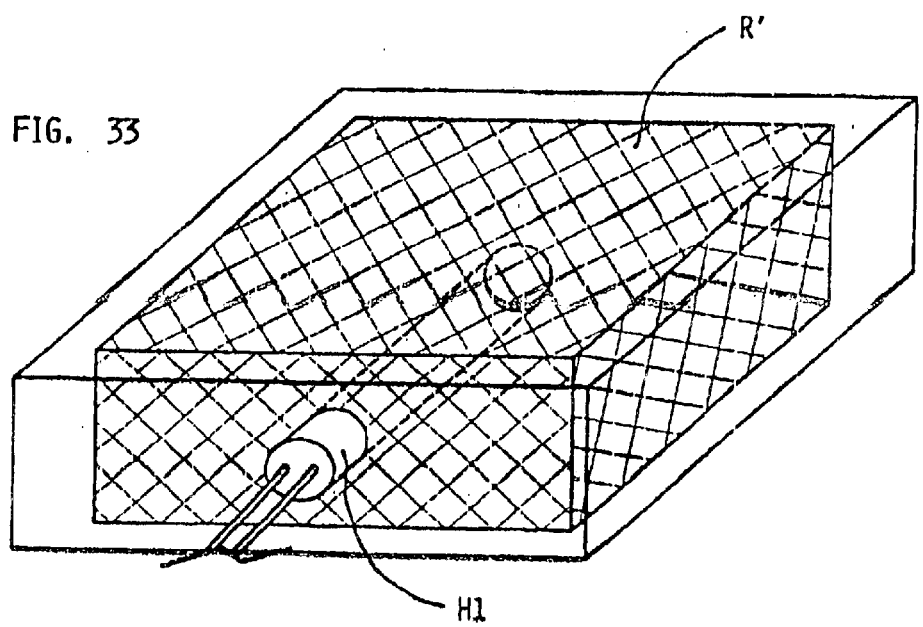
Figure 28:
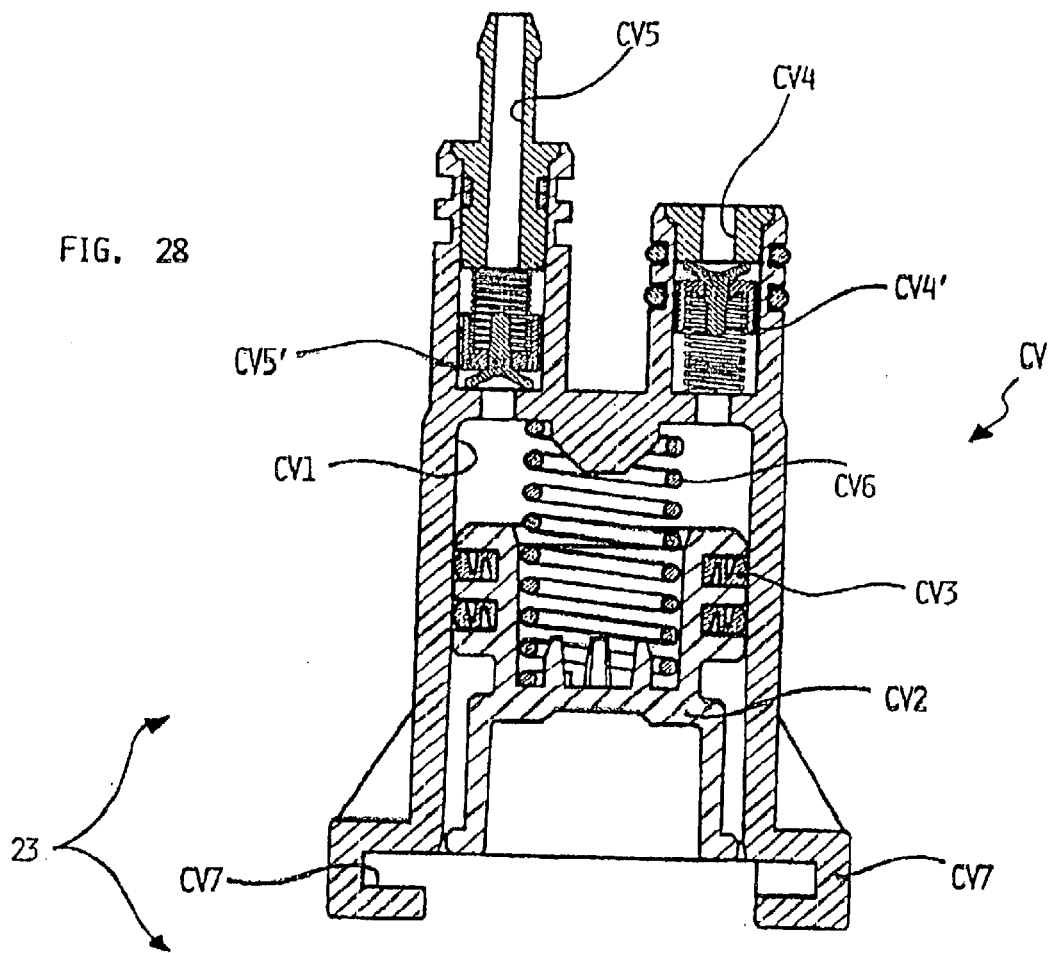
Figure 28:
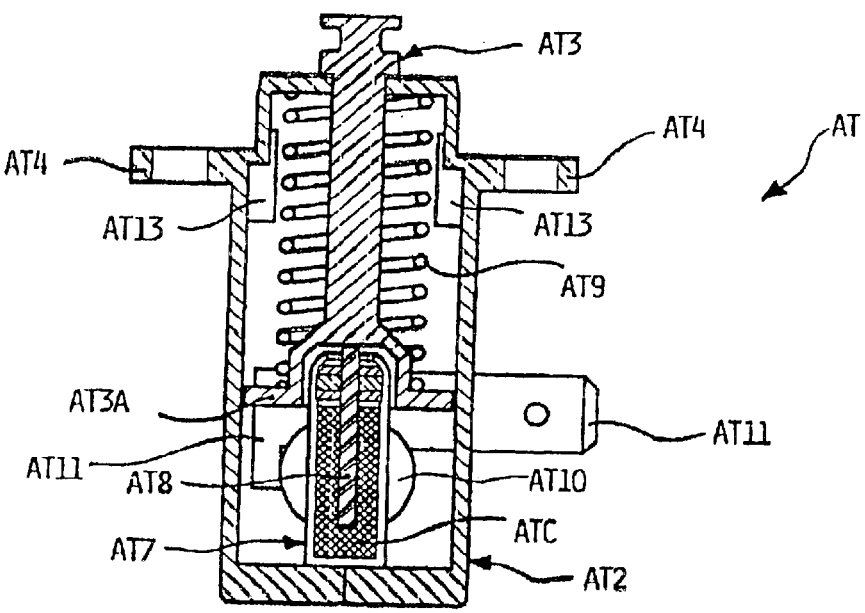
Figure 29:
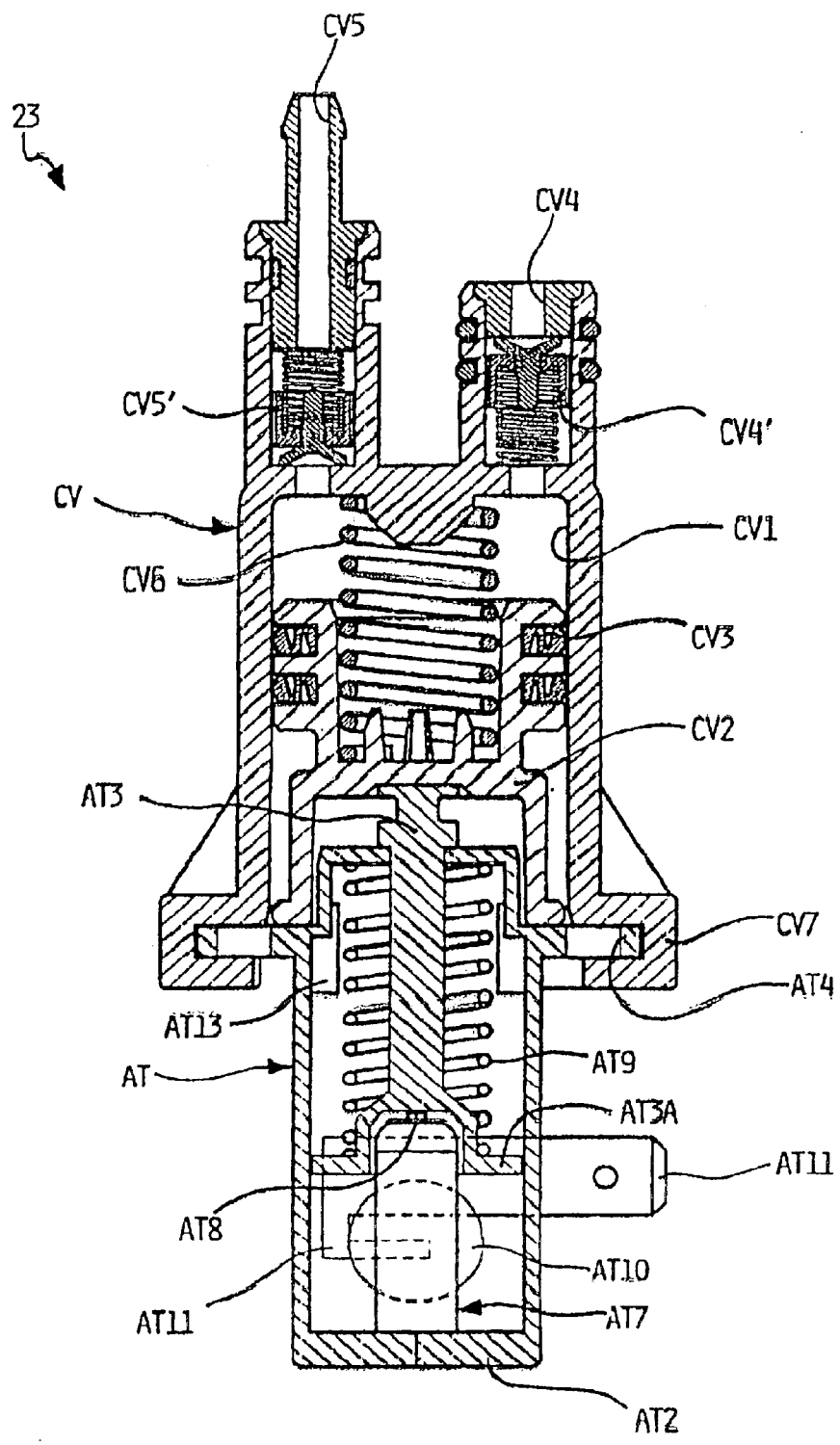
Figure 30:
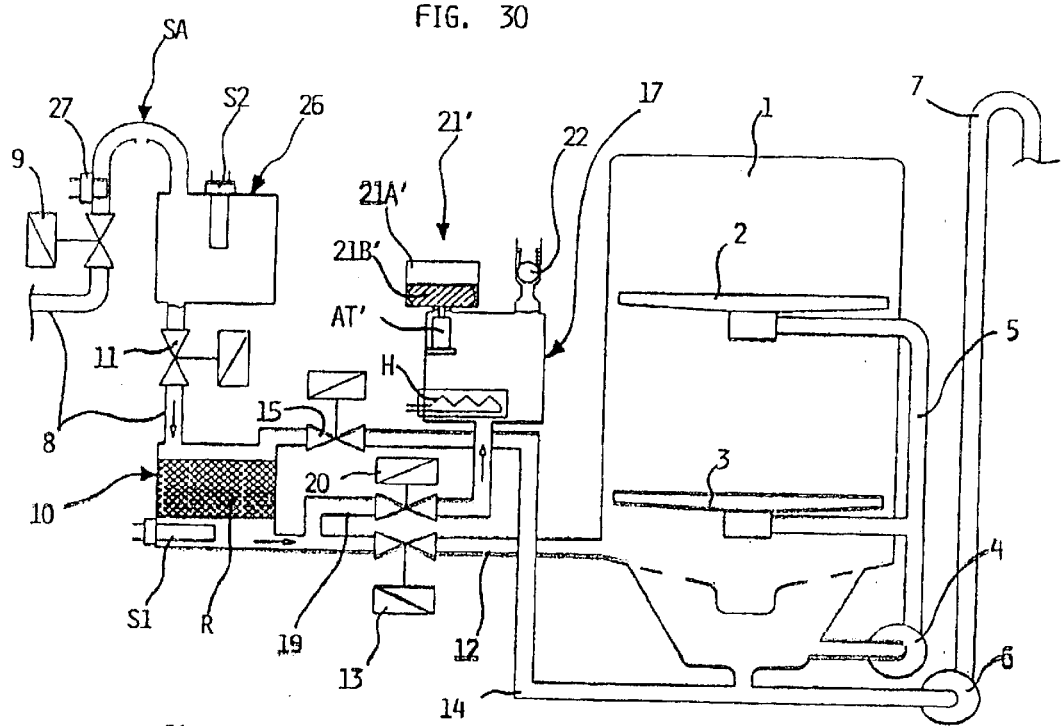
Figure 31:
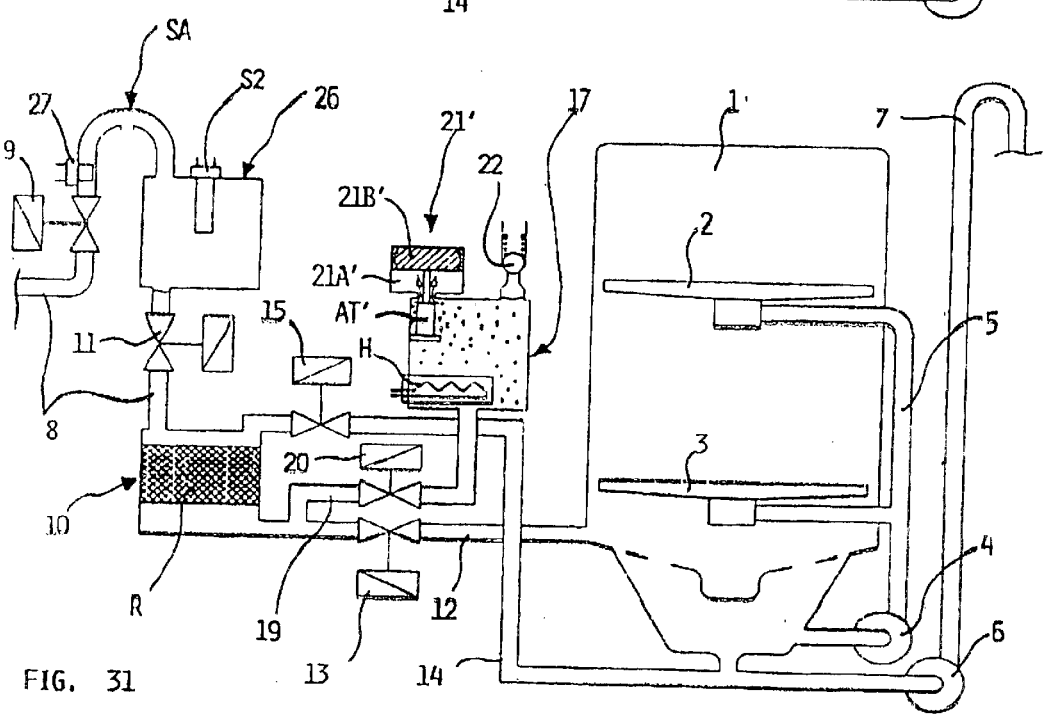
Figure 32:
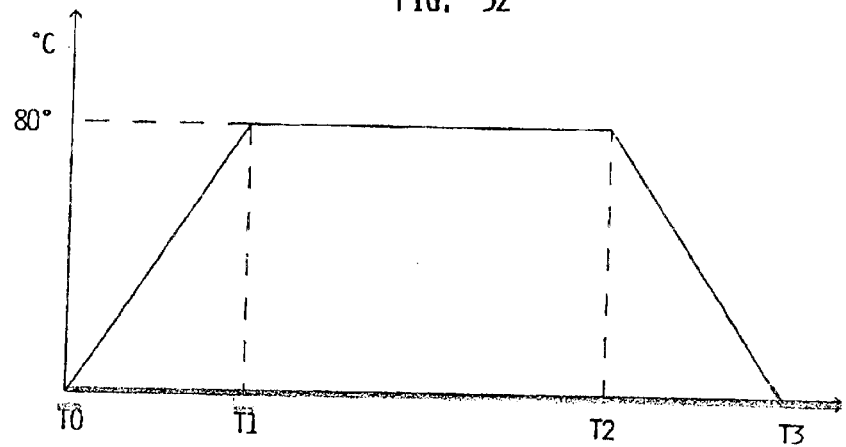
Figure 34:
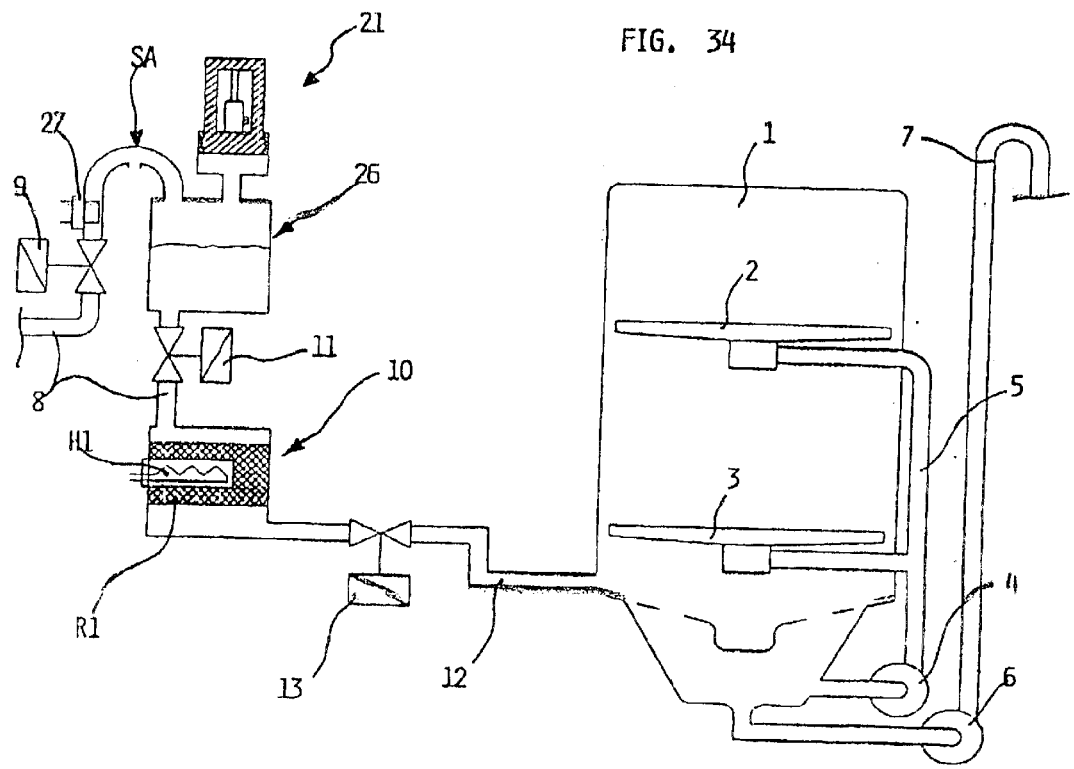
Figure 35:
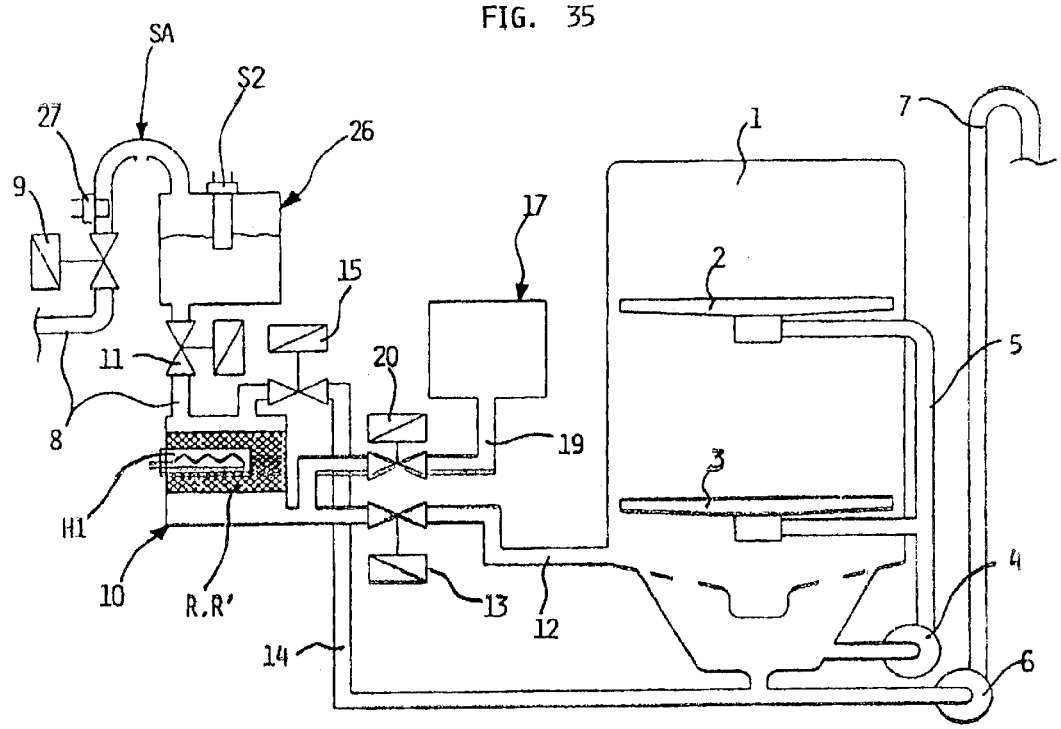
Figure 36:
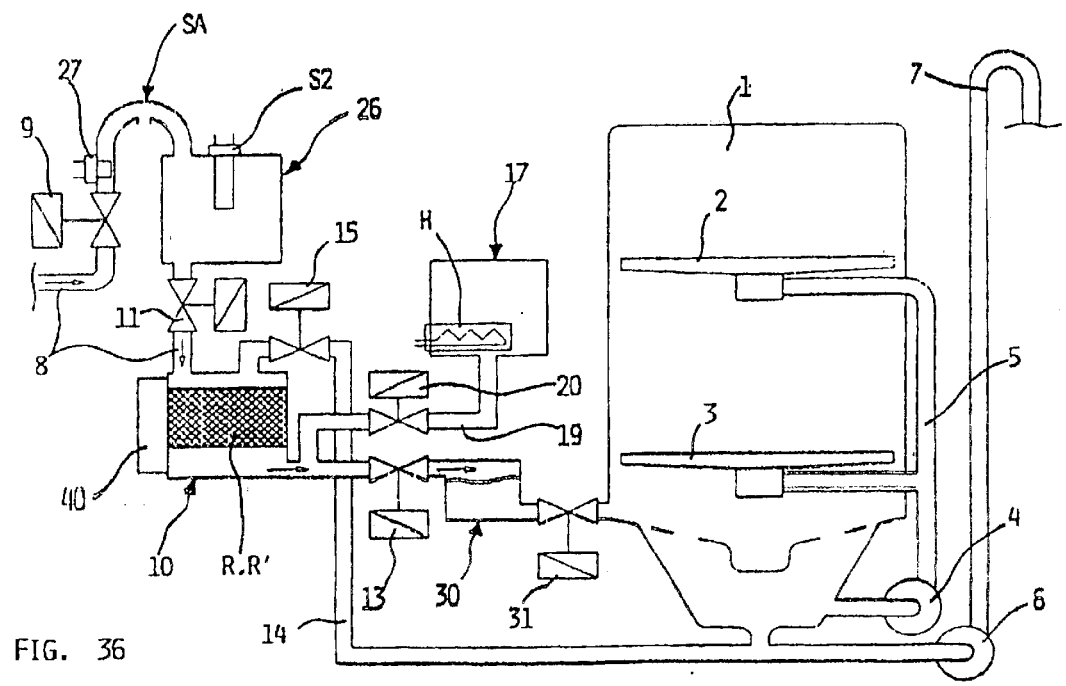

FIGS. 25 to 37 represent further variant embodiments of a household appliance obtained according to the technical solution of FIGS. 1–10; in particular:

FIG. 25 shows the basic diagram of a first possible variant embodiment of a washing machine in a first operating condition;

FIG. 26 is a section view of an enlarged detail of FIG. 25;

FIG. 27 shows the basic diagram of the washing machine represented in FIG. 25 in a second operating condition;

FIG. 28 shows a section in a partial exploded view of a component of the water softening system of the present invention, according to a possible variant implementation;

FIG. 29 shows a section of the assembled component of FIG. 28;

FIG. 30 shows the basic diagram of a second possible variant embodiment of the washing machine, in a first operating condition;

FIG. 31 shows the diagram of the washing machine of FIG. 30 in a second operating condition;

FIG. 32 shows a graphic, being useful for a better understanding other further embodiments of the present invention;

FIG. 33 shows a component of a softening system according to a further possible variant implementation of the present invention;

FIG. 34 shows the basic diagram of a third possible embodiment of a washing machine comprising a water softening system according to the present invention;

FIG. 35 shows the basic diagram of a further possible embodiment of a washing machine comprising a water softening system according to the present invention;

FIG. 36 shows the basic diagram of further possible embodiment of a washing machine comprising a water softening system according to the present invention.

With reference to the solution represented in FIG. 25, optimized means are provided for deoxygenating or degassing at least the water flowing across the resins R for their regeneration. To this purpose, in FIG. 25, 21 indicates a vacuum pump as a whole, associated to the tank 17 and provided for degassing or deoxygenating the water contained in the latter, whereas 22 indicates a generic air vent valve for the tank 17, whose function will be further detailed.

The pump 21, which is illustrated schematically in FIG. 26, comprises a body delimiting a chamber 21A in communication with the tank 17; this chamber 21A contains at least a portion of a piston or slider 21B, which has an appropriate gasket 21C apt to seal the side walls of the chamber 21A; moreover, the pump 21 may also include an elastic restoring element, such as a spring, not represented in the figure.

Reference AT indicates an actuator as a whole, which is apt for moving the piston 21B; the actuator AT, which is a thermal actuator in the above example, is better detailed in the lower part of FIG. 28.

Said thermal actuator AT comprises an external housing AT2, preferably obtained by the mutual coupling of two thermoplastic half shells; the housing AT2 has an opening on one of its lengthwise ends (in the illustration, its upper end), through which a portion of an actuation shaft AT3 protrudes; reference AT4 indicates two side wings of the housing AT2, which are used for its anchoring.

The body AT2 houses a common thermoactuator, also known as thermal head, indicated with AT7; the thermoactuator AT7 has a relevant thrust element or small piston AT8; one end of the piston AT8 is confined within the body of the thermoactuator AT7, where it is immersed in a thermally expansible material, such as wax, indicated with ATC; the other end of the piston AT8 protrudes from the body of the thermoactuator AT7, for thrusting the actuation shaft AT3; thermoactuators of the type indicated with AT7 are well known and do not require a detailed description herein.

The thermoactuator AT7 is made integral with the housing AT2, as a known manner, wherein also the shaft AT3 is housed, at least partially.

The shaft AT3 is movable under the action of the piston AT8, against the action of a spring AT9; this spring AT9 is located within the housing AT2, between its upper part and an enlargement AT3A of the shaft AT3; as it can be seen, one end of the shaft AT3 is in contact with the piston AT8, whereas the opposite end protrudes from the above cited upper opening of the housing AT2. Reference AT10 indicates a heating element for the thermoactuator AT7, such as a thermistor with a positive temperature coefficient or PTC, and AT11 indicates one of two electric supply terminals, each one of them having a portion located within the housing AT2; these internal portions of the terminals AT11 have respective contact foils with the heating element AT10 and the body of the thermoactuator AT7, which consists of an electrically and thermally conductive material; thus, an electric continuity between the terminals AT11, the thermoactuator AT7 and the heating element AT10 can be established.

Reference AT13 indicates strikers, being defined in the upper internal part of the housing AT2, whose function is to provide mechanical end stops to the motion of the shaft AT3.

With the contacts AT11 alive, the heating element AT10 generates heat, which is transferred to the body of the thermoactuator AT7, so as to cause the expansion of the thermally expandable material ATC; this expansion causes the outward linear movement of the piston AT8, until the enlargement AT3A of the shaft AT3 strikes against the striker AT13; in other words, the thermoactuator AT7 changes the relevant position between the shaft AT3 and the housing AT2. As soon as the contacts AT11 are no longer alive, the thermal element AT10 cools down gradually, with a gradual shrinkage of the thermally expandable material ATC, and the piston AT8 and shaft AT3 go back to their starting positions, by virtue of the action of the spring AT9.

Back to FIG. 26, it can be seen how the actuator AT is provided for producing, when it is electrically supplied, an upward movement of the piston 21B; therefore, by virtue of the gasket 21C, this movement is apt to cause a gradually increasing depression in the portion of the chamber 21A being underneath the gasket 21C (on the other hand, air in the portion of the chamber 21A above the gasket 21C, will vent in the external environment, through appropriate passages, for example being defined around the piston 21B).

Since the portion of the chamber 21A being underneath the gasket 21C communicates directly with the upper part of the tank 17, the cited depression withdraws the air from the tank 17 and the water contained in the latter into the same chamber 21A; preferably, the tank 17 is filled nearly completely with water, in order to minimize the free room where air may be present, so as to increase the effectiveness of the above depression. In this frame, the tank 17 may have an optimal configuration for its total filling without air stagnation, as this may minimize the performance of the vacuum pump 21 or require a chamber 21A with a larger volume capacity.

Back again to FIG. 25, a second tank located along the duct 8 and directly upstream the valve 11 is indicated with 26; this tank 26 comprises sensor means S2 of some operating parameters, such as conductivity, hardness degree and temperature of the water supplied from the mains, its pH degree and eventually the filling level of the tank 26 itself.

The tank 26 may have a metering function, in order to allow a preset water supply from the mains, independently from the network pressure and/or various likely charge losses of the hydraulic circuit (air break, decalcifier, ducts, etc.).

Moreover, the metering tank 26 is located at a higher level than the regeneration tank 17, which is located in turn at a higher level compared to the decalcifier 10.

The dishwashing machine represented by way of a non limiting example in FIG. 25 operates as follows.

In order to supply water from the mains, the machine control system closes only the valve 9, so that water entering from the duct 8, which is unable to flow in the ducts 12, 14 and 19 due to the valves 11, 13, 15 and 20 being closed, gradually fills the tank 26.

The amount of water unable to flow across the air break SA can be conveyed, in a known way, to the tank 26, or inside the tub 1; in this second instance, the water is not softened, but its volume is a very restricted one and such not to affect wash quality negatively.

Upon reaching the preset level for the tank 26, for example detected through a common float-microswitch system, the machine control system will provide for the valve 9 to close and the valves 11 and 20 to be opened.

In this way, at least a portion of the water in the tank 26 can flow across the resins R of the decalcifier 10 to be softened and flow further through the duct 19 and then to the tank 17, based on the principle of the communicating vessels.

During this phase the valve 22 will let the air initially present in the tank 17 flow out to the external environment, under the thrust of the water directed to the latter; to this purpose, the valve 22 may be an electric bi-directional valve, controlled by the machine control system.

Upon reaching the desired filling level of the regeneration tank 17, being detected in a known way, the machine control system will provide for the valve 20 to close; also the valve 22 will be closed upon reaching such a level.

Thus, the tank 17 is filled with the required regeneration water already softened, to be heated and degassed or deoxygenated as further described, for performing the regeneration phase of the resins R at the appropriate time; as mentioned above, the tank 17 is preferably filled up to its utmost level, for improving the efficiency of the subsequent degassing or deoxygenating phase.

In order to supply water to the tub, the control system will provide for the valve 13 to open and let the residual contents of the tank 26 reach the wash tub 1 through the duct 12.

Alternatively to the above, of course, the water supply to the tanks 26 and 17 may be achieved with a reverse sequence, compared to the previous one, as follows.

The machine control system provides for the valves 9, 11 and 20 to open, so that water entering from the duct 8 flow through in the tank 26, over to the decalcifier 10 and reach the tank 17 through the duct 19, since it is unable to flow in the ducts 12 and 14 due to the valves 13 and 15 being closed.

Upon reaching the preset level for the tank 17, detected in a known way, the machine control system will provide for the valves 11 and 20 to close, and keep the valve 9 alone open.

Thus, the tank 17 is filled with the necessary regeneration water being already softened, to be heated and degassed or deoxygenated as further described, so as to perform the regeneration phase at the appropriate time.

On the other hand, the further water entering from the mains will gradually fill the tank 26; upon reaching the preset level for the tank 26, as detected for example through a float-microswitch system, the machine control system will provide for the valve 9 to close.

Also in this case, in order to supply water to the tub, the control system will provide for the valve 13 to open, to let the contents of the tank 26 reach the wash tub 1 through the duct 12.

It is obvious that in the first of the two operating procedures previously mentioned, the capacity of the tank 26 will be chosen for containing enough water to fill the regeneration tank 17 and perform a wash phase in the tub; vice-versa, in the second procedure, the total capacity of the tank 26 will on the contrary contain only enough water for performing a wash phase in the tub.

Nothing hinders the metering of the water to be supplied to the tub 1 for washing through a set of subsequent filling and emptying cycles of the tank 26, in which case the capacity of the tank 26 may equal a fraction or portion of the total amount of water required for performing a wash phase in the tub; however, it is obvious for the man skilled in the art that other operating sequences differing from the ones above indicated may be used for filling the tank 17 and supply the tub with the required wash water.

Once the tub 1 is filled with the required amount of softened water, the machine can start the relevant wash cycle phase; some of these phases are typically "hot", i.e. the liquid circulated by the pump 4 is heated by means of known heaters (such heaters are not represented in the figure as their type and operation are commonly known).

Therefore, it will be appreciated how the tank 17 is preferably in direct contact with at least a wall of the tub 1, usually made of stainless steel; in this way the heating of such a wall induced by the temperature of the wash liquid circulating in the tub 1 allows a partial heating of the water contained in the tank 17, due to thermal exchange.

It is underlined, on the other hand, above all in the event that both the tanks 17 and 26 are integrated in one sole device, how a partial heating of the contents of the tank 17 due to thermal exchange of the tub 1 and its likely final heating through the heating means H, is preferably obtained after the contents of the tank 26 has been emptied in the tub; this to avoid even a partial heating of the water contained in the tank 26, not subject to degassing in the embodiment described herein, which may contribute to determine oxidation of the resins R while flowing through the decalcifier 10.

At a time prior to the regeneration phase, the machine control system will eventually complete the heating of the water contained in the tank 17, activating the special heating means H; upon reaching a preset optimal temperature for the regeneration of the resins R, detected through appropriate temperature sensing means associated to the tank 17, the control system will deactivate the heating means H.

Therefore, the control system activates the vacuum pump 21; in particular, the control system supplies the actuator AT, so as to have the consequent movement of the piston 21B producing the above depression inside the chamber 21A; as said, this causes a suction of the air being present in the tank 17 above the level of the fluid contained in it.

The suction force produced by the pump 21 is such to involve the substantial removal of the gaseous residues in the same water contained in the tank 17; due to the pump action 21, these residues tend to raise in the form of bubbles towards the upper section of the tank 17.

This operating condition is illustrated by the example of FIG. 27.

Thereafter, the regeneration phase is performed using water being heated and degassed as described above; to this aim, the machine control system will provide for the valves 20 and 15 to open, whereas the valves 9, 11 and 13 remain closed; if required, in order to allow water flow out of the tank 17, also the valve 22 can be opened, to let the air exit in the external environment and avoid a depression in the upper part of the tank 17, which may affect its emptying negatively. The water duly heated and degassed contained in the tank 17 flows, through the duct 19, to the duct 12; since during this phase the valve 13 is closed, water is conveyed to enter the decalcifier 10, so as to flow across the resins R, and then flow out through the duct 14; the decalcifier 10 and the tank 17 are located at different heights, so that the regeneration water flow will occur by gravity from the latter to the former; the hydraulic system is preferably designed to obtain a swirl-free flow, in order to avoid new air production in the water.

It should be noticed that the hot water used for regeneration purposes flows counter-current across the resins R, i.e. with an opposite direction with respect to the water normally used for washing supplied during normal water intake of the tank 26; this because it has been found that a counter-current flow of hot water allows a more efficient regeneration of the resins R and an improved removal of the residues likely to be mechanically retained in the decalcifier 10.

The valve 15 being open, the water used for regeneration purposes is flown through the duct 14 to the drain duct of the tub 1 and directly discharged from the machine through the special drain pump 6.

According to the present invention, the thermal regeneration phase of the resins R may be performed at least partially under static conditions of water within the decalcifier 10; therefore, the valve 15 may be appropriately maintained closed to this purpose, during determined times of the regeneration phase, to allow a hot water stagnation time in the decalcifier 10; a subsequent opening of the valve 15 will allow the discharge of this water and an inflow of new regeneration hot water eventually still available in the tank 17 and/or duct 19.

As to the regeneration phase of the resins R, according to the present invention they are not necessarily performed at every wash cycle, but preferably less frequently, for example after a certain preset amount of water has been softened.

Another solution consists in the use of special water hardness detectors, pertaining for example to the sensor means S I, and used by the machine control system for checking the hardness degree of the water exiting the decalcifier 10.

In this instance, the control system will for example provide for the regeneration phase if the hardness level of the outlet water from the decalcifier 10 is higher compared to a preset threshold, indicating that the softening efficiency of the resins R is approaching to the exhaustion.

Obviously, many other changes are possible for the man skilled in the art to the technical solution previously described with reference to FIGS. 25 and 27.

For example, at least a partial water supply is also possible for the tank 17, which is provided for containing the water used for regeneration purposes of the resins R, using the water unable to overcome the air break SA; therefore, special means may be fitted to this purpose on the machine, to have this water flowing to the tank 17.

According to another possible variant implementation, a vacuum pump similar to the pump 21 of FIG. 25 for degassing the water in the tank 17 may be fitted or connected also to the tank 26 and/or the decalcifier 10, in order to submit all the water flowing across the resins R to the same treatment, so as to minimize possible oxidation risks for them.

Also, instead of performing a metering function of the water required for the washing, the tank 26 may have the sole aim of avoiding that the supply system from the water main be affected by the network pressure and/or various charge losses of the machine hydraulic circuit (air break, decalcifier, ducts, etc.); therefore, in this case, the metering of the wash water will be performed with known means located directly inside the tub 1 (such as a common pressure-switch).

Therefore, in main line, the valve 11 will be closed during the various water supply of the tank 26, in order to let water "decant" therein and be subsequently opened for the water to flow through, without any turbulence, first to the decalcifier 10 and then to the tank 17 and/or tub 1; it is obvious that in such an event the machine control system will provide for appropriate opening/closing of the valve 11 coherently with the other valves of the system, for performing the various wash cycle phases, according to procedures that are obvious for the man skilled in the art (for example, in general, the valve 11 will be open when the valve 13 or valve 9 is open).

Always with reference to the system for supplying water to the tanks 17 and 26, or tub 1, it is still underlined how the detection of the required amounts of water could be determined through an appropriate flow or flowrate sensor, instead of using level sensors located within the tanks or in the tub, such as a turbine sensor, appropriately connected to the machine control system; such a flow sensor is indicated in the figures by way of example with reference 27.

As already mentioned, in a particularly advantageous embodiment, several parts of the water supply and softening system described above can be integrated in a single device; in this frame, the air break SA, tank 17, tank 26, decalcifier 10 and the various valves as described, with all the relevant associated elements (sensors, heaters, ducts, etc.) may be incorporated in one component made of thermoplastic material and inserted in the machine cabinet, on one side of the tub 1; however, it is obvious that not all above elements need to be necessarily incorporated in one component alone.

It is also clear that the means H utilized for heating the regeneration water and its related control method may be of any known type, even differing from the one previously described by way of example.

FIG. 28 illustrates a possible variant embodiment of the vacuum pump previously mentioned, which is indicated as a whole with 23.

The pump 23 of FIG. 28 consists of two elements, in particular the actuator AT already described and a valve body CV; the valve body CV has a body defining a chamber CV1 housing a piston CV2 with a relevant gasket CV3, apt for realizing a seal on the side inner surfaces of the same chamber; the piston CV2 is apt to be motioned by the actuator AT.

An inlet CV4 and outlet CV5 fitted with respective unidirectional check valves CV4' and CV5' according to a known technique are defined on one end of the chamber CV1; in the given example, the valves CV4' and CV5' have a reverse operation between them and are made by means of an appropriately shaped rubber element, whose movement is contrasted by the elastic action of a spiral spring.

A spring CV6 is located between the piston CV2 and the wall in which the inlet CV4 and the outlet CV5 are defined; it should be noticed that such a spring may also have a different position, though being apt to react the piston CV2; moreover, according to a possible variant embodiment, the function of the spring CV6 may be performed by the spring AT9 only of the actuator AT, simply making the shaft AT3 integral with the piston CV2, or coupling the two.

The valve body CV is provided with seats or hooking means CV7, for receiving the wings AT4 of the actuator AT, for the coupling of the two parts.

FIG. 29 illustrates the pump 23 assembled; for its operation, let us assume that the inlet CV4 is connected to the upper part of the tank 17 of FIG. 25, whereas the outlet CV5 is directed to the external environment.

The activation of the actuator AT, with a consequent movement of the shaft AT3 causes the piston CV2 to approach the wall on which the inlet CV4 and the outlet CV5 are defined, as well as the compression of the spring CV6, with a consequent reduction of the volume of the chamber CV1. In this way, by virtue of the gasket CV3, the air present in the portion of the chamber CV1 housing the spring CV6 can flow out of the outlet CV5, but not through the inlet CV4; it should be noticed, in fact, that the pressure of that air is such to cause the valve CV5' to open while ensuring on the contrary the closure of the valve CV4'.

The electric supply to the actuator AT is subsequently stopped; as a result, under the action of the springs CV6 and AT9, the piston CV2 and the shaft AT3 tend to go back to their respective start positions.

The movement of the piston CV2 to its starting position will now produce a depression inside the portion of the chamber CV1 housing the spring CV6, causing an entry of air through the inlet CV4 but not through the outlet CV5; in fact, during this phase, such a depression causes the opening of the valve CV4' and warrants on the contrary the closure of the valve CV5'.

Therefore, as it can be seen, also the pump 23 is likely to perform the degassing or deoxygenating operation of the contents of the tank 17; if required, in order to achieve this aim, the actuator AT can be submitted to a set of activation-deactivation cycles, in order to perform repeated suction cycles from the tank 17 connected to the pump 23 through the inlet CV4.

FIGS. 30 and 31 illustrate schematically a further possible variant embodiment of a vacuum pump indicated as a whole with 21'; these figures use the same reference numbers of FIGS. 25 and 27 for indicating technical equivalent elements.

In this instance, the tank 17 is associated to a chamber 21A' containing a piston 21B' having a relevant sealing gasket and a resilient reinstatement element.

The piston 21B' can move (upwardly, with reference to the figures) under the action of an actuator AT', which is supposed to be similar to the thermoactuator indicated with AT7 in FIG. 28; the thermoactuator AT' is appropriately arranged within the tank 17, at such a height to be at least partially immersed in the regeneration water contained therein, and in such a way to have its thrusting element (AT8, FIG. 28) going through the communication opening between the chamber 21A' and the tank 17, and in contact with the piston 21B'.

When the tank 17 is full, the thermoactuator AT' is immersed in water.

Activation of the heating means H, just prior to a regeneration phase, causes the water contents of the tank 17 to heat up, with a consequent heating of the actuator body AT' too; this causes the expansion of the thermally expansible material contained in the actuator AT', with a consequent exit of the relevant thruster.

Such a movement of the thruster causes a corresponding movement of the piston 21B' inside the chamber 21 A', eventually against the action of a spring (not represented).

Also in this event, therefore, as evidenced in FIG. 31, a depression is produced within the chamber 21A', apt for withdrawing the air eventually present in the upper portion of the tank 17 and the gaseous residues in the water contained therein.

It is also clear that, following the emptying of the tank 17, the relevant temperature decrease of the thermoactuator body AT' will cause the latter to return to its respective start condition (eventually with the help of the cited spring), and a consequent achievement of the start position of the piston 21B' as well.

Therefore, as it can be seen, the actuator AT' does not require any proper heating means and/or electric supply, with a relevant interfacing to the machine control system; in the instance of the proposed variant, in fact, the operation of the actuator AT' is obtained by exploiting the heating induced to the contents of the tank 17, and therefore using the heater H.

It is clear, for the purposes of the proposed variant, and if required, that the heating means H of the tank contents 17 may be placed directly near the thermoactuator body AT'.

According to other possible variant embodiments, the heating of a thermoactuator causing actuation of a vacuum pump may be obtained utilizing the thermal action of other components of the washing machine; for example, the thermoactuator may be placed in contact with a wall of the wash tub 1, so as to actuate the former using the temperature taken by the latter during a hot wash phase of the machine; also, another possibility is to utilize the thermal action of a heater for heating the wash water and activate also a thermoactuator of the vacuum pump.

In the subsequent figures other possible variant embodiments of the present invention are illustrated, which tend to further reduce a likely oxidation of the resins R, which is typical, on the contrary, of the solution described in U.S. Pat. No. 4,645,595.

In this connection it should be considered that the total time of exposure of the resins to a high temperature, even if lower than the regeneration temperature, is particular affecting the oxidation phenomenon of the resins themselves.

Let us also consider that temperature propagation in a mass of thermal regenerating resins occurs rather slowly, due to the high thermal resistance proper of the basic material constituting the resins (in fact, resins have a basic or support structure undergoing a chemical treatment during their production process to make it active, i.e. capable of retaining calcium and magnesium ions; for example, and quite schematically, the softening resins of common decalcifiers for washing machines consists of granules, balls or pearls, each one of them formed by a structure of polystyrene chains substantially enwrapped to each other like a clew; the various polystyrene chains are tied up to each other by means of smaller divinylbenzene chains, onto which appropriate sites ($SO_4$—) are present, where the ions to be removed are apt to reside).

This concept is shown by way of example by the graphic of FIG. 32, which represents schematically the temperature trend of the resins during a thermal regeneration phase in a common decalcifying system (such as the one described in U.S. Pat. No. 4,645,595); in this graphic time is indicated on the abscissa axis and the temperature of the resins subject to regeneration on the ordinate axis.

Let us assume, simply by way of example, that optimal regeneration may be achieved by submitting the resins to a temperature of 80° C. for a given period of time and that, according to a known technique, the water heated to that temperature is supplied to the decalcifier for such a purpose.

Therefore, due to the above slow heat propagation within the resins, the following results will ensue:
- a temperature raise of the resins at the beginning of the regeneration phase, indicated by the interval T0–T1 in FIG. 32;
- a maintenance phase of the resins at the optimal regeneration temperature of 80° C., indicated by the interval T1–T2 in FIG. 32;
- a temperature decrease of the resins, indicated by the interval T2–T3 in FIG. 32.

According to the above, it is clear how the useful regeneration time of the resins is only obtained during the interval T1–T2; vice-versa, the intervals T0–T1 and T2–T3 cause "dead times", during which the resins remain hot, but at a lower temperature than the regeneration temperature; however, during such phase the resins are subject to the oxidation phenomenon.

Another source of drawbacks is due to the thermal dissipation occurring in the ducts conveying hot water for regeneration, and its mixing with cold water still present in the decalcifier, which causes high energetic losses.

Therefore, the above drawbacks presume that in order to obtain for example a resin temperature of 80° C., in the decalcifier regeneration water should be heated at a higher temperature (e.g. in the order of 90–95° C.), with an obvious energy waste; moreover, if for any reason in the decalcifier there is no stagnating water at room temperature, the risk will ensue that during a regeneration phase the water at such a high temperature may invest the resins directly and spoil irreparably their basic material and/or the reacting substance associated to such a basic material.

According to a variant embodiment of the present invention, the above drawbacks are removed by providing a direct heating of the resins, i.e. placing the heating means directly in contact with them or very close to them.

Therefore, the decalcifier used for the proposed variant embodiment, may integrate heating means, controlled by an appropriate control system, in correspondence of the resins container, such as an electric heater or a resistor with a positive temperature coefficient or PTC, of the self-adjusting type (and therefore without the risk of exceeding a preset temperature value). In such an instance, the resins are preferably but not necessarily realized in a single monolith, instead of granules or balls, and/or with a material having a low thermal resistance.

FIG. 33 shows schematically a container for the softening material of a decalcifier according at least to one of the suggested variant embodiments.

In this case, the softening material arranged within the container does not consist of a mass or gel of tiny resin balls or pearls, as typical of the prior art, but rather of a solid resin block having a porous structure being three-dimensional or monolithic, indicated with R' in the figure.

Such a structure can be easily achieved, for example in the form of extruded bars to be subsequently cut, offering considerable advantages also from a low-cost manufacturing standpoint; moreover, during manufacturing, this structure is treated in the same way as for the softening balls, i.e. to be chemically active for retaining calcium and magnesium ions.

By way of example, the porous structure of the bloc R'0 can be similar to natural or synthetic zeolites, which are in fact characterized by a microporous structure, with unitary pore sizes and a high thermal stability. In other words and quite schematically, these materials have an open honeycomb three-dimensional structure, defining a regular uniform micropores net; therefore, for the purposes of the present invention, this structure allows for having a large internal superficial area of the block or monolith R', in contact with the water to be softened.

Back to FIG. 33, it can be seen how in the instance of the suggested variant embodiment, a heating element H is provided directly inserted in the rigid porous structure of the block R'; preferably, according to the present invention, this structure is charged during manufacture with a thermally conductive material, such as ceramic, in order to facilitate and speed up as much as possible the heating of the block R' and/or its subsequent cooling.

According to the above, it will be apparent how the proposed variant embodiment allows a faster heating of the resin mass R' during the regeneration phase compared to the prior art, with a consequent reduction of oxidation phenomena; this by virtue of a substantial time reduction (T0–T1) to reach an optimal regeneration temperature of the resins themselves, without thermal dispersions and/or any risks of irregularities.

FIG. 34 represents by way of example a possible embodiment of a dishwashing machine, wherein the decalcifier 10 comprises a mass of resins R' with a relevant heater H1.

As it can be seen in the instance of FIG. 34, the tank 17 has been omitted, since it is not absolutely necessary; the tank 26 is associated to a vacuum pump previously indicated with 21 and the duct 12 is the only water outlet from the decalcifier 10.

In order to supply water to the tub 1 in the instance of the proposed embodiment, the tank 26 is filled with fresh water from the mains through the duct 8; this is obtained by opening the valve 9 and keeping the valve 11 closed (eventually also the valve 13); reaching the filling level of the tank 26 can be obtained through any known technique, such as through a flowmeter 27.

The water contained in the tank 26 is degassed through the vacuum pump 21 according to procedures like the ones previously described; following the above degassing, the valves 11 and 13 are opened for the contents of the tank 26 to reach the tub 1 flowing through the decalcifier 10; by so doing, water can flow across the block R' through the above said micropores, in order to be softened.

As to the regeneration phase of the block R', the control system provides for conveying to the decalcifier 10 an amount of water apt for submerging the block itself, which for example may be obtained as follows.

The machine control system will provide for the valve 9 to open and maintain valves 11 and 13 closed; once the tank 26 has been filled, the valve 11 opens while the valve 13 is maintained closed, so that an amount of water will reach the decalcifier 10 and entirely cover the block R'; the valve 11 is then closed (metering of the above amount of water can be performed in any known way).

Now the control system will supply the heater H1 for realizing an immediate heat transmission to the block R'; therefore the block R' is thermally regenerated according to the known principles, by releasing calcium and magnesium cations to the water in the decalcifier 10.

Once an optimal treatment time has elapsed, the heater H1 is deactivated and the valve 13 opened to convey to the pump 6 the water utilized for regeneration purposes (in the example of FIG. 34, regeneration water is sent to the tub 1 for its subsequent discharge through the pump 6; nothing hinders anyway to provide the decalcifier of FIG. 34 with a discharge duct and relevant valve like previously indicated with 14 and 15).

As it can be seen, according to the proposed embodiment, direct heating of the three-dimensional structure R' can be achieved so as to reach as fast and efficiently as possible a useful regeneration temperature free of dispersions and/or risks of faults; thus, regeneration times of the softening material can be reduced.

Moreover, according to the present invention, also the interval of temperature decrease of the block R', potentially harmful for oxidation issues, can be advantageously reduced (reference is made to the description about the interval T2–T3 of FIG. 32).

This can be obtained letting the water at room temperature contained in the tank 26 flow through the block R' immediately after the above regeneration phase; to this purpose, the machine control system will have the valve 11 and valve 13 opening, so that at least a portion of the water contents in the tank 26 may allow a fast cooling of the block R'; such a cooling water should not necessarily be discharged immediately from the tub 1, but may be utilized for a subsequent wash phase of the crockery; therefore, according to the proposed embodiment, the regeneration phase of the softening material may be immediately followed by a water supply to the tub, right in view of such a cooling.

FIGS. 35 and 36 illustrate schematically two further possible variant implementations of the present invention, with the purpose of avoiding oxidation phenomena of the resins or of the softening material R or R' due to indirect heating, such as during the wash cycles of the crockery. As mentioned, in fact, heating the resins at a lower temperature than provided for their regeneration may lead to oxidation problems; it should be considered, in fact, that some operative phase of a washing machine are obtained heating the wash water by means of heaters, which means that in the instance of a bad thermal insulation between the decalcifier and the tub or the place where the heating means of the wash water are located may expose the softening material indirectly to heat.

To this purpose, according to the proposed variant implementations of the present invention, means are provided for maintaining the softening material at a lower temperature than potentially harmful in view of oxidation.

For example, FIG. 35 illustrates a machine whose structure is substantially similar to the structure of the machine of FIGS. 25, 27 or 30–31, where the decalcifier 10 directly integrates a heater H1 (in FIG. 35 the vacuum pump 21 or 21'0 is not represented for simplicity's sake); moreover, the decalcifier 10 is associated to a temperature sensor, also not represented.

In this instance, the control system is apt to detect through the above cited temperature sensor whether the water stagnating in the decalcifier 10 is approaching a threshold of a potentially harmful temperature (i.e. apt to induce oxidation in the material R or R'); in such a situation, the control system will provide for replacing the water contained in the decalcifier 10, submitted to indirect heating, with colder water.

This may be obtained transferring a small quantity of water at the mains temperature or having anyway a lower temperature than the one potentially harmful from the tank 26 of FIG. 35 (or directly from the water mains) to the tank 17; this is obtained by opening the valves 9, 11 and 20. The water reaching from time to time the tank 17 and filling it gradually, can then be used during the phase of thermal regeneration of the softening material R or R', for example by opening, immediately after activation of the heater H1, the valves 20 and 15 and/or obtaining a counter-current washing of the softening material.

On the other hand, the embodiment of FIG. 36 represents as a whole the structure of FIGS. 25, 27 and 30–31 (also in this case, the vacuum pump 121 or 121' is not represented in FIG. 36 for simplicity's sake); in this instance, a further collecting tank 30 provided on the duct 12 is fitted with a relevant outlet valve 31.

According to this variant implementation, the machine control system will control the opening of the valves 11 and 13 to have the material R or R' invested by a cooling water flow from the tank 26, if required; in such an instance the water flowing out from the decalcifier 10 is collected in the tank 30 and conveyed to the tub 1, where it is used for washing, by opening the valve 31.

At the limit, the valve 11 in this embodiment may be a variable flowrate valve, so that the cooling flow of the material R or R' may have a reduced amount compared with the normal water flow being supplied to the tub; according to this solution, it is eventually possible to let little water to flow continuously in order to keep the softening material constantly fresh and avoid a swinging or stepwise trend of its temperature.

According to a further variant embodiment of the invention, as schematically shown in FIG. 36, the decalcifier 10 may also be associated to a special cooling or refrigerating device indicated with 40, which is provided for maintaining the water stagnating in the decalcifier at a lower temperature than the one potentially harmful for oxidation of the resins R.

Finally, it is clear that the invention, besides the field of washing machines, can be in general applicable to any household appliance utilizing water, such as drinks making machines (coffee or similar), steam generators, ironing apparatuses, boilers, etc., comprising a treatment container or ducts to be supplied with water.

What is claimed is:

1. A household appliance comprising a supply system of water from an external source, a softening system for at least a portion of the water supplied and a control system, whereby permanent means for water softening are provided, comprising an electrochemical cell having a container within which at least a positive electrode and a negative electrode are arranged, in contact with the water, and electric means for supplying said electrodes, wherein at least two ions permeable divisor elements are provided within said container for defining at least:

a first channel, delimited at one side by at least an anions permeable divisor element, a second channel delimited at one side by at least a cations permeable divisor element, a third channel defined between said first channel and said second channel, said third channel being delimited at one side by said anions permeable divisor element and at another side by said cations permeable divisor element, whereby said channels are free of resins and, in the presence of an electric current flowing through said electrodes, cations of water are induced to migrate, through said cations permeable divisor element, at least from said third channel to said second channel, anions of water are induced to migrate, through said anions permeable divisor element, at least from said third channel to said first channel, the cations permeable divisor element hindering at the same time the anions to migrate from said second channel to said third channel and the anions permeable divisor elements hindering at the same time the cations to migrate from said first channel to said third channel, the above migration leading to an increased concentration of the cations in the water within at least said second channel and a decreased concentration of the cations in the water within at least said third channel, the latter sufficiently softened for being used during an operating cycle of the appliance.

2. A household appliance, according to claim 1, further comprising a fourth channel, said fourth channel being delimited at one side by the anions permeable divisor element of said third channel and at another side by another cations permeable divisor element, the above migration leading to an increased concentration of cations in the water within said forth channel.

3. A household appliance, according to claim 1, further comprising at least two third intermediate channels between which a fourth channel is provided, said fourth channel being delimited at one side by the anions permeable divisor element of one of said third channels and at the other side by the cations permeable divisor element of the other one of said third channels, the said cations migration leading to an increased concentration of cations in the water within said fourth channel.

4. A household appliance, according to claim 1, wherein said ions permeable divisor elements comprise membranes.

5. A household appliance, according to claim 1, wherein said ions permeable divisor elements are in substantially parallel spaced relationship.

6. A household appliance, according claim 1, further comprising a first duct to which said third channel is connected.

7. A household appliance, according to claim 1, further comprising a second duct to which at least one of said first channel, said second channel, and said fourth channel is connected.

8. A household appliance, according to claim 6, wherein said first duct is connected to a first intermediate tank.

9. A household appliance, according to claim 7, wherein that said second duct is connected to a second intermediate tank.

10. A household appliance, according to claim 8, wherein said control system is programmed for controlling the supply of said first tank while an operating cycle of said appliance is being performed.

11. A household appliance, according to claim 1, wherein said control system is programmed for controlling said electric means while an operating cycle of said appliance is being performed.

12. A household appliance, according to claim 1, wherein said control system is programmed for using the water passed through said first and/or second channels in order to perform at least a phase of an appliance operating program requiring cold water or water having a temperature being below the lime precipitation threshold.

13. A household appliance, according to claim 1, wherein said control system is programmed for inverting the polarity of said electrodes through said electric supply means.

14. A household appliance, according to claim 1, wherein said electric means comprise means for the adjustment of electric voltage and/or electric power and/or electric current.

15. A household appliance, according to claim 1, further comprising means for keeping said divisor element wet.

16. A household appliance, according to claim 1, wherein said permanent water softening means comprise water deoxygenating and/or degassing means.

17. A household appliance, according to claim 1, wherein said permanent water softening means comprise at least a tank for containing the water to be softened.

18. A household appliance, according to claim 1, wherein said permanent water softening means comprise means for realizing a decantation of the water before its softening.

19. A household appliance, according to claim 1, wherein said permanent water softening means comprises at least one sensor means selected from the group consisting of a water level sensor, a water temperature sensor, a water hardness sensor, a water conductivity sensor, and a water pH degree sensor.

20. A household appliance, according to claim 8, wherein said control system is programmed for subsequent filling and/or emptying of said first tank.

21. A household appliance, according to claim 1, wherein at least a portion of said permanent water softening means is integrated in one sole device having a body made from thermoplastic material.

22. A household appliance, according to claim 9, wherein said control system is programmed for controlling the supply of said second tank while an operating cycle of said appliance is being performed.

23. A household appliance, according to claim 9, wherein said control system is programmed for subsequent filling and/or emptying of said second tank.

* * * * *